US010839321B2

(12) United States Patent
Eder

(10) Patent No.: US 10,839,321 B2
(45) Date of Patent: Nov. 17, 2020

(54) AUTOMATED DATA STORAGE SYSTEM

(75) Inventor: Jeff S. Eder, Mill Creek, WA (US)

(73) Assignee: Jeffrey Eder, Bothell, WA (US)

( * ) Notice: Subject to any disclaimer, the term of this patent is extended or adjusted under 35 U.S.C. 154(b) by 1187 days.

(21) Appl. No.: 09/940,450

(22) Filed: Aug. 29, 2001

(65) Prior Publication Data

US 2004/0088239 A1 May 6, 2004

Related U.S. Application Data

(63) Continuation of application No. 09/421,553, filed on Oct. 20, 1999, now abandoned, which is a continuation-in-part of application No. 09/358,969, filed on Jul. 22, 1999, which is a continuation-in-part of application No. 09/295,337, filed on Apr. 21, 1999, which is a continuation-in-part of application No. 09/292,336, filed on Apr. 16, 1999, which is a continuation-in-part of application No. 09/135,983,
(Continued)

(51) Int. Cl.
| G06Q 40/00 | (2012.01) |
| G06Q 10/04 | (2012.01) |
| G06Q 30/02 | (2012.01) |
| G06Q 40/06 | (2012.01) |
| G06Q 10/06 | (2012.01) |
| G06Q 30/06 | (2012.01) |
| G06Q 40/04 | (2012.01) |
| G06Q 40/02 | (2012.01) |

(52) U.S. Cl.
CPC ............ *G06Q 10/04* (2013.01); *G06Q 10/06* (2013.01); *G06Q 30/0202* (2013.01); *G06Q 30/06* (2013.01); *G06Q 40/00* (2013.01); *G06Q 40/02* (2013.01); *G06Q 40/04* (2013.01); *G06Q 40/06* (2013.01)

(58) Field of Classification Search
CPC .... G06Q 50/34; G06Q 30/0278; G06Q 10/04; G06N 5/046; G06N 5/027; G06N 7/005; G06N 5/045; G06N 5/043; G06N 7/06; G06N 7/04
USPC ......... 709/231; 707/2, 103, 505; 705/36, 35; 706/54
See application file for complete search history.

(56) References Cited

U.S. PATENT DOCUMENTS

| 3,749,892 A | 7/1973 | Stenning |
| 3,933,305 A | 1/1976 | Murphy |

(Continued)

FOREIGN PATENT DOCUMENTS

| EP | 0 587 290 A2 | 3/1994 |
| GB | 2 253 081 A | 2/1992 |
| WO | WO 9838588 | 2/1997 |

OTHER PUBLICATIONS

Baur, Michael N., Quintero, Socorro, Stevens, Eric. "The 1986-1988 stock Market: investor sentiment or fundamentals?". Managerial and Decision Economics. May/Jun. 1996; 17, 3. (11 pages from ProQuest).*

(Continued)

*Primary Examiner* — Edward Chang
(74) *Attorney, Agent, or Firm* — Davis Wright Tremaine LLP

(57) ABSTRACT

An automated method, media and system for data unification that transforms disparate data from a plurality of sources into an integrated database. In the integrated database data are stored in at least one table in accordance with a common model or schema and a common metadata standard.

76 Claims, 17 Drawing Sheets

Related U.S. Application Data filed on Apr. 17, 1998, which is a continuation-in-part of application No. 08/999,245, filed on Dec. 10, 1997, which is a continuation-in-part of application No. 08/779,109, filed on Jan. 6, 1997.

(56) References Cited

U.S. PATENT DOCUMENTS

| | | | |
|---|---|---|---|
| 4,359,447 | A | 11/1982 | Welch |
| 4,409,641 | A | 10/1983 | Jakob et al. |
| 4,499,371 | A | 2/1985 | Rose |
| 4,822,984 | A | 4/1989 | Remery et al. |
| 4,839,804 | A * | 6/1989 | Roberts et al. ............... 705/36 |
| 4,930,077 | A | 5/1990 | Fan |
| 4,989,141 | A | 1/1991 | Lyons |
| 5,093,787 | A | 3/1992 | Simmons |
| 5,128,861 | A | 7/1992 | Kagami |
| 5,191,522 | A | 3/1993 | Bosco et al. |
| 5,193,055 | A | 3/1993 | Brown |
| 5,221,838 | A | 6/1993 | Gutman et al. |
| 5,224,034 | A | 6/1993 | Katz |
| 5,237,495 | A | 8/1993 | Morii |
| 5,237,946 | A | 8/1993 | Kagami |
| 5,295,256 | A * | 3/1994 | Bapat .................. G06F 16/289 717/137 |
| 5,311,421 | A | 5/1994 | Nomura et al. |
| 5,317,504 | A | 5/1994 | Nakayama |
| 5,361,201 | A | 11/1994 | Jost et al. |
| 5,377,116 | A | 12/1994 | Wayne et al. |
| 5,406,477 | A | 4/1995 | Harhen |
| 5,414,621 | A | 5/1995 | Hough |
| 5,471,611 | A | 11/1995 | McGregor |
| 5,471,811 | A | 11/1995 | McGregor |
| 5,638,492 | A | 6/1997 | Maeda et al. |
| 5,644,727 | A | 7/1997 | Atkins |
| 5,649,181 | A | 7/1997 | French et al. |
| 5,668,951 | A | 9/1997 | Shintani |
| 5,680,305 | A | 10/1997 | Apgar, IV |
| 5,704,045 | A | 12/1997 | King |
| 5,704,055 | A | 12/1997 | George |
| 5,706,495 | A | 1/1998 | Chadha et al. |
| 5,727,158 | A | 3/1998 | Bouziane et al. |
| 5,737,581 | A | 4/1998 | Keane |
| 5,737,736 | A | 4/1998 | Chang |
| 5,742,775 | A | 4/1998 | King |
| 5,761,442 | A | 6/1998 | Barr |
| 5,768,475 | A | 6/1998 | Godbole et al. |
| 5,774,761 | A | 6/1998 | Rai |
| 5,774,873 | A | 6/1998 | Berent |
| 5,802,501 | A * | 9/1998 | Graff ............................ 705/36 |
| 5,809,282 | A | 9/1998 | Cooper |
| 5,812,404 | A | 9/1998 | Hamalainen et al. |
| 5,812,988 | A | 9/1998 | Sandretto |
| 5,819,237 | A | 10/1998 | Garman |
| 5,825,653 | A | 10/1998 | Huovila et al. |
| 5,832,459 | A | 11/1998 | Cameron et al. |
| 5,852,811 | A | 12/1998 | Atkins |
| 5,875,431 | A | 2/1999 | Heckman |
| 5,887,120 | A | 3/1999 | Wical |
| 5,889,823 | A | 3/1999 | Agazzi et al. |
| 5,918,232 | A | 6/1999 | Pouschine et al. |
| 5,920,847 | A | 7/1999 | Kolling et al. |
| 5,933,345 | A | 8/1999 | Martin et al. |
| 5,937,409 | A | 8/1999 | Wetherbee |
| 5,938,594 | A | 8/1999 | Poon et al. |
| 5,950,182 | A | 9/1999 | Godbole et al. |
| 5,970,490 | A * | 10/1999 | Morgenstern ......... G06F 16/258 |
| 5,990,883 | A | 11/1999 | Byrne et al. |
| 6,018,722 | A * | 1/2000 | Ray et al. .................. 705/36 R |
| 6,023,578 | A | 2/2000 | Birsan et al. |
| 6,028,605 | A | 2/2000 | Conrad et al. |
| 6,028,938 | A | 2/2000 | Malkin et al. |
| 6,047,280 | A | 4/2000 | Ashby et al. |
| 6,061,515 | A * | 5/2000 | Chang .................. G06F 16/289 717/114 |
| 6,064,971 | A | 5/2000 | Hartnett |
| 6,064,972 | A | 5/2000 | Jankowitz |
| 6,073,115 | A | 6/2000 | Marshall |
| 6,078,901 | A | 6/2000 | Ching |
| 6,092,056 | A | 7/2000 | Tull, Jr. et al. |
| 6,092,058 | A | 7/2000 | Tull, Jr. et al. |
| 6,112,188 | A | 8/2000 | Hartnett |
| 6,125,355 | A | 9/2000 | Bekaert |
| 6,134,536 | A | 10/2000 | Shepherd |
| 6,148,293 | A | 11/2000 | King |
| 6,151,601 | A | 11/2000 | Papierniak et al. |
| 6,163,776 | A | 12/2000 | Periwal |
| 6,173,276 | B1 | 1/2001 | Kant |
| 6,182,274 | B1 | 1/2001 | Lau |
| 6,185,580 | B1 | 2/2001 | Day et al. |
| 6,189,011 | B1 | 2/2001 | Lim et al. |
| 6,207,936 | B1 | 3/2001 | de Waard et al. |
| 6,209,124 | B1 | 3/2001 | Vermeire et al. |
| 6,219,649 | B1 | 4/2001 | Jameson |
| 6,249,768 | B1 | 6/2001 | Tulskie |
| 6,275,819 | B1 | 8/2001 | Carter |
| 6,278,899 | B1 | 8/2001 | Piche et al. |
| 6,278,981 | B1 | 8/2001 | Dembo |
| 6,279,011 | B1 | 8/2001 | Muhlestein |
| 6,282,531 | B1 | 8/2001 | Haughton |
| 6,289,345 | B1 | 9/2001 | Yasue |
| 6,301,584 | B1 * | 10/2001 | Ranger ............ G06F 17/30607 |
| 6,308,162 | B1 | 10/2001 | Ouimet et al. |
| 6,308,178 | B1 | 10/2001 | Chang et al. |
| 6,315,735 | B1 | 11/2001 | Joeken et al. |
| 6,317,748 | B1 | 11/2001 | Menzies et al. |
| 6,317,749 | B1 | 11/2001 | Ghatate |
| 6,324,553 | B1 | 11/2001 | Agrawal et al. |
| 6,324,571 | B1 | 11/2001 | Hacherl |
| 6,327,574 | B1 | 12/2001 | Kramer et al. |
| 6,330,547 | B1 | 12/2001 | Martin |
| 6,330,564 | B1 | 12/2001 | Hellerstein et al. |
| 6,332,163 | B1 * | 12/2001 | Bowman-Amuah ......... 709/231 |
| 6,345,278 | B1 | 2/2002 | Hitchcock et al. |
| 6,347,306 | B1 | 2/2002 | Swart |
| 6,353,825 | B1 | 3/2002 | Ponte |
| 6,366,934 | B1 | 4/2002 | Cheng et al. |
| 6,377,993 | B1 | 4/2002 | Brandt et al. |
| 6,418,448 | B1 | 7/2002 | Sarkar |
| 6,424,979 | B1 * | 7/2002 | Livingston et al. .......... 715/206 |
| 6,453,297 | B1 | 9/2002 | Burks |
| 6,453,310 | B1 | 9/2002 | Zander |
| 6,457,003 | B1 | 9/2002 | Gajda et al. |
| 6,457,053 | B1 | 9/2002 | Satagopan et al. |
| 6,463,461 | B1 | 10/2002 | Hanson et al. |
| 6,487,459 | B1 | 11/2002 | Martin et al. |
| 6,493,717 | B1 | 12/2002 | Junkin |
| 6,493,719 | B1 | 12/2002 | Booth et al. |
| 6,496,842 | B1 | 12/2002 | Lyness |
| 6,498,612 | B1 | 12/2002 | Brown et al. |
| 6,501,491 | B1 | 12/2002 | Brown et al. |
| 6,519,597 | B1 | 2/2003 | Cheng et al. |
| 6,519,598 | B1 | 2/2003 | Nishizawa et al. |
| 6,523,172 | B1 | 2/2003 | Martinez-Guerra et al. |
| 6,535,868 | B1 | 3/2003 | Galeazzi et al. |
| 6,546,281 | B1 | 4/2003 | Subramanian et al. |
| 6,546,381 | B1 * | 4/2003 | Subramanian et al. ........... 707/2 |
| 6,549,922 | B1 * | 4/2003 | Srivastava et al. ........... 707/205 |
| 6,558,431 | B1 | 5/2003 | Lynch et al. |
| 6,567,786 | B1 | 5/2003 | Bibelnieks et al. |
| 6,567,814 | B1 | 5/2003 | Bankier et al. |
| 6,578,015 | B1 | 6/2003 | Haseltine et al. |
| 6,584,459 | B1 | 6/2003 | Chang et al. |
| 6,584,507 | B1 | 6/2003 | Bradley et al. |
| 6,615,258 | B1 | 9/2003 | Barry et al. |
| 6,618,727 | B1 | 9/2003 | Wheeler et al. |
| 6,625,577 | B1 | 9/2003 | Jameson |
| 6,654,469 | B1 | 11/2003 | Nelson et al. |
| 6,654,649 | B2 | 11/2003 | Treiber et al. |
| 6,658,625 | B1 | 12/2003 | Allen |
| 6,665,665 | B1 | 12/2003 | Ponte |
| 6,681,330 | B2 | 1/2004 | Bradford et al. |
| 6,697,997 | B1 | 2/2004 | Fujimura |
| 6,700,923 | B1 | 3/2004 | Dowling et al. |

(56) References Cited

U.S. PATENT DOCUMENTS

| | | |
|---|---|---|
| 6,714,979 B1 | 3/2004 | Brandt et al. |
| 6,718,320 B1 | 4/2004 | Subramanian et al. |
| 6,718,363 B1 | 4/2004 | Ponte |
| 6,725,446 B1 | 4/2004 | Hahn et al. |
| 6,732,095 B1 | 5/2004 | Warshavsky et al. |
| 6,738,803 B1 | 5/2004 | Dodrill et al. |
| 6,772,164 B2 | 8/2004 | Reinhardt |
| 6,772,180 B1 | 8/2004 | Li et al. |
| 6,772,396 B1 | 8/2004 | Cronin et al. |
| 6,792,605 B1 | 9/2004 | Roberts et al. |
| 6,795,089 B2 * | 9/2004 | Rajarajan et al. ............ 345/629 |
| 6,820,235 B1 | 11/2004 | Bleicher et al. |
| 6,826,521 B1 | 11/2004 | Hess et al. |
| 6,826,531 B2 | 11/2004 | Fukada |
| 6,826,725 B1 | 11/2004 | Beezer et al. |
| 6,874,146 B1 | 3/2005 | Iyengar |
| 6,901,428 B1 | 5/2005 | Frazier et al. |
| 6,909,708 B1 | 6/2005 | Krishnaswamy et al. |
| 6,934,931 B2 | 8/2005 | Plumer et al. |
| 6,947,947 B2 | 9/2005 | Block et al. |
| 6,959,415 B1 | 10/2005 | Soderberg et al. |
| 6,968,316 B1 | 11/2005 | Hamilton |
| 6,970,883 B2 | 11/2005 | Ku et al. |
| 7,003,504 B1 | 2/2006 | Angus et al. |
| 7,006,939 B2 | 2/2006 | Voorakaranam et al. |
| 7,031,936 B2 | 4/2006 | Johnson et al. |
| 7,035,840 B2 | 4/2006 | Nakos et al. |
| 7,039,608 B2 | 5/2006 | Johnson et al. |
| 7,043,566 B1 | 5/2006 | Grant et al. |
| 7,089,202 B1 | 8/2006 | McNamar et al. |
| 7,134,072 B1 | 11/2006 | Lovett et al. |
| 7,142,307 B1 | 11/2006 | Stark |
| 7,143,104 B1 | 11/2006 | Turba |
| 7,146,353 B2 | 12/2006 | Garg et al. |
| 7,158,967 B1 | 1/2007 | Turba |
| 7,162,464 B1 | 1/2007 | Miller et al. |
| 7,231,390 B2 | 1/2007 | Blair et al. |
| 7,187,662 B1 | 3/2007 | Klingman |
| 7,188,081 B1 | 3/2007 | Darshatkumar |
| 7,224,761 B2 | 5/2007 | Popa |
| 7,243,156 B2 | 7/2007 | Hahn et al. |
| 7,246,083 B2 | 7/2007 | Bibelnieks et al. |
| 7,249,080 B1 | 7/2007 | Hoffman et al. |
| 7,249,318 B1 | 7/2007 | Corell et al. |
| 7,249,328 B1 * | 7/2007 | Davis ............................ 715/853 |
| 7,275,078 B2 | 9/2007 | Selvakumar |
| 7,278,163 B2 | 10/2007 | Banzhof et al. |
| 7,281,260 B2 | 10/2007 | Puente et al. |
| 7,346,518 B1 | 3/2008 | Frank et al. |
| 7,366,933 B1 | 4/2008 | Crawford et al. |
| 7,373,349 B2 | 5/2008 | Obrien et al. |
| 7,376,610 B2 | 5/2008 | Schneider |
| 7,386,496 B1 | 6/2008 | Braun et al. |
| 7,389,265 B2 | 6/2008 | Lawrence et al. |
| 7,418,417 B2 | 8/2008 | Chacko et al. |
| 7,428,500 B1 | 9/2008 | Linden |
| 7,437,304 B2 | 10/2008 | Barnard et al. |
| 7,444,309 B2 | 10/2008 | Branke et al. |
| 7,444,660 B2 | 10/2008 | Dudkiewicz |
| 7,451,389 B2 | 11/2008 | Huynh et al. |
| 7,490,356 B2 | 2/2009 | Lieblich et al. |
| 7,495,792 B2 | 2/2009 | Snowdon et al. |
| 7,506,060 B2 | 3/2009 | Anderson |
| 7,539,646 B2 | 3/2009 | Gilder et al. |
| 7,533,172 B2 | 5/2009 | Traversat et al. |
| 7,536,330 B2 | 5/2009 | Sato |
| 7,536,332 B2 | 5/2009 | Rhee |
| 7,546,629 B2 | 6/2009 | Albert et al. |
| 7,552,688 B2 | 6/2009 | Lundell |
| 7,552,961 B2 | 6/2009 | Eglinton |
| 7,555,566 B2 | 6/2009 | Blumrich et al. |
| 7,555,595 B2 | 6/2009 | Miles |
| 7,556,486 B1 | 7/2009 | Zito |
| 7,557,941 B2 | 7/2009 | Walmsley |
| 7,563,185 B2 | 7/2009 | Naude |
| 7,565,411 B1 | 7/2009 | Turcotte |
| 7,584,114 B2 | 9/2009 | Estrada et al. |
| 7,593,878 B2 | 9/2009 | Blitzer |
| 7,617,141 B2 | 11/2009 | Chiappetta et al. |
| 7,617,222 B2 | 11/2009 | Coulthard et al. |
| 7,620,603 B2 | 11/2009 | Gilder et al. |
| 7,630,932 B2 | 12/2009 | Danaher et al. |
| 7,634,420 B2 | 12/2009 | Kendall et al. |
| 7,647,340 B2 | 1/2010 | Van Beek et al. |
| 7,653,552 B2 | 1/2010 | Vaidyanathan et al. |
| 7,657,475 B1 | 2/2010 | Arpin et al. |
| 7,664,795 B2 | 2/2010 | Balin et al. |
| 7,673,282 B2 | 3/2010 | Amaru et al. |
| 7,689,456 B2 | 3/2010 | Schroeder et al. |
| 7,693,765 B2 | 4/2010 | Orfano |
| 7,698,188 B2 | 4/2010 | Hollas et al. |
| 7,698,651 B2 | 4/2010 | Carbanes et al. |
| 7,702,522 B1 | 4/2010 | Sholem |
| 7,707,093 B2 | 4/2010 | O'Shaughnessy et al. |
| 7,711,623 B2 | 5/2010 | Smith et al. |
| 7,716,108 B2 | 5/2010 | Chiappetta et al. |
| 7,720,809 B2 | 5/2010 | Knudsen et al. |
| 7,725,423 B1 | 5/2010 | Labrie |
| 7,734,488 B2 | 6/2010 | Grussing et al. |
| 7,735,080 B2 | 6/2010 | Barturen et al. |
| 7,739,121 B2 | 6/2010 | Jain et al. |
| 7,739,224 B1 | 6/2010 | Weissman et al. |
| 7,747,494 B1 | 6/2010 | Kothari et al. |
| 7,752,125 B1 | 7/2010 | Kothari et al. |
| 7,765,468 B2 | 7/2010 | Monetsugu et al. |
| 7,769,750 B2 | 8/2010 | Anonson et al. |
| 7,774,279 B2 | 8/2010 | Wang et al. |
| 7,774,408 B2 | 8/2010 | Sinha et al. |
| 7,774,611 B2 | 8/2010 | Muntz et al. |
| 7,778,856 B2 | 8/2010 | Reynolds et al. |
| 7,778,910 B2 | 8/2010 | Ballow et al. |
| 7,788,126 B2 | 8/2010 | Wagner et al. |
| 7,805,474 B2 | 9/2010 | Warshavsky et al. |
| 7,805,680 B2 | 9/2010 | Meyers et al. |
| 7,822,633 B2 | 10/2010 | Neuberger et al. |
| 7,827,557 B2 | 11/2010 | Xiaoyun et al. |
| 7,840,498 B2 | 11/2010 | Frank et al. |
| 7,840,634 B2 | 11/2010 | McIntyre et al. |
| 7,844,475 B1 | 11/2010 | Murphy |
| 7,856,420 B2 | 12/2010 | Zargham et al. |
| 7,860,792 B1 | 12/2010 | Magruder et al. |
| 7,865,450 B2 | 1/2011 | Opsitnick et al. |
| 7,870,146 B2 | 1/2011 | Babb et al. |
| 7,890,403 B1 | 2/2011 | Smith et al. |
| 7,899,721 B2 | 3/2011 | Bowman-Amuah |
| 7,900,138 B2 | 3/2011 | Price et al. |
| 7,908,194 B2 | 3/2011 | Hollas |
| 7,921,061 B2 | 4/2011 | Rangarajan et al. |
| 7,933,792 B2 | 4/2011 | Barnard et al. |
| 7,933,920 B2 | 4/2011 | Kohima et al. |
| 7,940,899 B2 | 5/2011 | Moorman et al. |
| 7,941,326 B2 | 5/2011 | Brown |
| 7,950,033 B2 | 5/2011 | Pierre et al. |
| 7,957,995 B2 | 6/2011 | Barnard et al. |
| 7,974,400 B1 | 7/2011 | Moore et al. |
| 7,979,335 B2 | 7/2011 | Schneider |
| 7,991,639 B2 | 8/2011 | Wolfe et al. |
| 8,000,986 B2 | 8/2011 | Wait et al. |
| 8,001,207 B2 | 8/2011 | Batra et al. |
| 8,010,389 B2 | 8/2011 | Wait et al. |
| 8,010,390 B2 | 8/2011 | Wait et al. |
| 8,010,391 B2 | 8/2011 | Wait et al. |
| 8,010,395 B2 | 8/2011 | Barnard et al. |
| 8,055,559 B2 | 11/2011 | Gelerman |
| 8,055,560 B2 | 11/2011 | Gelerman |
| 8,060,432 B2 | 11/2011 | Bleier et al. |
| 8,082,170 B2 | 12/2011 | Cereghini et al. |
| 8,082,196 B2 | 12/2011 | Mullan et al. |
| 8,090,635 B1 | 1/2012 | Roitburg |
| 8,095,396 B1 | 1/2012 | Zublin, Jr. et al. |
| 8,095,503 B2 | 1/2012 | Holland et al. |
| 8,108,258 B1 | 1/2012 | Slattery et al. |
| 8,108,287 B2 | 1/2012 | Kirch et al. |
| 8,121,932 B2 | 2/2012 | Kirch et al. |

(56) References Cited

U.S. PATENT DOCUMENTS

| | | |
|---|---|---|
| 8,140,622 B2 | 3/2012 | Curran et al. |
| 8,150,886 B2 | 4/2012 | Rhodes et al. |
| 8,156,030 B2 | 4/2012 | Damschroder et al. |
| 8,160,956 B2 | 4/2012 | Comstock |
| 8,166,093 B2 | 4/2012 | Gage |
| 8,175,908 B1 | 5/2012 | Anderson |
| 8,190,510 B2 | 5/2012 | Madhavan et al. |
| 8,195,546 B2 | 6/2012 | Wefers et al. |
| 8,204,779 B1 | 6/2012 | Hughes et al. |
| 8,204,929 B2 | 6/2012 | Roginsky et al. |
| 8,214,248 B1 | 7/2012 | McKinzie et al. |
| 8,224,692 B2 | 7/2012 | Agarwal et al. |
| 8,244,618 B1 | 8/2012 | Fashenpour et al. |
| 8,250,617 B2 | 8/2012 | Hensgen et al. |
| 8,255,311 B2 | 8/2012 | Wefers et al. |
| 8,266,096 B2 | 9/2012 | Navarette et al. |
| 8,275,757 B2 | 9/2012 | Abraham et al. |
| 8,275,791 B2 | 9/2012 | Raffaele et al. |
| 8,290,800 B2 | 10/2012 | Law et al. |
| 8,290,965 B2 | 10/2012 | Waldo et al. |
| 8,301,288 B2 | 10/2012 | Denton et al. |
| 8,306,849 B2 | 11/2012 | Graham et al. |
| 8,311,865 B2 | 11/2012 | Vogel et al. |
| 8,311,882 B2 | 11/2012 | Agarwal et al. |
| 8,316,347 B2 | 11/2012 | Arsanjani et al. |
| 8,321,249 B2 | 11/2012 | Law et al. |
| 8,321,438 B1 | 11/2012 | Smith et al. |
| 8,326,746 B1 | 12/2012 | Crawford et al. |
| 8,340,992 B2 | 12/2012 | Yaskin et al. |
| 8,340,993 B2 | 12/2012 | Yaskin et al. |
| 8,346,665 B1 | 1/2013 | Miller |
| 8,352,356 B2 | 1/2013 | Tam |
| 8,352,357 B2 | 1/2013 | Rotman et al. |
| 8,359,321 B2 | 1/2013 | Price et al. |
| 8,374,899 B1 | 2/2013 | Heuler et al. |
| 8,374,905 B2 | 2/2013 | Graham et al. |
| 8,392,240 B2 | 3/2013 | Vaidhyanathan et al. |
| 8,392,244 B1 | 3/2013 | O'Halloran |
| 8,412,621 B2 | 4/2013 | Madhavan et al. |
| 8,417,322 B2 | 4/2013 | Morris et al. |
| 8,429,069 B1 | 4/2013 | Sheehan et al. |
| 8,429,072 B1 | 4/2013 | Sheehan et al. |
| 8,442,908 B2 | 5/2013 | Niccolini et al. |
| 8,458,073 B2 | 6/2013 | Tanzillo et al. |
| 8,473,568 B2 | 6/2013 | McCartney et al. |
| 8,489,496 B2 | 7/2013 | Angle et al. |
| 8,510,147 B2 | 8/2013 | Mitra et al. |
| 8,510,197 B2 | 8/2013 | P et al. |
| 8,515,783 B1 | 8/2013 | Weeks |
| 8,521,566 B2 | 8/2013 | Chatter et al. |
| 8,521,642 B2 | 8/2013 | Rotman et al. |
| 8,533,029 B2 | 9/2013 | Hufford et al. |
| 8,538,703 B2 | 9/2013 | Kovatchev et al. |
| 8,548,847 B2 | 10/2013 | Roberts et al. |
| 8,554,611 B2 | 10/2013 | Roberts et al. |
| 8,554,669 B2 | 10/2013 | Keithley |
| 8,560,379 B2 | 10/2013 | Forman et al. |
| 8,560,666 B2 | 10/2013 | Low |
| 8,566,251 B2 | 10/2013 | Tadayon et al. |
| 8,571,934 B2 | 10/2013 | Rosenberg et al. |
| 8,571,967 B1 | 10/2013 | Silverman |
| 8,583,543 B2 | 11/2013 | Tam |
| 8,589,203 B1 | 11/2013 | Collins et al. |
| 8,589,209 B1 | 11/2013 | McKinzie et al. |
| 8,595,845 B2 | 11/2013 | Basavapatna et al. |
| 8,606,695 B1 | 12/2013 | Arora et al. |
| 8,612,332 B1 | 12/2013 | Gilbertie et al. |
| 8,620,801 B2 | 12/2013 | Choudjuri et al. |
| 8,626,558 B2 | 1/2014 | Dudley et al. |
| 8,628,708 B2 | 1/2014 | Del-Gallo et al. |
| 8,635,150 B1 | 1/2014 | Rotman et al. |
| 8,639,606 B1 | 1/2014 | Shakarchi et al. |
| 8,650,108 B1 | 2/2014 | Schram et al. |
| 8,676,683 B1 | 3/2014 | Chheda et al. |
| 8,694,432 B2 | 4/2014 | Miller |
| 8,706,589 B1 | 4/2014 | Smith et al. |
| 8,706,614 B2 | 4/2014 | Lawrence et al. |
| 8,725,554 B2 | 5/2014 | Kobayashi et al. |
| 8,732,005 B2 | 5/2014 | Schmeyer |
| 8,737,699 B2 | 5/2014 | Shen |
| 8,775,195 B2 | 7/2014 | Stiles et al. |
| 8,818,932 B2 | 8/2014 | Nolan et al. |
| 8,819,442 B1 | 8/2014 | Gehrig et al. |
| 8,826,144 B2 | 9/2014 | Joret et al. |
| 8,831,972 B2 | 9/2014 | Angell et al. |
| 8,884,759 B2 | 11/2014 | Oktem et al. |
| 8,886,591 B2 | 11/2014 | McDonald et al. |
| 8,892,409 B2 | 11/2014 | Mun |
| 8,903,919 B2 | 12/2014 | Wilcox |
| 8,914,268 B2 | 12/2014 | Dale et al. |
| 8,924,242 B2 | 12/2014 | Noyes |
| 8,930,254 B2 | 1/2015 | von Groll et al. |
| 8,935,297 B2 | 1/2015 | Coyne |
| 8,938,375 B2 | 1/2015 | Moll |
| 8,966,640 B1 | 2/2015 | Peddada et al. |
| 8,981,905 B2 | 3/2015 | Collins |
| 9,015,723 B2 | 4/2015 | Gilat et al. |
| 9,031,874 B2 | 5/2015 | Kremen |
| 9,053,171 B2 | 6/2015 | Ailon et al. |
| 9,076,182 B2 | 7/2015 | Chourasia et al. |
| 9,082,152 B2 | 7/2015 | Mura |
| 9,100,418 B2 | 8/2015 | Karnik |
| 9,117,245 B1 | 8/2015 | Finkemeier et al. |
| 9,147,159 B2 | 9/2015 | Hueter et al. |
| 9,147,171 B2 | 9/2015 | Sitarski |
| 9,147,177 B2 | 9/2015 | Mahadevan et al. |
| 9,147,206 B2 | 9/2015 | Umblijs |
| 9,165,259 B2 | 10/2015 | Flinn et al. |
| 9,171,092 B2 | 10/2015 | Kruglick |
| 9,171,201 B2 | 10/2015 | Lake, II et al. |
| 9,171,294 B2 | 10/2015 | Dutta |
| 9,177,349 B2 | 11/2015 | Barney |
| 9,195,703 B1 | 11/2015 | Kirmse et al. |
| 9,196,002 B2 | 11/2015 | Sundaresan et al. |
| 9,286,284 B2 | 3/2016 | Amussen et al. |
| 9,342,657 B2 | 5/2016 | Wei |
| 9,489,630 B2 | 11/2016 | Achin et al. |
| 9,497,184 B2 | 11/2016 | Fork et al. |
| 9,576,272 B2 | 2/2017 | Ganguly et al. |
| 9,645,575 B2 | 5/2017 | Watson |
| 9,665,843 B2 | 5/2017 | Smiley et al. |
| 9,691,104 B2 | 6/2017 | Ghosh et al. |
| 9,697,469 B2 | 7/2017 | McMahon et al. |
| 9,700,207 B2 | 7/2017 | Ji et al. |
| 9,754,282 B2 | 9/2017 | Ferber et al. |
| 9,769,260 B2 | 9/2017 | Klose et al. |
| 9,778,881 B2 | 10/2017 | Romanovskiy |
| 9,779,035 B1 | 10/2017 | Patiejunas |
| 9,779,187 B1 | 10/2017 | Gao et al. |
| 9,792,298 B1 | 10/2017 | Taylor et al. |
| 9,804,930 B2 | 10/2017 | Vijayan et al. |
| 9,811,423 B2 | 11/2017 | Vijayan et al. |
| 9,811,546 B1 | 11/2017 | Bent et al. |
| 9,817,832 B1 | 11/2017 | Protopopov et al. |
| 9,824,108 B2 | 11/2017 | Taylor et al. |
| 9,846,620 B2 | 12/2017 | Kumarasamy et al. |
| 9,858,013 B1 | 1/2018 | Srivastav et al. |
| 9,864,527 B1 | 1/2018 | Srivastav et al. |
| 9,864,753 B1 | 1/2018 | Armangau et al. |
| 9,864,874 B1 | 1/2018 | Shanbhag et al. |
| 9,866,634 B1 | 1/2018 | Choy et al. |
| 9,870,569 B1 | 1/2018 | Doms |
| 9,874,915 B2 | 1/2018 | Frick |
| 9,875,031 B2 | 1/2018 | Horn |
| 9,880,759 B2 | 1/2018 | Goebel et al. |
| 9,894,132 B2 | 2/2018 | Shin |
| 9,898,734 B2 | 2/2018 | Ren et al. |
| 9,953,331 B2 | 4/2018 | Yaseen et al. |
| 9,984,203 B2 | 5/2018 | Westin et al. |
| 10,002,049 B2 | 6/2018 | Butterworth et al. |
| 10,026,051 B2 | 7/2018 | Madison et al. |
| 10,031,675 B1 | 7/2018 | Veprinsky et al. |
| 10,031,918 B2 | 7/2018 | Change et al. |
| 10,037,303 B2 | 7/2018 | Nixon et al. |

(56) References Cited

U.S. PATENT DOCUMENTS

| | | |
|---|---|---|
| 10,043,318 B2 | 8/2018 | Suvorov |
| 2001/0009590 A1 | 7/2001 | Holm |
| 2001/0034686 A1 | 10/2001 | Eder |
| 2001/0041995 A1 | 11/2001 | Eder |
| 2001/0041996 A1 | 11/2001 | Eder |
| 2002/0046143 A1 | 4/2002 | Eder |
| 2002/0097245 A1 | 7/2002 | Jeong et al. |
| 2003/0028267 A1 | 2/2003 | Hales et al. |
| 2003/0115090 A1 | 6/2003 | Mujtaba et al. |
| 2004/0088239 A1 | 5/2004 | Eder |
| 2004/0172319 A1 | 9/2004 | Eder |
| 2004/0193503 A1 | 9/2004 | Eder |
| 2004/0199445 A1 | 10/2004 | Eder |
| 2004/0215495 A1 | 10/2004 | Eder |
| 2004/0215522 A1 | 10/2004 | Eder |
| 2004/0225629 A1 | 11/2004 | Eder |
| 2004/0236621 A1 | 11/2004 | Eder |
| 2004/0236673 A1 | 11/2004 | Eder |
| 2005/0071266 A1 | 3/2005 | Eder |
| 2005/0119900 A1 | 6/2005 | Eder |
| 2005/0119919 A1 | 6/2005 | Eder |
| 2005/0119922 A1 | 6/2005 | Eder |
| 2005/0119959 A1 | 6/2005 | Eder |
| 2005/0251468 A1 | 11/2005 | Eder |
| 2006/0143115 A1 | 6/2006 | Eder |
| 2006/0184449 A1 | 8/2006 | Eder |

OTHER PUBLICATIONS

Erich Luening; "Coalition accepts Microsoft-based "metadata" standard"; Jul. 19, 1999; pp. 1-4.*
Business Wire; "Metadata Coalition ratifies industry's first standard metadata interchange specification"; Jul. 22, 1996; pp. 1-3.*
Satya Sachdeve; Information Management Magazine; "Meta Data Architecture for Data Warehousing"; Apr. 1998; pp. 1-8.*
T. Genovese, Microsoft and B. Jennings, Sandia National Laboratory;"A Common Schema for the Internet White Pages Service"; Oct. 1997; pp. 1-8.*
W3C, Note:-xml-ql—Aug. 19, 1998, XML-QL: A Query Language for XML, Submission to the World Wide Web Consortium Aug. 19, 1998.*
Zipp, Alan S.; Business valuation methods; 1993, AICPA.
Davidow, William; Accounting systems are completely wrong, Jan. 1995,Red Herring.
McTaggert, James, Kontes, Peter and Mankins, Michael, The value imperative, 1994,The Free Press.
Rappaport, Alfred; Creating shareholder value; 1986, The Free Press.
Ritchken, Peter, Options, Theory, Strategy and Applications, 1987, Foresman and Company.
Dixit, Avinash & Pindyck, Robert; Investment under uncertainty; 1994; Princeton University Press.
Garson, David; Interpreting neural network connection weights, Apr. 1, 1991, AI Expert.
Wellstead, Stephen; Neural network and fuzzy logic applications in C/C++; 1994; John Wiley & Sons.
Most, Kenneth; Accounting theory; 1977,Grid, Inc.
Hendriksen, Elden, Accounting theory, 1982, Richard D. Irwin.
Kulkarni, Arun; Artificial neural networks for image understanding; Jan. 1, 1994; Van Norstrand Reinhold.
Ward Systems Group; NeuroWindows User Manual; 1993; Wards Systems Group.
Brealey, Richard & Myers, Stewart; Principles of Corporate Finance; 1991; McGraw Hill.
Faulkner, Terrence; Applying options thinking to R&D valuation; May 1, 1996; Research Technology Manage.
Miller, Merton & Modigliani, Franco, Dividend policy, growth and the valuation of shares, Oct. 1, 1961.
Simensky, Melvin & Bryer, Lanning; The new role of intellectual property in commercial transactions.

Wilson, Albert, Emerging approaches to impaired property valuation, Apr. 1, 1996, Appraisal Journal, v64.
Brown, Gordon T, Free cash flow appraisal, a better way, Apr. 1, 1996, Appraisal Journal, V64, No. 2.
Business Editors & Real Estate Industry Writers, EQK Realty Investors I, Apr. 2, 1992, Press Release.
Swad, Randy, Business valuation, applicable standards for CPA's, Sep. 1, 1995, CPA Journal v65, No. 9.
Reilly, Robert; Valuation of intangibles for bankruptcy and reorganization purposes; Aug. 1, 1994; Ohio.
Liebich, Kim; How to value a bank; Aug. 1, 1995; ABA Banking Journal.
Baumann, Barbara H & Oxaal, Marjorie R; Estimating the value of a group medical practice, a primer.
Maxson, Mark; Will you get your money's worth?, May 1, 1993, Financial Executive.
Friedman, Richard; Business valuation: calculating it right; Oct. 1, 1994; Practical Accountant.
Mullen, Maggie; How to value intangibles; Nov. 1, 1993; Accountancy.
Stewart, Thomas; Trying to grasp the intangible; Oct. 2, 1995 Fortune.
Ourosoff, Alexandra; What the world's top brands are worth; Sep. 1, 1992; Finance World.
Phillips Business Information, Inc.; Five ways to reduce risk with neural networks; Sep. 27, 1993; Credi.
Lippitt, Jeffrey & Mastracchio, Nicholas, Developing capitalization rates for valuing a business, 11.
Hirsch, A. Ethan, What's it worth?, Dec. 21, 1992, Accounting Today, v6, No. 24, p. 16.
Myers, Stewart & Howe, Christopher; A life-cycle financial model of Pharmaceutical R&D; Apr. 1, 1997;MIT.
Simon, Carol J. & Sullivan, Mary W.; The Measurement and Determinants of Brand Equity; Oct. 1, 1993; Ma.
Sveiby, Karl Erik & Mellander, Klas; Tango Learning Guide Version 2.1; 1994; Celemi.
Kaufman, J. Jerry; Value Management; 1998; Crisp.
HBS Press; Measuring Corporate Performance; 1998; HBS Press.
Kaplan, Robert & Norton, David; The Balanced Scorecard; 1996; HBS Press.
Morris, Henry; Extending the Business Process, Oct. 6, 1998, IDC Presentation.
Amir, Eli; & Lev, Baruch, "Value-relevance of non-financial Information" Journal of Accounting and.
Ernst & Young, "Measures that Matter", 1997.
Anonymous, "Survey: Too Clever by Half", The Economist, Jan. 24, 2004.
Siegel, Jeremy, "The Noisy Market Hypothesis", Dow Jones, Jun. 14, 2006.
Farquhar, Peter, et al, "Recognizing and measuring brand assets", Market Science Institute, Jan. 1, 1989.
Everest, Gordon, Database Management Systems,McGraw Hill, 1986.
Mauboussin, Michael, "Get Real", CSFB, Jun. 23, 1999.
Barua, Anitesh; "The Calculus of Reengineering", University of Mass., Aug. 1, 1994.
Hayes, Rober & Abernathy, William, "Managing our way to economic decline", HBR, Jul. 1, 1980.
Widom, Jennifer; "Data management for xml: research directions", IEEE, Jul. 1, 1999.
Quinn, James Brian, Intelligent Enterprise, The Free Press, 1992.
Brewka, Gerhard, Principles of knowledge representation, CSLI Publications, 1994.
Fowler, Martin, Analysis patterns, Addison Wesley, 1997.
Appraisal Standards Board, "Uniform standards of professional appraisal practice", 1997.
Goldfarb, Charles, Xml Handbook, Prentice Hall, 1998.
Dowd, Kevin, Beyond Value at Risk, John Wiley & Sons, 1998.
Wall, Matthew, "Introduction to Genetic Algorithms", MIT, Aug. 31, 2006.
Bouquet, Paolo et al, Modeling and using context—Context 99, Springer, Sep. 9, 1999.

(56) References Cited

OTHER PUBLICATIONS

Mehrdad, Baghai et al, "Alchemy of Growth", Perseus, Mar. 1, 1999.
Deloitte, Valuing Intangible Assets, Jan. 2006.
Kim, Jinwoo and Ziegler, Bernard, "Hierarchical Distributed Genetic Algorithms: A Fuzzy Logic Controller Design Application", IEEE Expert, pp. 76-84, 1996, USA.
Kim, Jinwoo, "Hierarchical asynchronous genetic algorithms for paraellel/distributed simulation based optimization", pp. 1-186, University of Arizona, 1994, USA.
Jang, Jhy-Shing Roger, "Adaptive Network Based Fuzzy Inference System", IEEE Transactions Systems, Man, Cybernetics, p. 665-685, 1993, USA.
Cusanza, Gregory, Declaration under Rule 132 for U.S. Appl. No. 09/764,068, pp. 1-4, Apr. 28, 2009.
Zweig, Jason, "Does stock market data really go back 200 years?", Wall Street Journal, Jul. 11, 2009, p. B1, Dow Jones, U.S.A.
Halford, Graeme et al,"Separating Cognitive Capacity from Knowledge", Trends in Cognitive Science, Jun. 2007, pp. 236-242, Cell Press, U.S.A.
Economist, "Efficiency and beyond", Economist, Jul. 18, 2009, pp. 68-69, Economist Group, U.K.
Free Patents Online, search for patents with claims containing "as required", Jul. 22, 2009.
Parker, Brandi, "Office Action for U.S. Appl. No. 10/166,758", dated Apr. 9, 2009, pp. 1-27, U.S.P.T.O., U.S.A.
Weisberger, Richard, "Notice of Allowance for U.S. Appl. No. 10/025,794", dated Feb. 23, 2010, pp. 1-6, U.S.P.T.O., U.S.A.
Cusanza, Gregory, "Declaration under Rule 132 for U.S. Appl. No. 09/764,068", filed Apr. 28, 2009, pp. 1-4, U.S.A.
Link, Jonathan, "Petition for relief for U.S. Appl. No. 11/360,087", filed Jan. 7, 2011, pp. 1-89, Kilpatrick Townsend, U.S.A.
Chencinski, Siegfried, "Office communication for U.S. Appl. No. 10/743,417", dated Sep. 30, 2010, pp. 1-17, U.S.P.T.O., USA.
Schulze, Mark; "Linear Programming for Optimization", 1998; pp. 1-8; Perceptive Scientific Instruments, USA.
Smith, Cole et al, "A Tutorial Guide to Mixed-Integer Programming Models and Solution Techniques", 2007, pp. 1-23, Univeristy of Florida, USA.
Heching, Aliza; and King, Alan; "Financial Engineering"; Operations research and management science handbook, pp. 21-1 through 21-37; 2008, CRC Press, USA.
Link, Jonathan, "Addendum to petition for relief for U.S. Appl. No. 11/360,087", filed Mar. 1, 2011, pp. 1-10, Kilpatrick Townsend, U.S.A.
Eppen, Gary; Martin, R.; Schrage, Linus, "A Scenario Approach to Capacity Planning", Operations Research, vol. 37, No. 4, Jul. 1989, pp. 517-527.
Stein, Jeremy et al, "A comparables approach to measuring cash flow at risk for non financial firms", Journal of Applied Corporate Finance, Winter 2001, pp. 100-109.
Hodder, J., "Financial Market Approaches to Facility Location under Uncertainty", Operations Research, vol. 32, pp. 1374-1380, 1984.
Hodder, J., et al., "A Simple Plant-Location Model for Quantity Setting Firms Subject to Price Uncertainty", European Journal of Operational Research; Amsterdam, vol. 21, pp. 39-46, 1985.
Bradley, Stepehen; Hax, Arnoldo; Magnanti, Thomas; "Applied Mathematical Programming", pp. 227-271, 1977, Addison Wesley, USA.
Zomaya, Albert; Kazman, Rick, "Simulated Annealing Techniques," Algorithms and theory of computation handbook, pp. 33-1 to 33-18, 2010, CRC Press, USA.
Morris, Cohen, Fisher, Marshall, Ramchadran, Jaikumar; "Managing International Manufacturing", pp. 67-93, 1989, Elsevier, USA.
Care, Algo; Garatti, Simone et al, "Data-driven optimization through the scenario approach", pp. 1-12, Sep. 2010, University of Brescia, Italy.
Jensen, Paul and Bard, Jonathan, Operations Research Models and Methods, pp. A1-A6, John Wiley and Sons, 2003.

Owens, Terry J; Lorin, Hubert C.; and Fetting, Anton, "Decision on Appeal 2009-012839, U.S. Appl. No. 09/688,983", filed Mar. 16, 2011; pp. 1-18, U.S.P.T.O., USA.
Rockefeller, R.T., Wets, Roger, "Scenario and policy aggregation in optimization under uncertainty", Mathematics of Operation Research, pp. 119-147, 1991, USA.
Mulvey, John and Andrzej Ruszczynski "A New Scenario Decomposition Method for Large-Scale Stochastic Optimization" Operations Research, vol. 43 (1995), No. 3, p. 477-490, USA.
Kon, Stanley and Jen, Frank, "The Investment Performance of Mutual Funds", The Journal of Business, vol. 52, No. 2 (Apr. 1979), pp. 263-289, USA.
Ippolito, Richard, on Studies of Mutual Fund Performance, 1962-1991, Financial Analysts Journal, vol. 49, No. 1 (Jan.-Feb. 1993), pp. 42-50, USA.
Treynor, Jack and Mazuy, Kay, "Can Mutual Funds Outguess the Market?", Harvard Business Review, Jul.-Aug. 1996, pp. 131-136, USA.
Link, Jonathan, "Addendum to petition for relief for U.S. Appl. No. 11/360,087", filed Aug. 31, 2011, pp. 1-52, Kilpatrick Townsend, U.S.A.
Rhodes, Jason, "Re: redacted email chain", Birch Stewart Kolasch and Birch, U.S.A.
"U.S. Appl. No. 09/421,553", U.S.P.T.O., USA.
Bennett, BJ, "Request for reconsideration of petition under 37 CFR 1.182", pp. 1-85, Oct. 21, 2012, Asset Reliance, Inc., U.S.A.
Reynolds, Deborah, "TC 1600 New Matter Training", pp. 1-56, Oct. 2005, U.S.P.T.O., USA.
Rauenzahn, Rick, "Declaration under Rule 132 for U.S. Appl. No. 09/688,983, U.S. Appl. No. 09/940,450, U.S. Appl. No. 13/548,095, U.S. Appl. No. 13/684,471 & U.S. Appl. No. 13,740,223", pp. 1-10, filed May 17, 2013, Asset Reliance, Inc., U.S.A.
Rauenzahn, Rick, "Declaration under Rule 132 for U.S. Appl. No. 10/750,792, U.S. Appl. No. 11/360,087, U.S. Appl. No. 12/684,954 & U.S. Appl. No. 12/910,829", pp. 1-6, filed Jul. 7, 2013, Asset Reliance, Inc., U.S.A.
Plager, J., "In re Schrader," pp. 1-9, Apr. 13, 1994, U.S. Court of Appeals Federal Circuit, U.S.A.
Kuritzkes, Andrew; Schuermann, Til, "What we know, don't know and can't know about bank risk", Feb. 23, 2006, pp. 1-59, Federal Reserve, U.S.A.
SAS, "How can we price our insurance products more accurately", 2011, pp. 1-2, SAS Institute, Inc., U.S.A.
Senior Supervisors Group, "Risk management lessons from the global banking crisis of 2008", Oct. 21, 2009, p. 15, Senior Supervisors Group, Switzerland.
Finnegan, Hendersin, Farabow, Garrett & Dunner, LLP, "Patrick J. Coyne Biography", May 13, 2015, pp. 1-3, Finnegan, U.S.A.
Elston, Stephen, "Declaration under Rule 132 for U.S. Appl. No. 13/517,631", pp. 1-2, filed Apr. 13, 2015, Dr. Stephen Elston, U.S.A.
Free Patents on Line, "Search Report score or scoring claims since Jul. 1, 2014", dated Nov. 16, 2015, pp. 1-6, Free Patents on Line, USA.
Free Patents on Line, "Search Report scoring focus since Jul. 1, 2014", dated Nov. 16, 2015, p. 1-7, Free Patents on Line, USA.
Free Patents on Line, "Search Report predictive model claims since Jul. 1, 2014", dated Nov. 16, 2015, pp. 1-6, Free Patents on Line, USA.
Free Patents on Line, "Search Report predictive model focus since Jul. 1, 2014", dated Nov. 16, 2015, pp. 1-5, Free Patents on Line, USA.
Free Patents on Line, "Search Report context focus since Jul. 1, 2014", dated Nov. 16, 2015, pp. 1-6, Free Patents on Line, USA.
Free Patents on Line, "Search Report context claims since Jul. 1, 2014", dated Nov. 16, 2015, pp. 1-7, Free Patents on Line, USA.
Elston, Stephen, "Declaration under Rule 132 for U.S. Appl. No. 13/548,104", pp. 1-12, filed Nov. 20, 2015, Dr. Stephen Elston, U.S.A.
Elston, Stephen, "Declaration under Rule 132 for U.S. Appl. No. 13/557,836", pp. 1-12, filed Nov. 20, 2015, Dr. Stephen Elston, U.S.A.

(56) References Cited

OTHER PUBLICATIONS

Electronic Frontier Foundation, "Comments on 2014 Interim Guidance on Patent Subject Matter Eligibility", pp. 1-8, Mar. 16, 2015, EFF, U.S.A.
Grabowski, Roger, "Calculating the Cost of Capital Matching Risk and Return", pp. 1-9, Apr. 7, 2015, Duff and Phelps, U.S.A.
Gaudry, Kate, "The demise of SAWS and the power of public attention", pp. 1-6, Mar. 23, 2015, Portfolio Media, Inc., U.S.A.
Zito, Joseph, et al, "Evideo Owners and Mauro Didomenico, individually and on behalf of class v. USA", pp. 1-17, Apr. 24, 2015, Ditthavong & Steiner, U.S.A.
Byrne, Alistair; Winter, Natalie; "Living with longetivy", Pensions, 2009, pp. 115-127, vol. 14, Issue 2, Palgrave, U.K.
USPTO, "Electronic Acknowledgement Receipt 2056896", Oct. 31, 2014, pp. 1 and 2, USPTO, USA.
USPTO, "Electronic Acknowledgement Receipt 21103322", Dec. 31, 2014, pp. 1 and 2, USPTO, USA.
Lastra, Daniel, "Office Action U.S. Appl. No. 12/910,829", dated Feb. 10, 2015, pp. 1 to 6, USPTO, USA.
McCaffrey, Michael, "An Introdution to Swaps", Investopedia, pp. 1-3, 2007, Investopedia, USA.
Chicago Mercantile Exchange, "Cleared OTC Interest Rate Swaps", pp. 1-3, 2015, CME, USA.
Free Patents on Line, "Search Report predictive model since Jul. 1, 2014", dated Mar. 1, 2015, pp. 1-4, Free Patents on Line, USA.
Free Patents on Line, "Search Report U.S. Pat. No. 6,651,053 cited", dated Feb. 8, 2015, pp. 1 & 2, Free Patents on Line, USA.
Free Patents on Line, "Search Report U.S. Pat. No. 6,651,053 cluster", dated Feb. 8, 2015, pp. 1-4, Free Patents on Line, USA.
Free Patents on Line, "Search Report U.S. Pat. No. 6,633,846 cited", dated Feb. 8, 2015, p. 1, Free Patents on Line, USA.
Free Patents on Line, "Search Report U.S. Pat. No. 6,633,846 cluster", dated Feb. 8, 2015, pp. 1-4, Free Patents on Line, USA.
Free Patents on Line, "Search Report U.S. Pat. No. 6,633,636 cited", dated Feb. 8, 2015, p. 1, Free Patents on Line, USA.
Free Patents on Line, "Search Report U.S. Pat. No. 6,633,636 cluster", dated Feb. 8, 2015, pp. 1-7, Free Patents on Line, USA.
Free Patents on Line, "Search Report U.S. Pat. No. 6,625,445 cited", dated Feb. 8, 2015, p. 1, Free Patents on Line, USA.
Free Patents on Line, "Search Report U.S. Pat. No. 6,625,445 cluster", dated Feb. 8, 2015, pp. 1-6, Free Patents on Line, USA.
Free Patents on Line, "Search Report U.S. Pat. No. 6,510,235 cited", dated Feb. 8, 2015, pp. 1 & 2, Free Patents on Line, USA.
Free Patents on Line, "Search Report U.S. Pat. No. 6,510,235 cluster", dated Feb. 8, 2015, pp. 1-4, Free Patents on Line, USA.
Ellerman, David, "The Arrow-Debreu Model: How math can hide a fatal conceptual error", pp. 33-48, Spring, 2000, Forum for Social Economics, U.S.A.
Teknomo, Kardi,"What is Monte Carlo Simulation?", pp. 1-2, 2006, Revoledu.com website, U.S.A.
Eder, Jeff, "Brief on Appeal U.S. Appl. No. 10/025,794", pp. 1-57, filed Jan. 7, 2015, Kantrack LLC, U.S.A.
Eder, Jeff, "Brief on Appeal U.S. Appl. No. 12/910,829", pp. 1-178, filed Dec. 31, 2014, Kantrack LLC, U.S.A.
Free Patents on Line, "Search Report risk and model since Jul. 1, 2014", dated Nov. 25, 2014, pp. 1-3, Free Patents on Line, USA.
Free Patents on Line, "Search Report underlying measure", dated Jan. 30, 2015, p. 1, Free Patents on Line, USA.
Free Patents on Line, "Search Report value at risk", dated Jan. 30, 2015, p. 1, Free Patents on Line, USA.
O'Reilly Media, "Dr. Stephen Elston Biography", p. 1, 2015, O'Reilly Media, U.S.A.
Elston, Stephen, "Declaration under Rule 132 for U.S. Appl. No. 13/517,631", pp. 1-11, filed Feb. 6, 2015, Dr. Stephen Elston, U.S.A.
Longitude LLC, "Landing Page, Longitude.com", pp. 1-2, Feb. 4, 2015, Longitude LLC, U.K.
Free Patents on Line, "Search Report markush groups and "and combinations thereof"", dated Jan. 13, 2015, pp. 1-6, Free Patents on Line, USA.

Free Patents on Line, "Search Report "swaps, derivatives or insurance since Jul. 1, 2015"", dated Feb. 11, 2015, pp. 1-4, Free Patents on Line, USA.
Free Patents on Line, "Search Report transform data", dated Jan. 18, 2015, pp. 1-4, Free Patents on Line, USA.
Free Patents on Line, "Search Report customer and "score of scoring" after Pliha", dated Feb. 3, 2015, pp. 1-4, Free Patents on Line, USA.
Free Patents on Line, "Search Report customer and "score of scoring" citing Pliha", dated Feb. 3, 2015, p. 1, Free Patents on Line, USA.
Free Patents on Line, "Search Report swaption", dated Feb. 9, 2015, pp. 1-3, Free Patents on Line, USA.
Free Patents on Line, "Search Report risk and volatility", dated Feb. 3, 2015, pp. 1-4, Free Patents on Line, USA.
Free Patents on Line, "Search Report risk and contingent liability", dated Feb. 3, 2015, pp. 1-2, Free Patents on Line, USA.
Free Patents on Line, "Search Report risk and variability", dated Feb. 3, 2015, pp. 1-3, Free Patents on Line, USA.
Free Patents on Line, "Search Report event risk", dated Feb. 3, 2015, pp. 1-2, Free Patents on Line, USA.
Brinckerhoff, Courtenay, "Federal Circuit Schools USPTO on Broadest Reasonable Claim Construction", Oct. 3, 2017, pp. 1-4, Foley Lardner, USA.
Free Patents Online, "Search for 'context' & 'data' in claims", Dec. 15, 2017, pp. 1-6, Free Patents Online, USA.
Free Patents Online, "Search for 'context' & 'data' in claims citing 20040225629", Dec. 15, 2017, p. 1, Free Patents Online, USA.
Free Patents on Line, "Search Report "electronic database" since Jun. 20, 2014", dated Mar. 7, 2018, pp. 1-7, Free Patents on Line, USA.
Free Patents on Line, "Search Report "electronic network" since Jun. 20, 2014", dated Mar. 7, 2018, pp. 1-7, Free Patents on Line, USA.
Free Patents on Line, "Search Report "electronic offer" since Jun. 20, 2014", dated Mar. 7, 2018, pp. 1-2, Free Patents on Line, USA.
Free Patents on Line, "Search Report "electronic payment" since Jun. 20, 2014", dated Mar. 7, 2018, pp. 1-7, Free Patents on Line, USA.
Free Patents on Line, "Search Report "electronic sensor" since Jun. 20, 2014", dated Mar. 7, 2018, pp. 1-7, Free Patents on Line, USA.
Shore, Michael, "How Google and Big Tech Killed the U.S. Patent System", Mar. 21, 2018, pp. 1-8, IP Watchdog, USA.
Brown, Thomas, Shuford, Emir, "Quantifying Uncertainty Into Numerical Probabilities for The Reporting of Intelligence", Jul. 1973, pp. 1-58, RAND, USA.
Quinn, Gene, "USPTO admits to stacking PTAB panels to achieve desired outcomes", Aug. 23, 2017, pp. 1-9, IP Watchdog, USA.
USPTO Training Material, "Claim Interpretation: Broadest Reasonable Interpretation (BRI) and the Plain Meaning of Claim Terms", pp. 1-22, USPTO, USA.
Fitzpatrick, Brian Casey, "Amendment submitted with RCE for U.S. Appl. No. 13/551,578", dated Jul. 18, 2016, pp. 1-31, COJK, USA.
Tu, Sean, "Luck/Unluck of the Draw: An Empirical Study of Examiner Allowance Rates", 2012, pp. 1-45, Stanford Techology Law Review, Stanford University, USA.
General Accounting Office, "Patent Office Should Define Quality, Reassess Incentives and Improve Clarity", Jun. 2016, pp. 1-59, GAO, USA.
Rauenzahn, Dr. Rick, "Declaration under rule 132 for U.S. Appl. No. 09/688,983, etc.", filed May 17, 2013, pp. 1-10, Dr. Rauenzahn, USA.
Quinn, Gene, "Is there a systematic denail of due process at the USPTO", Feb. 26, 2012, pp. 1-7, IP Watchdog, USA.
Brachmen, Steven & Quinn, Gene "Are more than 90% of patents challenged at the PTAB defective?", Jun. 14, 2017, pp. 1-6, IP Watchdog, USA.
Rose, Merideth, et al., "Captured: Sytemic Bias in the U.S. Copyright Office," Sep. 8, 2016, pp. 1-50, Public Knowledge, USA.
Eberly College of Science, "Highly Correlated Predictors", 2018, pp. 1-13, Penn State University, USA.

(56) References Cited

OTHER PUBLICATIONS

Free Patents Online, "Search for claims with predictive model term", Oct. 25, 2018, pp. 1-7, Free Patents Online, USA.
Eder, Jeff, "Amendment & Reply for U.S. Appl. No. 13/557,836", dated Dec. 3, 2018, pp. 1-77, Jeff Eder, USA.
MCAM International, "Intellectual Property Quality Enforcement Analysis—U.S. Steel", May 2, 2018, pp. 1-6, MCAM International, USA.
Free Patents on Line, "Search Report electronic wallet", dated Aug. 4, 2018, pp. 1-6, Free Patents on Line, USA.
Free Patents on Line, "Search Report electronic transaction since Jun. 20, 2014", dated May 30, 2018, pp. 1-6, Free Patents on Line, USA.
Free Patents on Line, "Search Report electronic transaction" dated May 30, 2018, pp. 1-6, Free Patents on Line, USA.
Eder, Jeff, "Brief on Appeal, U.S. Appl. No. 13/557,836", filed Aug. 1, 2018, pp. 1 to 140, Jeff Eder, USA.
MCAM International, "Intellectual Property Quality Enforcement Analysis—Eli Lilly", Apr. 26, 2018, pp. 1-27, MCAM International, USA.
Eder, Jeffrey "Generic Computer Disclosures", Aug. 20, 2019, p. 1, Jeffrey Eder, Mill Creek, WA, USA.
MCAM International, "Intellectual Property Quality Enforcement Analysis—Astra Zeneca", Apr. 17, 2018, pp. 1-7, MCAM International, USA.
Schechter, Asher, "Capture is Everywhere—It Happens at the Highest Levels in Our Democracy", Mar. 7, 2016, pp. 1 to 18, University of Chicago, USA.
Doerre, Jeremy & Boundy, David, "Berkheimer, the APA and PTO Motions to Vacate PTAB 101 Decisions", Jul. 16, 2018, pp. 1 to 6, IP Watchdog, USA.
Quinn, Gene, "Structual Biasat the PTAB: No Dissent Desired", Jun. 6, 2018, pp. 1 to 4, IP Watchdog, USA.
Eder, Jeff, "Brief on Appeal, U.S. Appl. No. 13/548,104", filed Jul. 15, 2018, pp. 1 to 133, Jeff Eder, USA.
MCAM International, "Intellectual Property Quality Enforcement Analysis—Koch", Apr. 18, 2018, pp. 1-24, MCAM International, USA.
Christen, Peter, "Automatic record linkage using seeded nearest neighbor and svm classification", KDD 2008—Las Vegas, pp. 1-9, ACM, USA.
Newcombe, H.B.,Kennedy, J.M.,Axford, S.J., James, A.P. ,"Automatic linkage of vital records", Science, Oct. 16, 1959, pp. 954-959, AAAS, USA.
Padmanaban, M., Bhuvaneswari, T., "An approach based on ANN for Data Dedupiication", Journal of Computer Science & IT, pp. 4637-4644, USA.
Eder, Jeffrey, "Amendment/Reply for U.S. Appl. No. 12/910,829", dated Jun. 15, 2019, pp. 1-37, Jeffrey Eder, Mill Creek, WA, USA.
Free Patents Online, "Search for patents with claims for predictive model", Feb. 16, 2020, pp. 1-6, Free Patents Online, USA.
Free Patents Online, "Search for patents with claims for predictive model and normalize", Feb. 17, 2020, pp. 1-7, Free Patents Online, USA.
Free Patents Online, "Search for patents with claims for predictive model and normalize by Eder", Feb. 3, 2020, pp. 1-2, Free Patents Online, USA.
U.S. Appl. No. 08/999,245, filed Dec. 10, 1997.
Quinn, Gene, "The PTAB is a thoroughly broken tribunal incapable of being fixed", Feb. 12, 2017, pp. 1-7, IP Watchdog, USA.
Quinn, Gene, "USPTO response to FOIA confirms there are no rules of judicial conduct for PTAB judges", May 31, 2017, pp. 1-7, IP Watchdog, USA.
Quinn, Gene, "Misleading PTO statistics hide a hopelessly broken PTAB", Sep. 6, 2016, pp. 1-9, IP Watchdog, USA.
Office of Inspector General, "Analysis of Patent Examiner Time and Attendance", Aug. 2016, pp. 1-44, US Dept. Commerce, USA.
Koller, Timothy, "What is value based management", McKinsey Quarterly, 1994, No. 3.
Brown, Carol; Coakley, James; Phillips, Mary Ellen,Neural Networks Enter World of Mgmt Accounting.
Bielinski, Daniel, "How to sort out the premium drivers of post deal value", Mergers & Acquisitions.
Bergstrom, Peter; Kimber Eliot, "Formal data models for SGML and HyTime", SGML, Mar. 1999, electrum.
Harold, Elliotte, XML Bible, IDG Books, 1999.
Knight, James, Value Based Management, McGraw Hill, 1998.
NeuroSolutions, Application Summaries.
Copeland, Tom, Koller, Tim, Murrin, Jack, Valuation, John Wiley and Sons, 1994.
Brown, Carolyn, Phillips, Mary Ellen, Expert Systems for Management Accounting Tasks, IMA Foundation.

\* cited by examiner

AUTOMATED DATA STORAGE SYSTEM

This application is a continuation of application Ser. No. 09/421,553, filed Oct. 20, 1999. Application Ser. No. 09/421,553 was a continuation-in-part of application Ser. No. 09/358,969, filed Jul. 22, 1999, of application Ser. No. 09/295,337, filed Apr. 21, 1999, application Ser. No. 09/293,336, filed Apr. 16, 1999, application Ser. No. 09/135,983 filed Aug. 17, 1998, application Ser. No. 08/999,245, filed Dec. 10, 1997 and application Ser. No. 08/779,109, filed Jan. 6, 1997 which are incorporated herein by reference. The subject matter of this application is also related to the subject matter of U.S. Pat. No. 5,615,109 for "Method of and System for Generating Feasible, Profit Maximizing Requisition Sets", by Jeff S. Eder, the disclosure of which is also incorporated herein by reference.

BACKGROUND OF THE INVENTION

This invention relates to a method of and system for business valuation, more particularly, to an automated system that identifies, evaluates and helps improve the management of the categories of value for a value chain and for each enterprise in the value chain on a continual basis.

The internet has had many profound effects on global commerce. The dramatic increase in the use of email, the explosion of e-commerce and the meteoric rise in the market value of internet firms like eBay, Amazon.com and Yahoo! are some of the more visible examples of the impact it has had on the American economy. Another impact of the internet has been that it has enabled the "virtual integration" of companies in different locations and different industries. Companies can now join together in a matter of days with essentially no investment to form a "virtual value chain" for delivering products and services to consumers.

The virtual value chain may appear to the consumer as a single entity, when in reality a number of enterprises from different continents have joined together to complete the preparation and delivery of the good or service that is ultimately being purchased. Virtual value chains allow each firm in the value chain to focus on their own specialty, be it manufacturing, design, distribution or marketing while reaping the benefits of the increased scale and scope inherent in the alliance. Enabled by the low cost communication capability provided by the internet, the virtual value chain is really just an extreme form of a phenomenon that has been sweeping American industry for many years—the electronic linkage of businesses.

Despite the widespread accceptance and use of "virtual value chains" as a mechanism for efficiently and effectively responding to customer demands, there is no known method or system for systematically evaluating the value of these new types of organizations. In a similar manner there is no known method or system for evaluating the contribution of the different enterprises in the "virtual value chain".

The need for a systematic approach for evaluating "virtual value chains" is just part of a larger need that has recently appeared for a new method for systematically evaluating the financial performance of a commercial business. The need for a new approach has been highlighted in the past two years by the multi-billion dollar valuations being placed on internet companies like Amazon.com, E trade and eBay that have never earned a dollar of profit and that have no prospect of earning a dollar of profit any time soon. The most popular traditional approaches to valuation are all based on some multiple of accounting earnings (a price to earnings ratio or P/E ratio)—with no corporate earnings in the past or the foreseeable future—these methods are of course useless in evaluating the new companies.

The inability of traditional methods to provide a framework for analyzing "virtual value chains" and internet firms are just two glaring examples of the weakness of traditional financial systems. Numerous academic studies have demonstrated that accounting earnings don't fully explain changes in company valuations and the movement of stock prices. Many feel that because of this traditional accounting systems are driving information-age managers to make the wrong decisions and the wrong investments. Accounting systems are "wrong" for one simple reason, they track tangible assets while ignoring intangible assets. Intangible assets such as the skills of the workers, intellectual property, business infrastructure, databases, and relationships with customers and suppliers are not measured with current accounting systems. This oversight is critical because in the present economy the success of an enterprise is determined more by its ability to use its intangible assets than by its ability to amass and control the physical ones that are tracked by traditional accounting systems.

Consultants from McKinsey & Company recently completed a three year study of companies in 10 industry segments in 12 countries that confirmed the importance of intangible assets as enablers of new business expansion and profitable growth. The results of the study, published in the book *The Alchemy of Growth*, revealed three common characteristics of the most successful businesses in today's economy:

1. They consistently utilize "soft" or intangible assets like brand names, customers and employees to support business expansion;
2. They systematically generate and harvest real options for growth; and
3. Their management focuses on 3 distinct "horizons"— short term (1-3 years), growth (3-5 years out) and options (beyond 5 years).

The experience of several of the most important companies in the U.S. economy, IBM, General Motors and DEC, in the late 1980's and early 1990's illustrates the problems that can arise when intangible asset information is omitted from corporate financial statements and companies focus only on the short term horizon. All three companies were showing large profits using current accounting systems while their businesses were deteriorating. If they had been forced to take write-offs when the declines in intangible assets were occurring, the problems would have been visible to the market and management would have been forced to act to correct the problems much more quickly than they actually did. These deficiencies of traditional accounting systems are particularly noticeable in high technology companies that are highly valued for their intangible assets and their options to enter growing markets rather than their tangible assets.

The appearance of a new class of software applications, soft asset management applications, is further evidence of the increasing importance of "soft" or intangible assets. Soft asset management applications (or systems) include: alliance management systems, brand management systems, customer relationship management systems, channel management systems, intellectual property management systems, process management systems and vendor management systems. While these systems enhance the day to day management of the individual "soft" assets, there is currently no mechanism for integrating the input from each of these different systems in to an overall organization or enterprise asset management system. As a result, the organization or enterprise can be (and often is) faced with conflicting recommendations as each system tries to optimize the asset it is focused on without considering the overall financial performance of the organization or enterprise.

A number of people have suggested using business valuations in place of traditional financial statements as the basis for measuring and managing financial performance. Unfortunately, using current methods, the valuation of a business is a complex and time-consuming undertaking. Business valuations determine the price that a hypothetical buyer would pay for a business under a given set of circumstances. The volume of business valuations being performed each year is increasing significantly. A leading cause of this growth in volume is the increasing use of mergers and acquisitions as vehicles for corporate growth. Business valuations are frequently used in setting the price for a business that is being bought or sold. Another reason for the growth in the volume of business valuations has been their increasing use in areas other than supporting merger and acquisition transactions. For example, business valuations are now being used by financial institutions to determine the amount of credit that should be extended to a company, by courts in determining litigation settlement amounts and by investors in evaluating the performance of company management.

Income valuations are the most common type of valuation. They are based on the premise that the current value of a business is a function of the future value that an investor can expect to receive from purchasing all or part of the business. In these valuations the expected returns from investing in the business and the risks associated with receiving the expected returns are evaluated by the appraiser. The appraiser then determines the value whereby a hypothetical buyer would receive a sufficient return on the investment to compensate the buyer for the risk associated with receiving the expected returns. One difficulty with this method is determining the lenth of time the company is expected to generate the expected returns that drive the valuation. Most income valuations use an explicit forecast of returns for some period, usually 3 to 5 years, combined with a "residual". The residual is generally a flat or uniformly growing forecast of future returns that is discounted by some factor to estimate its value on the date of valuation. In some cases the residual is the largest part of the calculated value.

One of the problems inherent in a steady state "residual" forecast is that returns don't continue forever. Economists generally speak of a competitive advantage period or CAP (hereinafter referred to as CAP) during which a given firm is expected to generate positive returns. Under this theory, value is generated only during the CAP. After the CAP ends, value creation goes to zero or turns negative. Another change that has been produced by the internet economy is that the CAP for most businesses is generally thoght to be shrinking with the exception of companies whose products possess network externalities that tie others to the company and its products or services. These latter companies are thought to experience increasing returns as time goes by rather than having a finite CAP. Because the CAP is hard to calculate, it is generally ignored in income valuations however, the simplification of ignoring the CAP greatly reduces the utility of the valuations that are created with large residuals.

When performing a business valuation, the appraiser is generally free to select the valuation type and method (or some combination of the methods) in determining the business value. The usefulness of these valuations is limited because there is no correct answer, there is only the best possible informed guess for any given business valuation. The usefulness of business valuations to business owners and managers is restricted for another reason—valuations typically determine only the value of the business as a whole. To provide information that would be useful in improving the business, the valuation would have to furnish supporting detail that would highlight the value of different categories of value within the business. An operating manager would then be able to use a series of business valuations to identify categories within a business that have been decreasing in value. This information could also be used to help identify corrective action programs and to track the progress that these programs have made in increasing business value. This same information could also be used to identify categories that are contributing to an increase in business value. This information could be used to identify categories where increased levels of investment would have a significant favorable impact on the overall health of the business.

Even when intangible assets have been considered, the limitations in the existing methodology have severely restricted the utility of the valuations that have been produced. All known prior efforts to value intangible assets have been restricted to independent valuations of different types of intangible assets (similar to the individual soft asset management systems discussed previously). Intangible assets that have been valued separately in this manner include: brand names, customers and intellectual property. Problems associated with existing methods for valuing intangible assets include:

1. interactions between the different intangible assets are ignored,
2. the actual impact of the asset on the enterprise isn't measured,
3. the relative strength of the intangible asset within the industry is just as important (and in some cases more important) than any absolute measure of its strength, and
4. there is no systematic way for determining the life of the assets.

Typically, intangible asset valuations also ignore the real options for growth that are intimately inter-related and dependent upon the intangible assets being evaluated. In addition to having a direct influence on the valuation of a given real option the enterprise may possess, intangible assets can affect the market's perception of which company is likely to receive the lions share of future growth in a given industry. This, in turn affects the allocation of industry options to the market price for equity in the enterprise.

The lack of a consistent, well accepted, realistic method for measuring all the categories of business value also prevents some firms from receiving the financing they need to grow. Most banks and lending institutions focus on book value when evaluating the credit worthiness of a business seeking funds. As stated previously, the value of many high technology firms lies primarily in intangible assets and real options that aren't visible under traditional definitions of accounting book value. As a result, these businesses generally aren't eligible to receive capital from traditional lending sources, even though their financial prospects are generally far superior to those of companies with much higher tangible book values.

In light of the preceding discussion, it is clear that it would be advantageous to have an automated financial system that valued all the assets and options for a given organization. Ideally, this system would be capable of generating detailed valuations for businesses in new industries while prioritizing and coordinating the management of the different soft assets that the organization is tracking.

SUMMARY OF THE INVENTION

It is a general object of the present invention to provide a novel and useful system that continuously calculates and displays a comprehensive and accurate valuation for all the categories of value for a virtual organization that overcomes the limitations and drawbacks of the existing art that were described previously.

A preferable object to which the present invention is applied is the valuation and coordinated management of the different categories of value within an organization that consists of two or more commercial enterprises that have come together to form a "virtual value chain" for the purpose of delivering products or services to customers where a large portion of the organization's business value is associated with intangibles and real options.

The present invention also provides the ability to calculate and display a comprehensive and accurate valuation for the categories of value for each commercial enterprise within the virtual value chain. The ability to "drill down" for more detailed analysis extends to each element of value within each enterprise in the "virtual value chain" as illustrated in Table 1.

TABLE 1

| Level | Valuation Categories |
| --- | --- |
| Organization | Current Operation: Assets/Liabilities Current Operation: Enterprise |

TABLE 1-continued

| Level | Valuation Categories |
| --- | --- |
| Enterprise | Contribution & Joint: Real options/Contingent Liabilities Current Operation: Assets/Liabilities Current Operation: Elements of Value Real Options/Contingent Liabilities & Market Sentiment |
| Element of Value | Sub-elements of value |

The present invention eliminates a great deal of time-consuming and expensive effort by automating the extraction of data from the databases, tables, and files of existing computer-based corporate finance, operations, human resource and "soft" asset management system databases as required to operate the system. In accordance with the invention, the automated extraction, aggregation and analysis of data from a variety of existing computer-based systems significantly increases the scale and scope of the analysis that can be completed. The system of the present invention further enhances the efficiency and effectiveness of the business valuation by automating the retrieval, storage and analysis of information useful for valuing categories of value from external databases and publications and the internet. Uncertainty over which method is being used for completing the valuation and the resulting inability to compare different valuations is eliminated by the present invention by consistently utilizing the same set of valuation methodologies for valuing the different categories of organization value as shown in Table 2.

TABLE 2

| Organization Categories of Value | | Valuation methodology |
| --- | --- | --- |
| Total current-operation value (COPTOT): | | Income Valuation |
| Current Operation Assets/Liabilities: | Cash & Marketable Securities (CASH), Inventory (IN), Accounts Receivable (AR), Prepaid Expenses (PE), Other Assets (OA); Accounts Payable (AP), Notes Payable (NP), Other Liabilities (OL) | GAAP for portion of assets/liabilities from each enterprise that are devoted to the organization |
| Curent Operation Assets/Liabilities: | Production Equipment (PEQ), Other Physical Assets (OPA) | Replacement Value for portion of assets from each enterprise that are devoted to the organization |
| Current Operation Enterprise Contribution: | Enterprise contribution to virtual value chain (VVCC) | System calculated value |
| Current Operation Enterprise Contribution: | General going concern element of value (GGCV) | GGCV = COPTOT − CASH − AR − IN − PE − PEQ − OPA − OA − VVCC |
| Real options/Contingent Liabilities | | Real option algorithms + allocation of industry real options based on relative industry position |

*The user also has the option of specifying the total value

The present invention takes a similar approach to enterprise value analysis by consistently utilizing the same set of valuation methodologies for valuing the different categories of enteprise value as shown in Table 3.

TABLE 3

| Enterprise Categories of Value | | Valuation methodology |
| --- | --- | --- |
| Total current-operation value (COPTOT): | | Income Valuation |
| Current-operation Assets/Liabilities: | Cash & Marketable Securities (CASH), Inventory (IN), Accounts Receivable (AR), | GAAP |

TABLE 3-continued

| Enterprise Categories of Value | | Valuation methodology |
|---|---|---|
| | Prepaid Expenses (PE), Other Assets (OA), Accounts Payable (AP), Notes Payable (NP), Other Liabilities (OL) | |
| Current-operation Assets/Liabilities: | Production Equipment (PEQ), Other Physical Assets (OPA) | Replacement Value |
| Current Operation Elements of Value (EV): | Alliances, Brand Names, Channel Partners, Customers, Employees, Industry Factors*, Infrastructure, Intellectual Property, Information Technology, Processes and Vendors | System calculated value |
| Current Operation Element of Value: | General going concern (GCV) | GCV = COPTOT − CASH − AR − IN − PE − PEQ − OPA − OA − ΣEV |
| Real options/Contingent Liabilities | | Real option algorithms + allocation of industry real options based on relative strength of elements of value (EV) |
| Market Sentiment | | Enterprise Market Value − (COPTOT + ΣReal option Values) |

*Note:
Industry Factors (regulation, concentration, etc.) are analyzed like an element of value There is no market sentiment calculation at the organization level because the market value of each enterprise in the organization generally includes non-value chain related activities and the firm level market sentiment for each enterprise can not readily be sub-divided in to value chain and non-value chain sentiment.

The market value of each enterprise in the organization is calculated by adding the market value of all debt and equity as shown in Table 4.

TABLE 4

| Enterprise Market Value = Σ Market value of enterprise equity + Σ Market value of company debt |
|---|

One benefit of the novel system is that the market value of every enterprise in the organization is subdivided in to at least three distinct categories of value: current operation assets, elements of value and real options. As shown in the table 5, these three value categories match the three distinct "horizons" for management focus the McKinsey consultants reported on in *The Alchemy of Growth*.

TABLE 5

| System Value Categories | Three Horizons |
|---|---|
| Current Operation Assets | Short Term |
| Elements of Value | Growth |
| Real Options | Options |

The utility of the valuations produced by the system of the present invention are further enhanced by explicitly calculating the lives of the different elements of value as required to remove the inaccuracy and distortion inherent in the use of a large residual.

As shown in Tables 2 and 3, growth opportunities and contingent liabilities are valued using real option algorithms. Because real option algorithms explicitly recognize whether or not an investment is reversible and/or if it can be delayed, the values calculated using these algorithms are more realistic than valuations created using more traditional approaches like Net Present Value. The use of real option analysis for valuing growth opportunities and contingent liabilities (hereinafter, real options) gives the present invention a distinct advantage over traditional approaches to business valuation.

The innovative system has the added benefit of providing a large amount of detailed information concerning both tangible and intangible elements of value. Because intangible elements are by definition not tangible, they can not be measured directly. They must instead be measured by the impact they have on their surrounding environment. There are analogies in the physical world. For example, electricity is an "intangible" that is measured by the impact it has on the surrounding environment. Specifically, the strength of the magnetic field generated by the flow of electricity through a conductor is used to determine the amount of electricity that is being consumed. The system of the present invention measures intangible elements of value by identifying the attributes that, like the magnetic field, reflect the strength of the element in driving the components of value (revenue, expense and change in capital) and are easy to measure. Once the attributes related to each element's strength are identified, they are summarized into a single expression (a composite variable or vector). The vectors for all elements are then evaluted to determine their relative contribution to driving each of the components of value. The system of the present invention calculates the product of each element's relative contribution and forecast life to determine the contribution to each of the components of value. The contributions to each component of value are then added together to determine the value of each element (see Table 7).

The system also gives the user the ability to track the changes in categories of value by comparing the current valuations to previously calculated valuations. As such, the system provides the user with an alternative to general ledger accounting systems for tracking financial performance. To facilitate its use as a tool for improving the value of a commercial enterprise, the system of the present invention produces reports in formats that are similar to the reports provided by traditional accounting systems. The method for tracking the categories of value for a business enterprise provided by the present invention eliminates many of the limitations associated with current accounting systems that were described previously.

BRIEF DESCRIPTION OF DRAWINGS

These and other objects, features and advantages of the present invention will be more readily apparent from the following description of the preferred embodiment of the invention in which.

DETAILED DESCRIPTION OF THE PREFERRED EMBODIMENT

Figure 1:
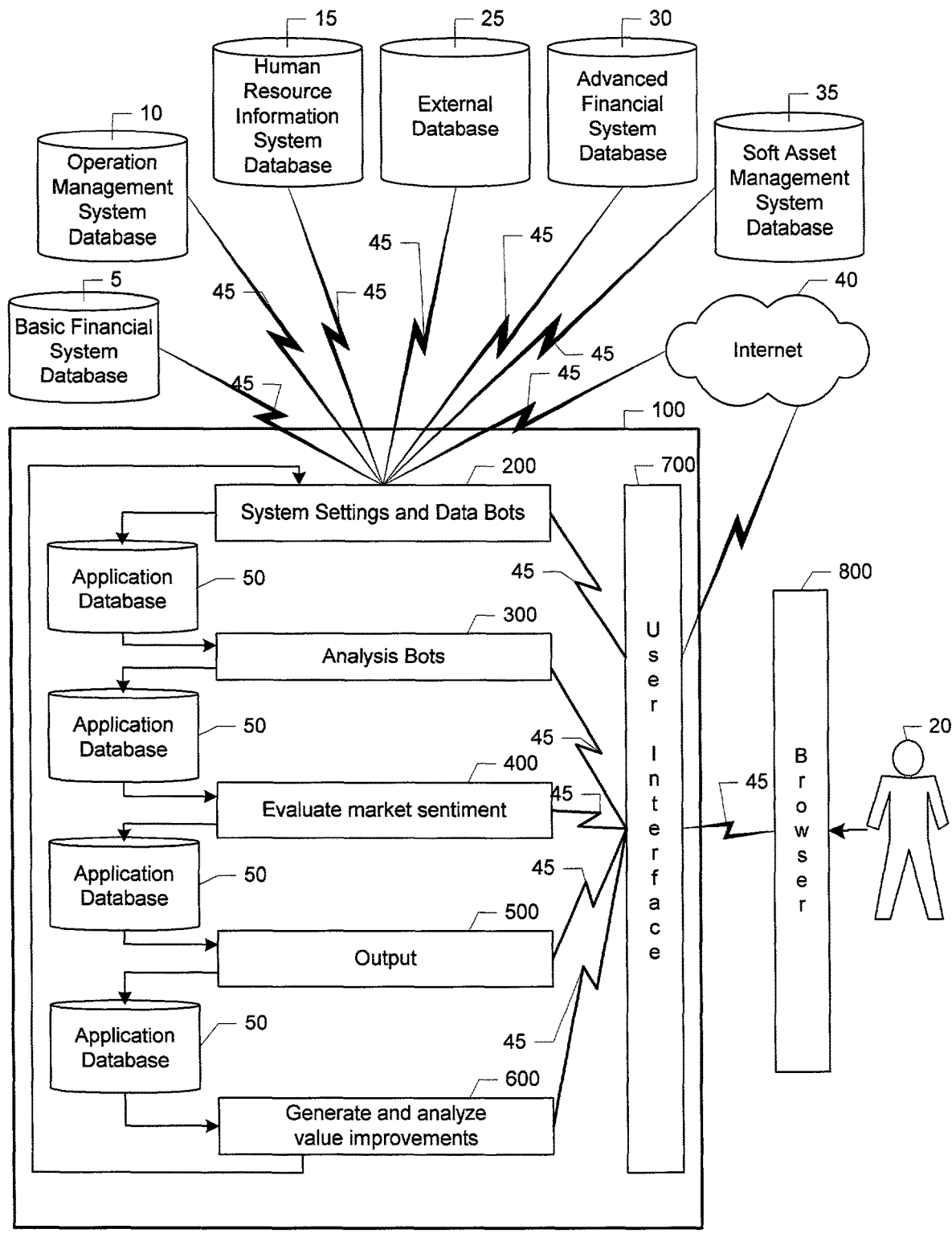
FIG. 1 is a block diagram showing the major processing steps of the present invention.

FIG. 1 provides an overview of the processing completed by the innovative system for business valuation. In accordance with the present invention, an automated method of and system (100) for business valuation is provided. Processing starts in this system (100) with a the specification of system settings and the initialization and activation of software data "bots" (200) that extract, aggregate, manipulate and store the data and user (20) input required for completing system processing. This information is extracted via a network (45) from a basic financial system database (5), an operation management system database (10), a human resource information system database (15), an external database (25), an advanced financial system database (30), soft asset management system databases (35) and the internet (40). These information extractions and aggregations may be influenced by a user (20) through interaction with a user-interface portion of the application software (700) that mediates the display, transmission and receipt of all information to and from a browser (800) that the user (20) interacts with. While only one database of each type (5, 10, 15, 25, 30 and 35) is shown in FIG. 1, it is to be understood that the system (100) can extract data from multiple databases of each type via the network (45). The preferred embodiment of the present invention contains a soft asset management system for each element of value being analyzed. Automating the extraction and analysis of data from each soft asset management system ensures that the management of each soft asset is considered and prioritized within the overall financial models for the organization and for each enterprise in the organization. It should also be understood that it is possible to complete a bulk extraction of data from each database (5, 10, 15, 25, 30 and 35) via the network (45) using data extraction applications such as Aclue from Decisionism and Power Center from Informatica before initializing the data bots. The data extracted in bulk could be stored in a single datamart or datawarehouse where the data bots could operate on the aggregated data.

Figure 2:
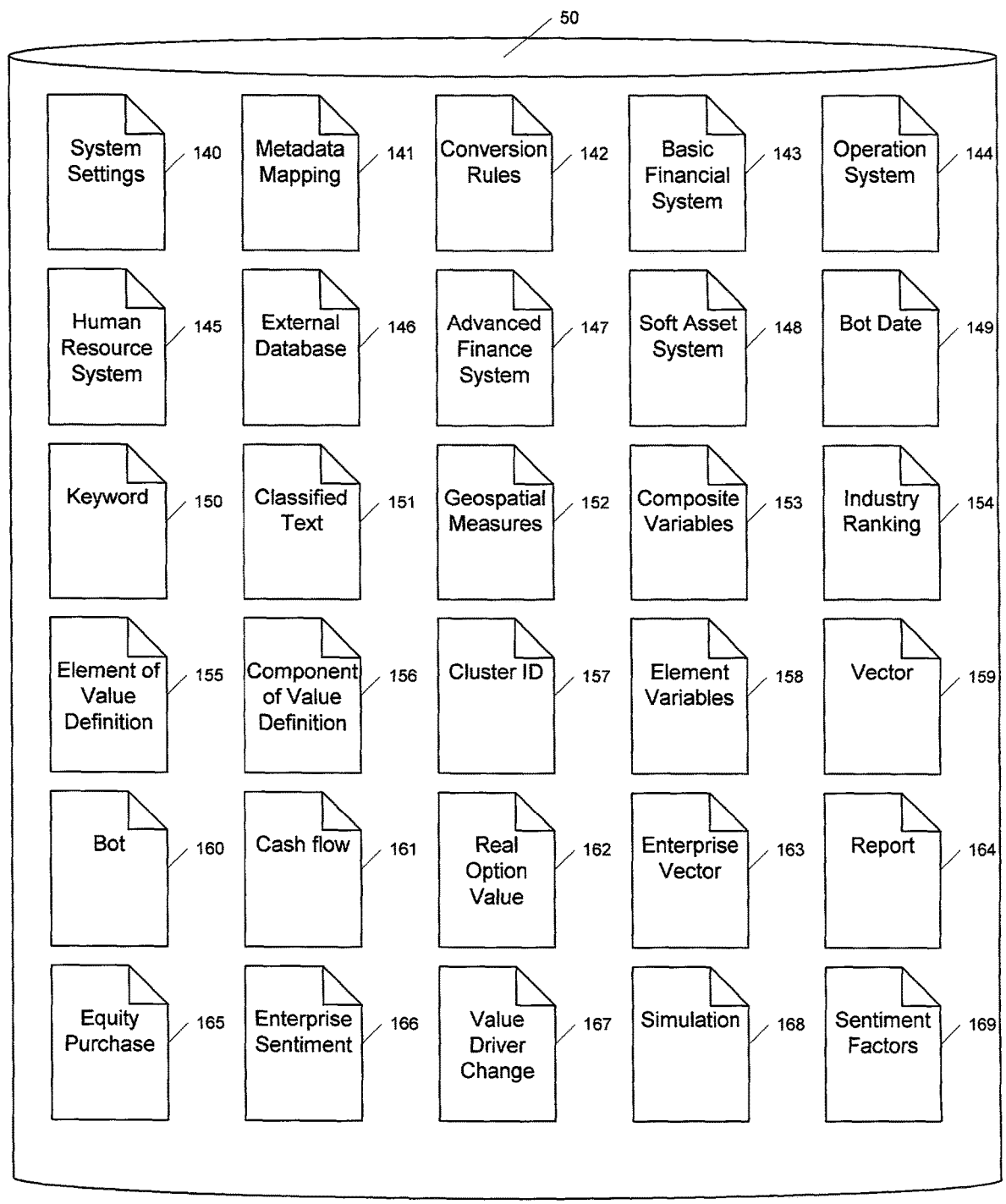
FIG. 2 is a diagram showing the files or tables in the application database of the present invention that are utilized for data storage and retrieval during the processing that values the categories of value within the organization.

All extracted information is stored in a file or table (hereinafter, table) within an application database (50) as shown in FIG. 2. The application database (50) contains tables for storing user input, extracted information and system calculations including a system settings table (140), a metadata mapping table (141), a conversion rules table (142), a basic financial system table (143), an operation system table (144), a human resource system table (145), an external database table (146), an advanced finance system table (147), a soft asset system table (148), a bot date table (149), a keyword table (150), a classified text table (151), a geospatial measures table (152), a composite variables table (153), an industry ranking table (154), an element of value definition table (155), a component of value definition table (156), a cluster ID table (157), an element variables table (158), a vector table (159), a bot table (160), a cash flow table (161), a real option value table (162), an enterprise vector table (163), a report table (164), an equity purchase table (165), an enterprise sentiment table (166), a value driver change table (167), a simulation table (168) and a sentiment factors table (169). The application database (50) can optionally exist as a datamart, data warehouse or departmental warehouse. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in the preferred embodiment all required information is obtained from the specified data sources (5, 10, 15, 25, 30, 35 and 40).

Figure 3:
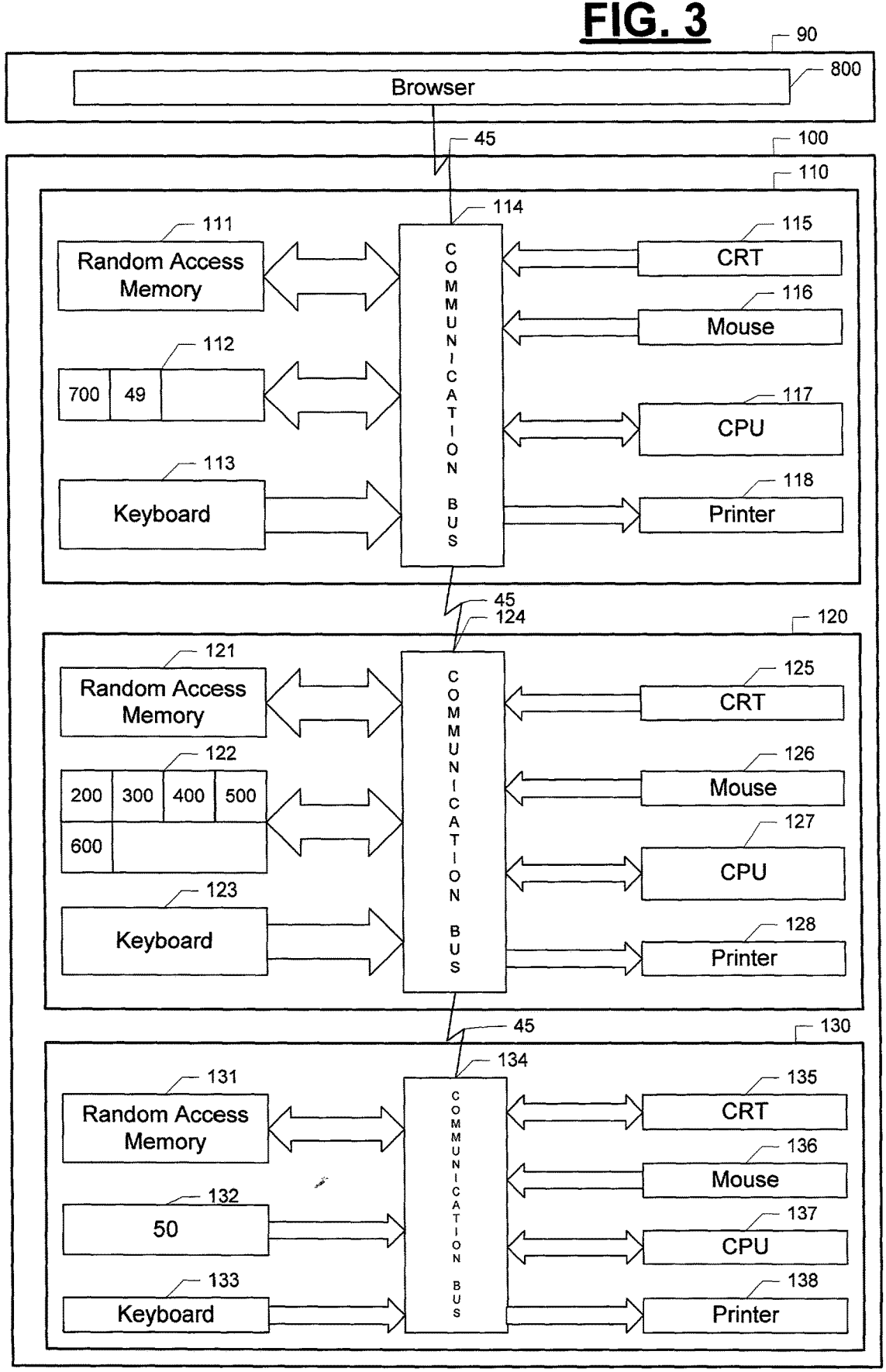
FIG. 3 is a block diagram of an implementation of the present invention.
Figure 4:
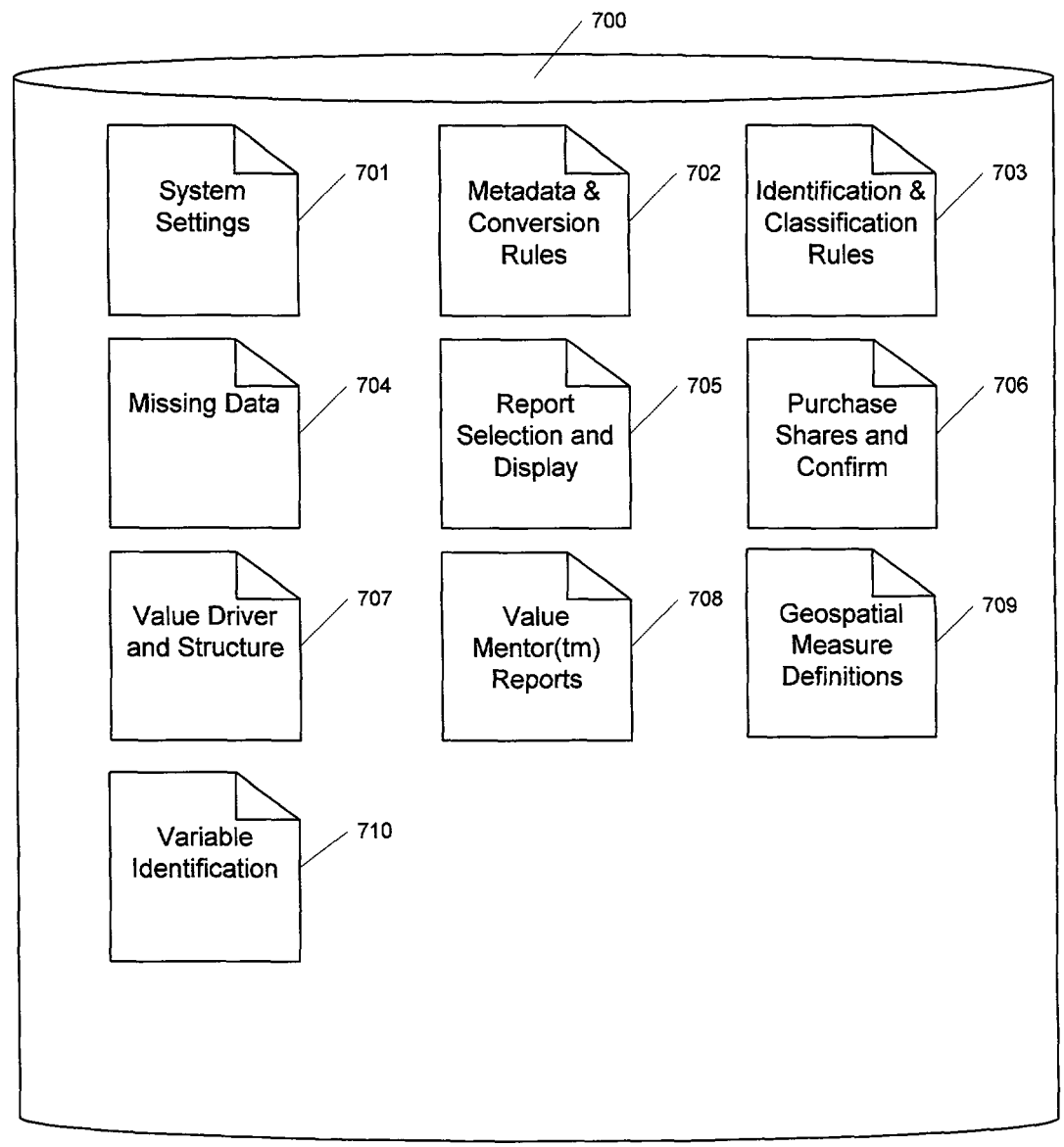
FIG. 4 is a diagram showing the data windows that are used for receiving information from and transmitting information to the user (20) during system processing.
Figure 5A:
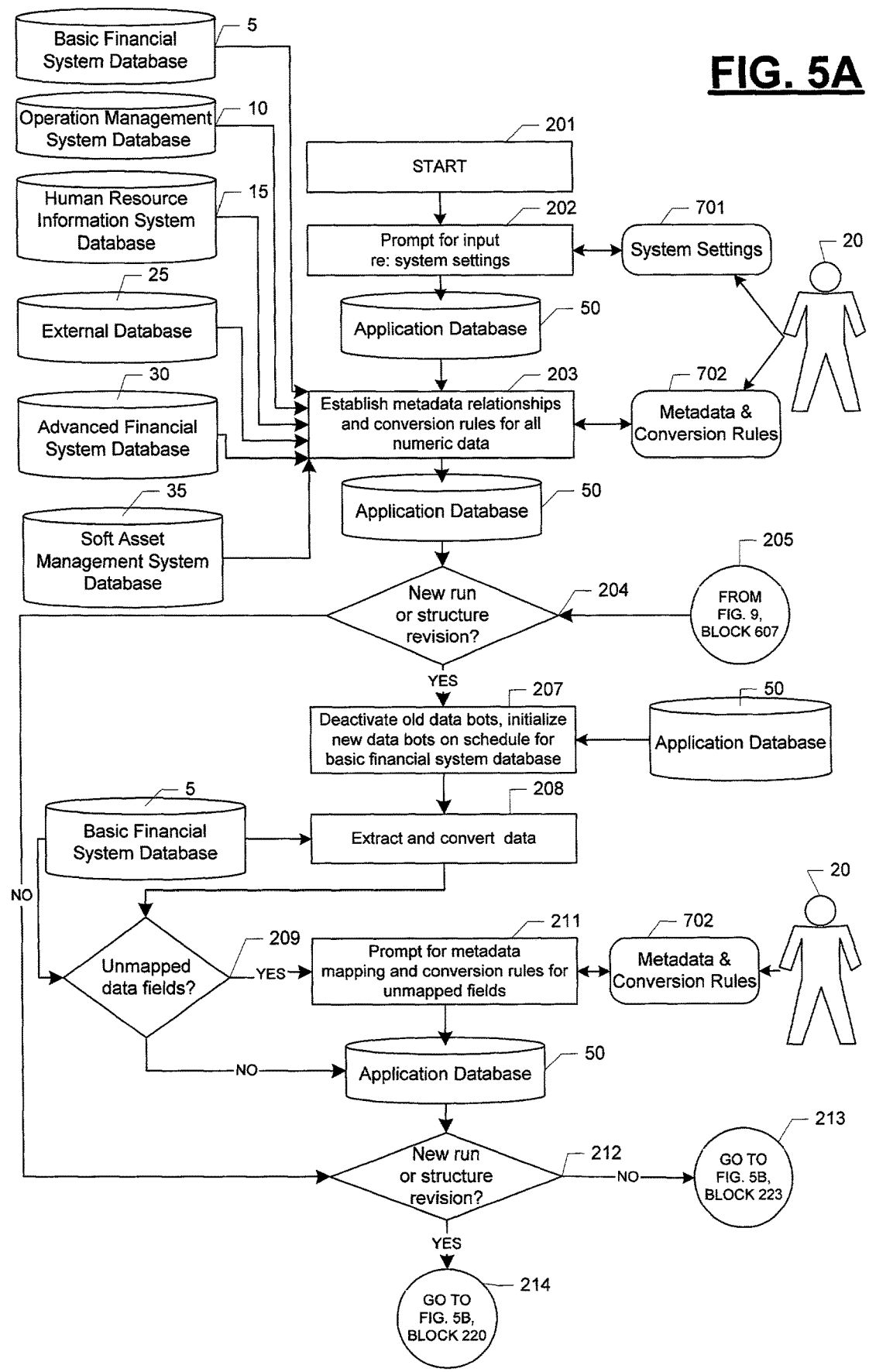
FIG. 5A, FIG. 5B, FIG. 5C, FIG. 5D, FIG. 5E and FIG. 5F are block diagrams showing the sequence of steps in the present invention used for specifying system settings and for initializing and operating the data bots that extract, aggregate, store and manipulate information utilized in system processing from: user input, the basic financial system database, the operation management system database, the human resource information system database, external databases, the advanced financial system database, soft asset management system databases and the internet.
Figure 5B:
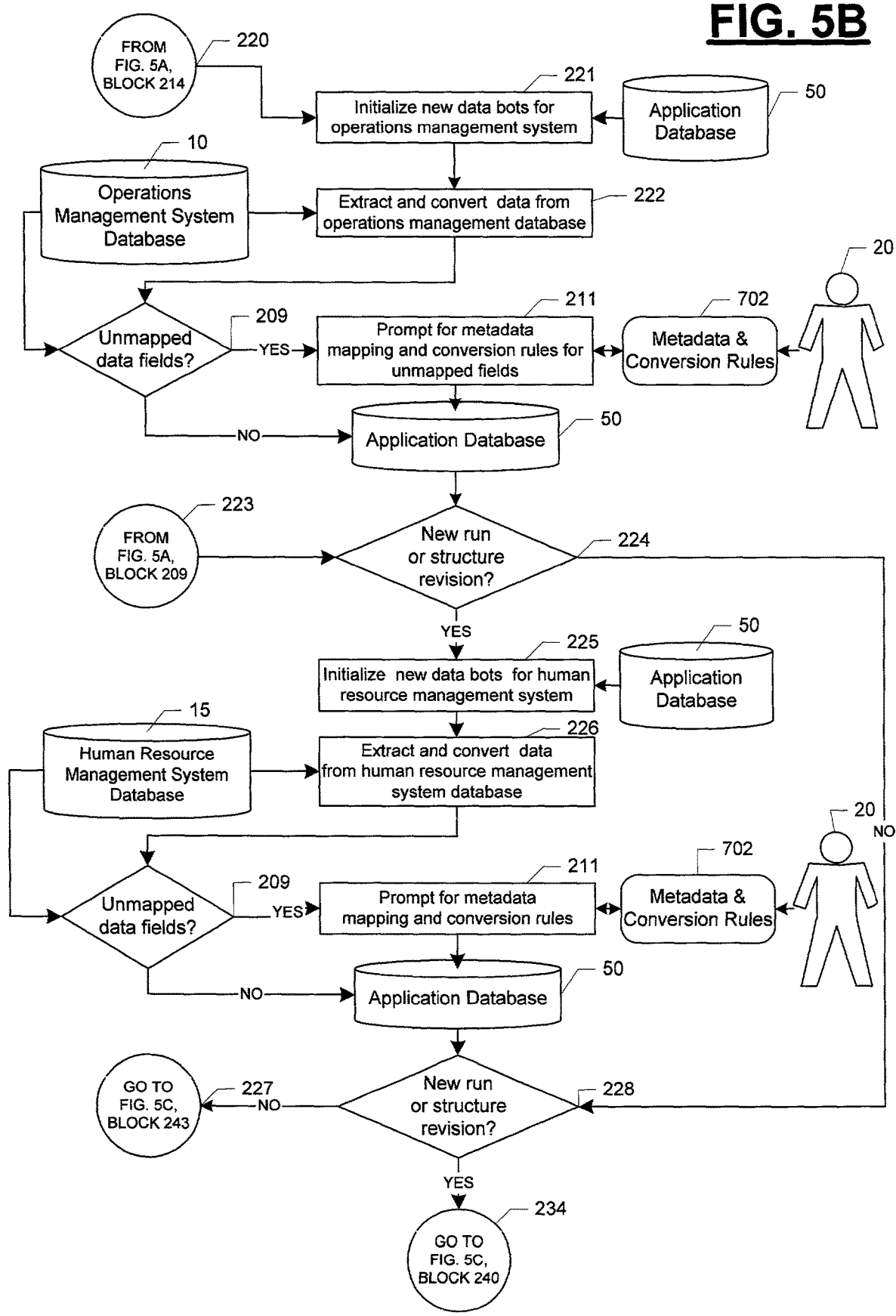
Figure 5C:
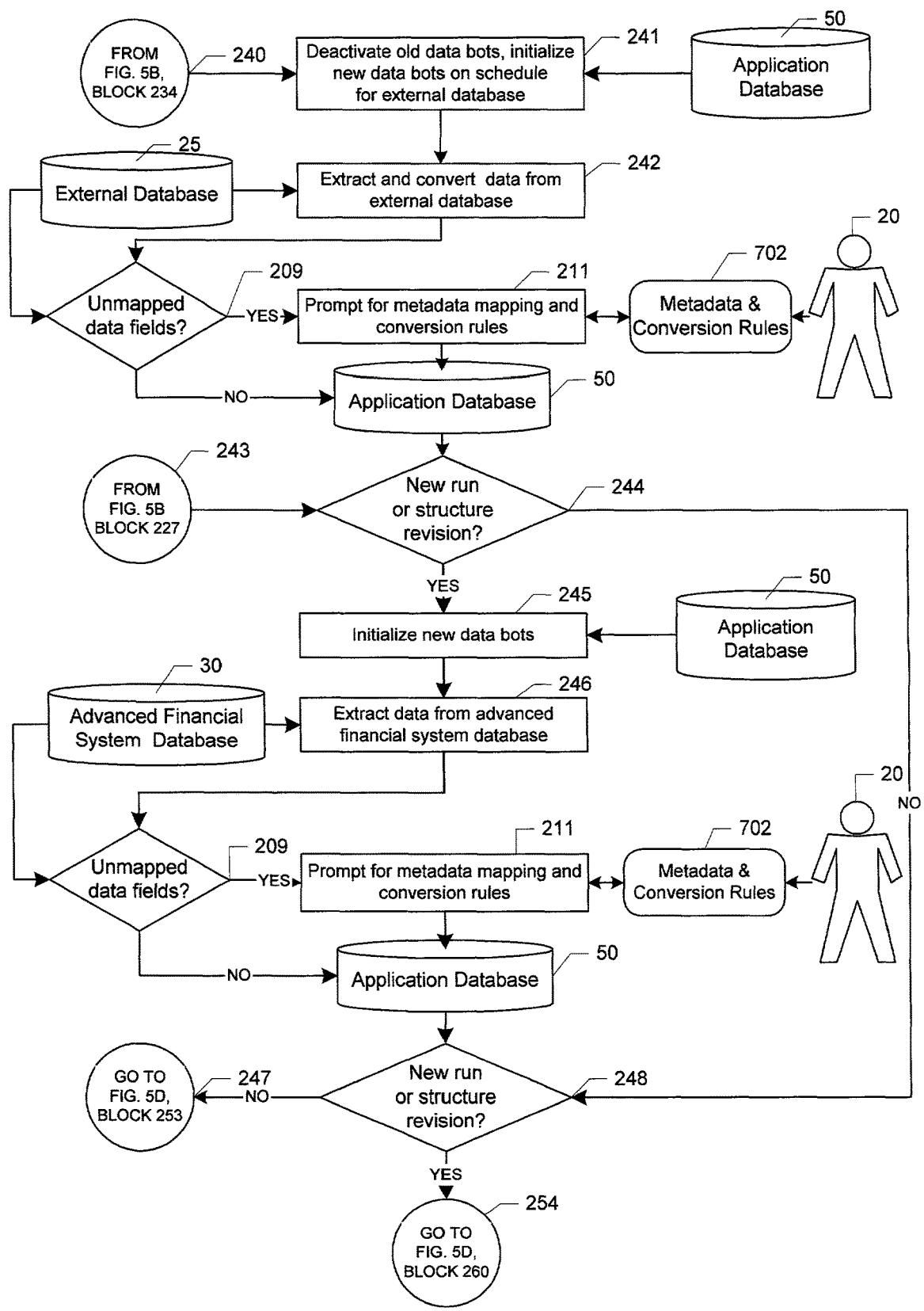
Figure 5D:
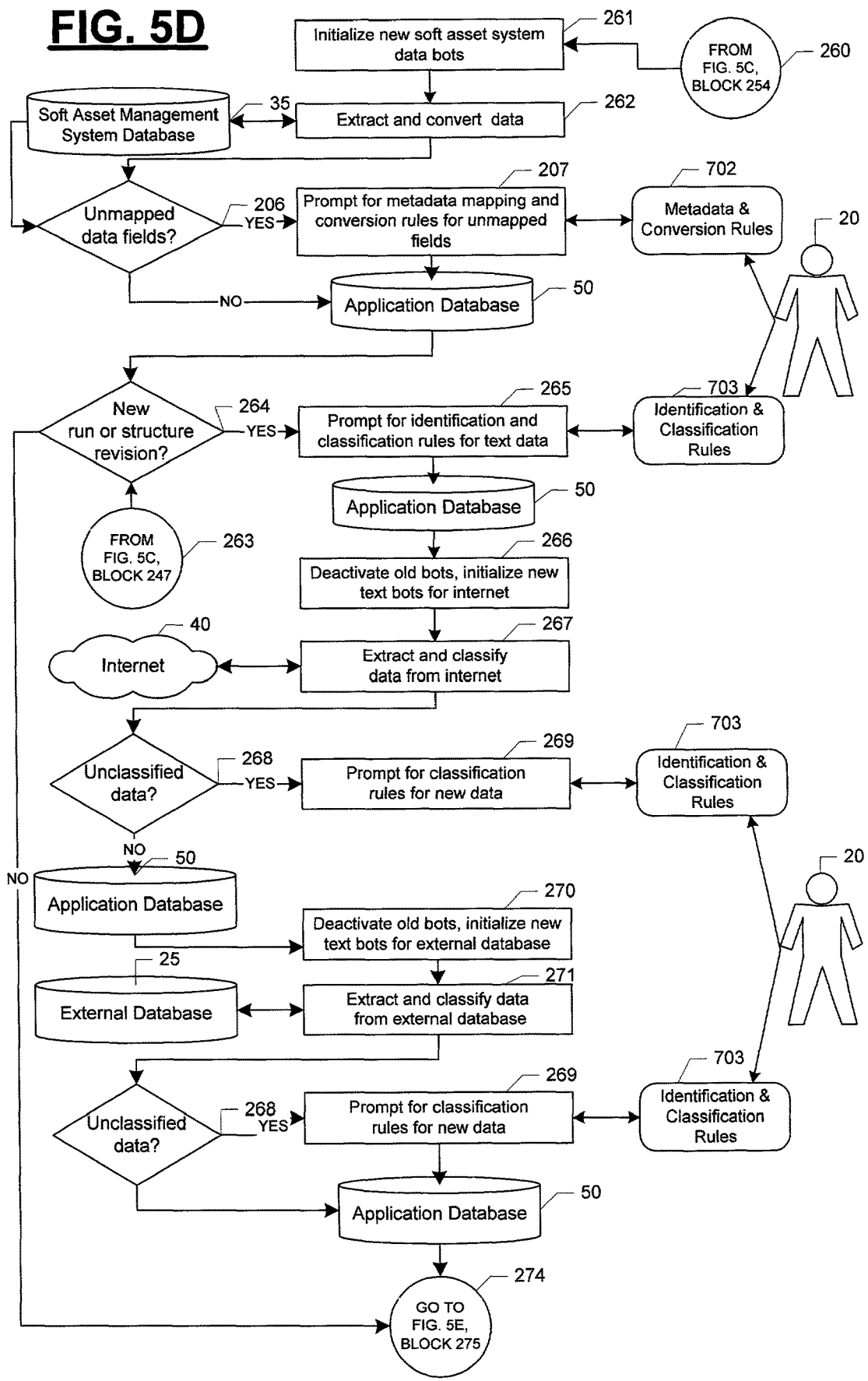
Figure 5E:
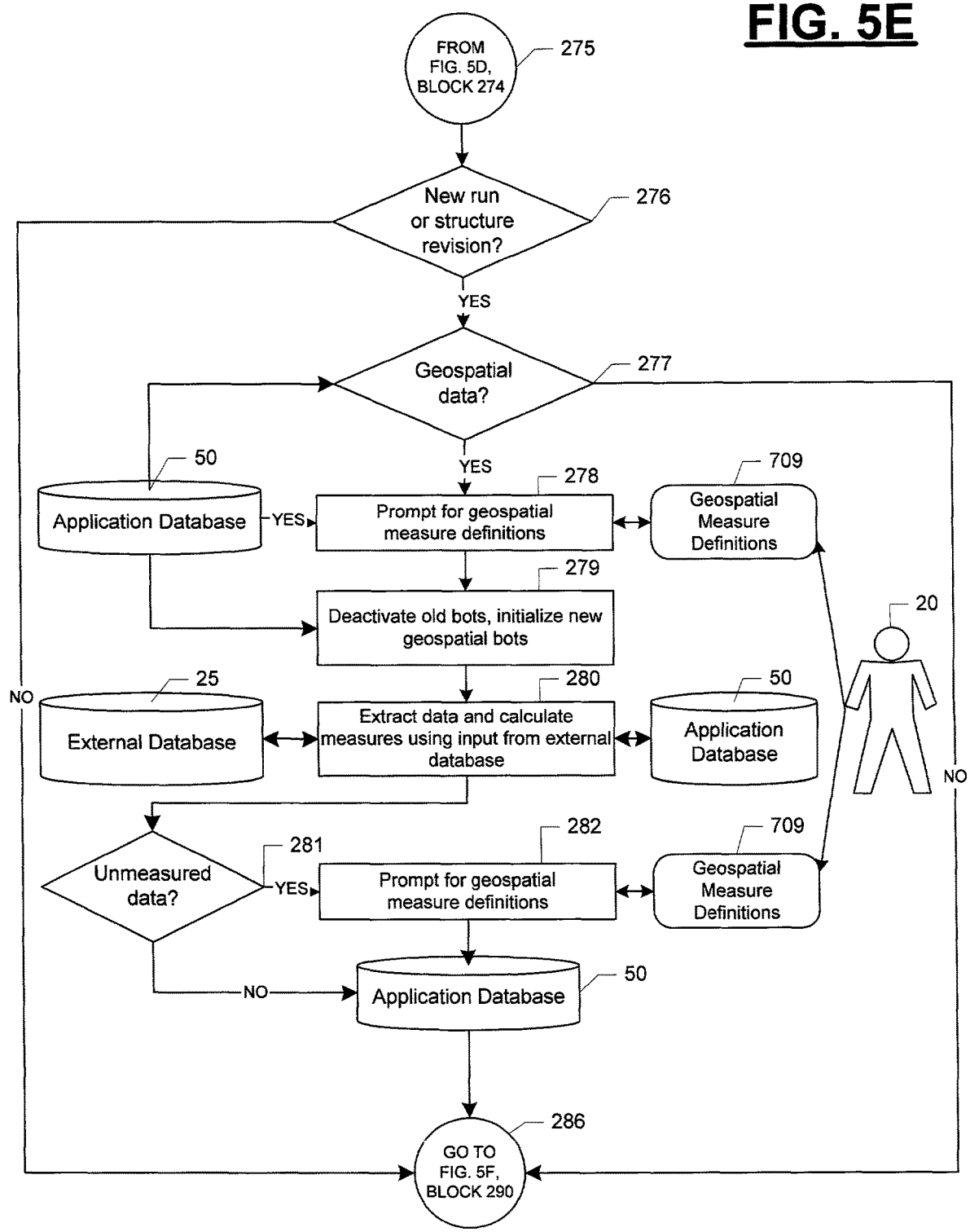
Figure 5F:
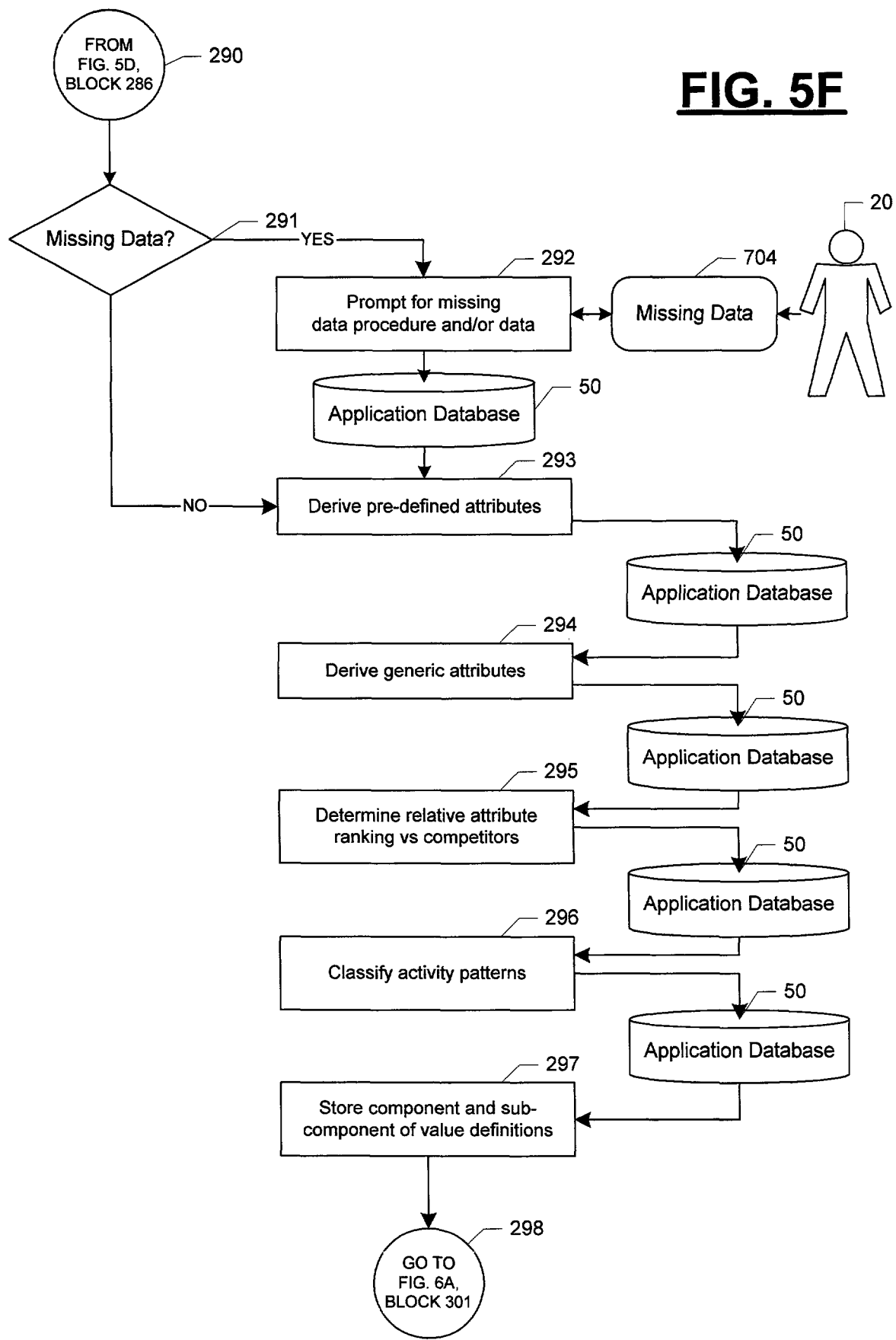

As shown in FIG. 3, the preferred embodiment of the present invention is a computer system (100) illustratively comprised of a user-interface personal computer (110) connected to an application server personal computer (120) via a network (45). The application server personal computer (120) is in turn connected via the network (45) to a database-server personal computer (130). The user interface personal computer (110) is also connected via the network (45) to an internet browser applicance (90) that contains browser software (800) such as Microsoft Internet Explorer or Netscape Navigator.

The database-server personal computer (130) has a read/write random access memory (131), a hard drive (132) for storage of the application database (50), a keyboard (133), a communications bus (134), a CRT display (135), a mouse (136), a CPU (137) and a printer (138).

The application-server personal computer (120) has a read/write random access memory (121), a hard drive (122) for storage of the non user interface portion of the application software (200, 300, 400, 500 and 600) of the present invention, a keyboard (123), a communications bus (124), a CRT display (125), a mouse (126), a CPU (127) and a printer (128). While only one client personal computer is shown in FIG. 3, it is to be understood that the application-server personal computer (120) can be networked to fifty or more client personal computers (110) via the network (45). The application-server personal computer (120) can also be networked to fifty or more server, personal computers (130) via the network (45). It is to be understood that the diagram of FIG. 3 is merely illustrative of one embodiment of the present invention.

The user-interface personal computer (110) has a read/write random access memory (111), a hard drive (112) for storage of a client data-base (49) and the user-interface portion of the application software (700), a keyboard (113), a communications bus (114), a CRT display (115), a mouse (116), a CPU (117) and a printer (118).

The application software (200, 300, 400, 500, 600 and 700) controls the performance of the central processing unit (127) as it completes the calculations required to calculate the detailed business valuation. In the embodiment illustrated herein, the application software program (200, 300, 400, 500, 600 and 700) is written in a combination of C++ and Visual Basic®. The application software (200, 300, 400, 500, 600 and 700) can use Structured Query Language (SQL) for extracting data from the databases and the internet (5, 10, 15, 25, 30, 35 and 40). The user (20) can optionally interact with the user-interface portion of the application software (700) using the browser software (800) in the browser appliance (90) to provide information to the application software (200, 300, 400, 500, 600 and 700) for use in determining which data will be extracted and transferred to the application database (50) by the data bots.

User input is initially saved to the client database (49) before being transmitted to the communication bus (125) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known.

The computers (110, 120 and 130) shown in FIG. 3 illustratively are IBM PCs or clones or any of the more powerful computers or workstations that are widely available. Typical memory configurations for client personal computers (110) used with the present invention should include at least 256 megabytes of semiconductor random access memory (111) and at least a 50 gigabyte hard drive (112). Typical memory configurations for the application-server personal computer (120) used with the present invention should include at least 1028 megabytes of semiconductor random access memory (121) and at least a 100 gigabyte hard drive (122). Typical memory configurations for the database-server personal computer (130) used with the present invention should include at least 2056 megabytes of semiconductor random access memory (135) and at least a 500 gigabyte hard drive (131).

Using the system described above, the value of the organiztion, each enterprise within the organization and each element of value can be broken down into the value categories listed in Table 1. As shown in Table 2 and Table 3, the value of the current-operation will be calculated using an income valuation. An integral part of most income valuation models is the calculation of the present value of the expected cash flows, income or profits associated with the current-operation. The present value of a stream of cash flows is calculated by discounting the cash flows at a rate that reflects the risk associated with realizing the cash flow. For example, the present value (PV) of a cash flow of ten dollars ($10) per year for five (5) years would vary depending on the rate used for discounting future cash flows as shown below.

Discount rate = 25%

$$PV = \frac{10}{1.25} + \frac{10}{(1.25)^2} + \frac{10}{(1.25)^3} + \frac{10}{(1.25)^4} + \frac{10}{(1.25)^5} = 26.89$$

Discount rate = 35%

$$PV = \frac{10}{1.35} + \frac{10}{(1.35)^2} + \frac{10}{(1.35)^3} + \frac{10}{(1.35)^4} + \frac{10}{(1.35)^5} = 22.20$$

One of the first steps in evaluating the elements of current-operation value is extracting the data required to complete calculations in accordance with the formula that defines the value of the current-operation as shown in Table 6.

TABLE 6

Value of current-operation =
(R) Value of forecast revenue from current-operation (positive) +
(E) Value of forecast expense for current-operation (negative) +
(C)* Value of current operation capital change forecast

*Note:
(C) can have a positive or negative value

The three components of current-operation value will be referred to as the revenue value (R), the expense value (E) and the capital value (C). Examination of the equation in Table 6 shows that there are three ways to increase the value of the current-operation—increase the revenue, decrease the expense or decrease the capital requirements (note: this statement ignores a fourth way to increase value—decrease interest rate used for discounting future cash flows).

In the preferred embodiment, the revenue, expense and capital requirement forecasts for the current operation, the real options and the contingent liabilities are obtained from an advanced financial planning system database (30) from an advanced financial planning system similar to the one disclosed in U.S. Pat. No. 5,615,109. The extracted revenue, expense and capital requirement forecasts are used to calculate a cash flow for each period covered by the forecast for the organization and each enterprise in the organization by subtracting the expense and change in capital for each period from the revenue for each period. A steady state forecast for future periods is calculated after determining the steady state growth rate the best fits the calculated cash flow for the forecast time period. The steady state growth rate is used to calculate an extended cash flow forecast. The extended cash flow forecast is used to determine the Competitive Advantage Period (CAP) implicit in the enteprise market value.

While it is possible to use analysis bots to sub-divide each of the components of current operation value into a number of sub-components for analysis, the preferred embodiment has a pre-determined number of sub-components for each component of value for the organization and each enterprise in the organization. The revenue value is not subdivided. In the preferred embodiment, the expense value is subdivided into five sub-components: the cost of raw materials, the cost of manufacture or delivery of service, the cost of selling, the cost of support and the cost of administration. The capital value is subdivided into six sub-components: cash, non-cash financial assets, production equipment, other assets (non financial, non production assets), financial liabilities and equity. The production equipment and equity sub-components are not used directly in evaluating the elements of value.

The components and sub-components of current-operation value will be used in calculating the value of: enteprise contribution, elements of value and sub-elements of value. Enterprise contribution will be defined as "the economic benefit that as a result of past transactions an enterprise is expected to provide to an organization." In a similar fashion, an element of value will be defined as "an identifiable entity or group of items that as a result of past transactions has provided and is expected to provide economic benefit to an enterprise". An item will be defined as a single member of the group that defines an element of value. For example, an individual salesman would be an "item" in the "element of value" sales staff. The data associated with performance of an individual item will be referred to as "item variables".

Analysis bots are used to determine enterprise and element of value lives and the percentage of: the revenue value, the expense value, and the capital value that are attributable to each element of value. The resulting values are then be added together to determine the valuation for different elements as shown by the example in Table 7.

TABLE 7

| Gross Value | Percentage | Element Life/CAP | Net Value |
| --- | --- | --- | --- |
| Revenue value = $120 M | 20% | 80% | Value = $19.2 M |
| Expense value = ($80 M) | 10% | 100% | Value = ($8.0) M |
| Capital value = ($5 M) | 5% | 80% | Value = ($0.2) M |
| Total value = $35 M | | | |
| Net value for this element: | | | Value = $11.0 M |

Figure 6A:
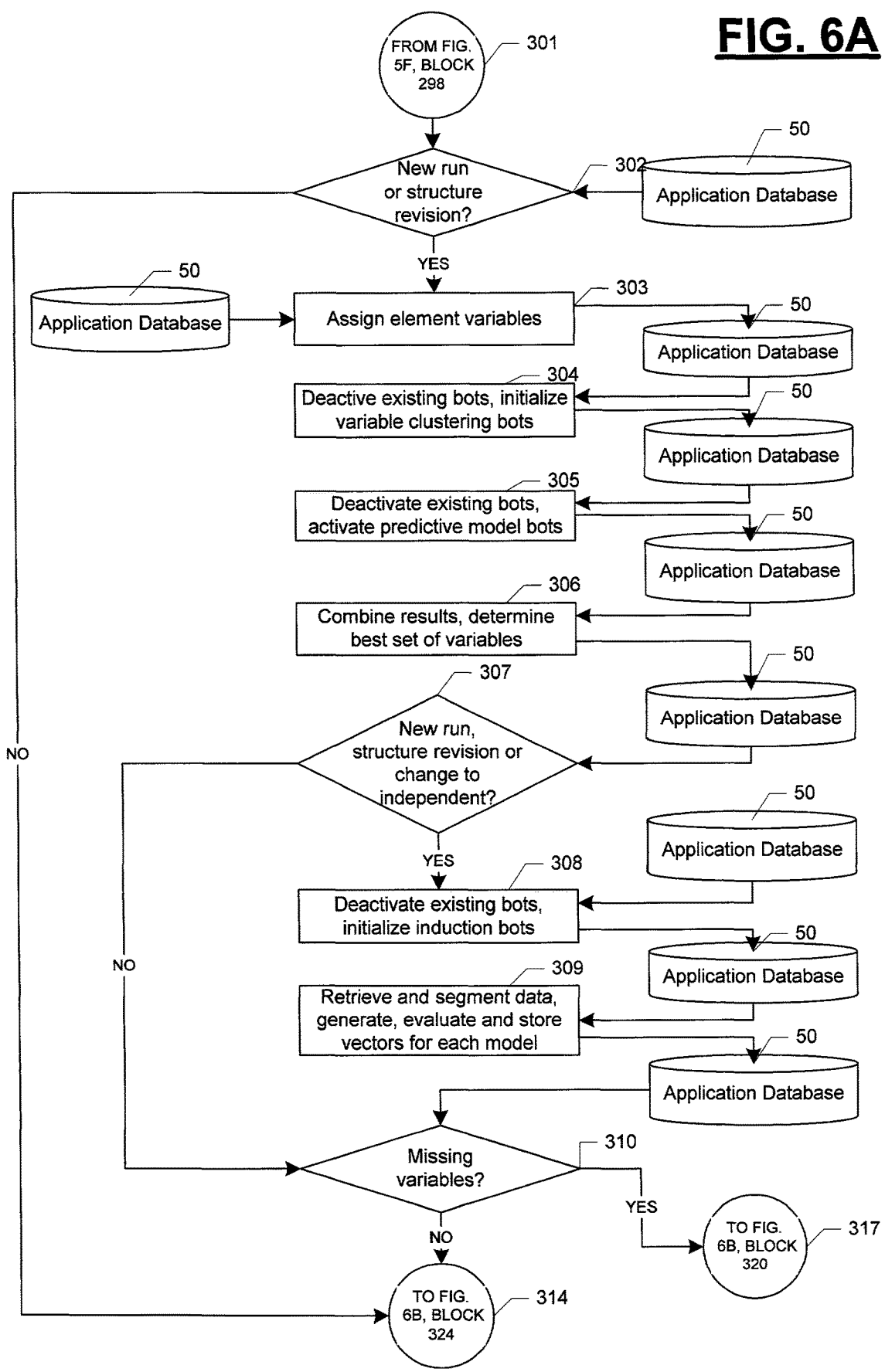
FIG. 6A, FIG. 6B and FIG. 6C are block diagrams showing the sequence of steps in the present invention that are utilized for initializing and operating the analysis bots.
Figure 6B:
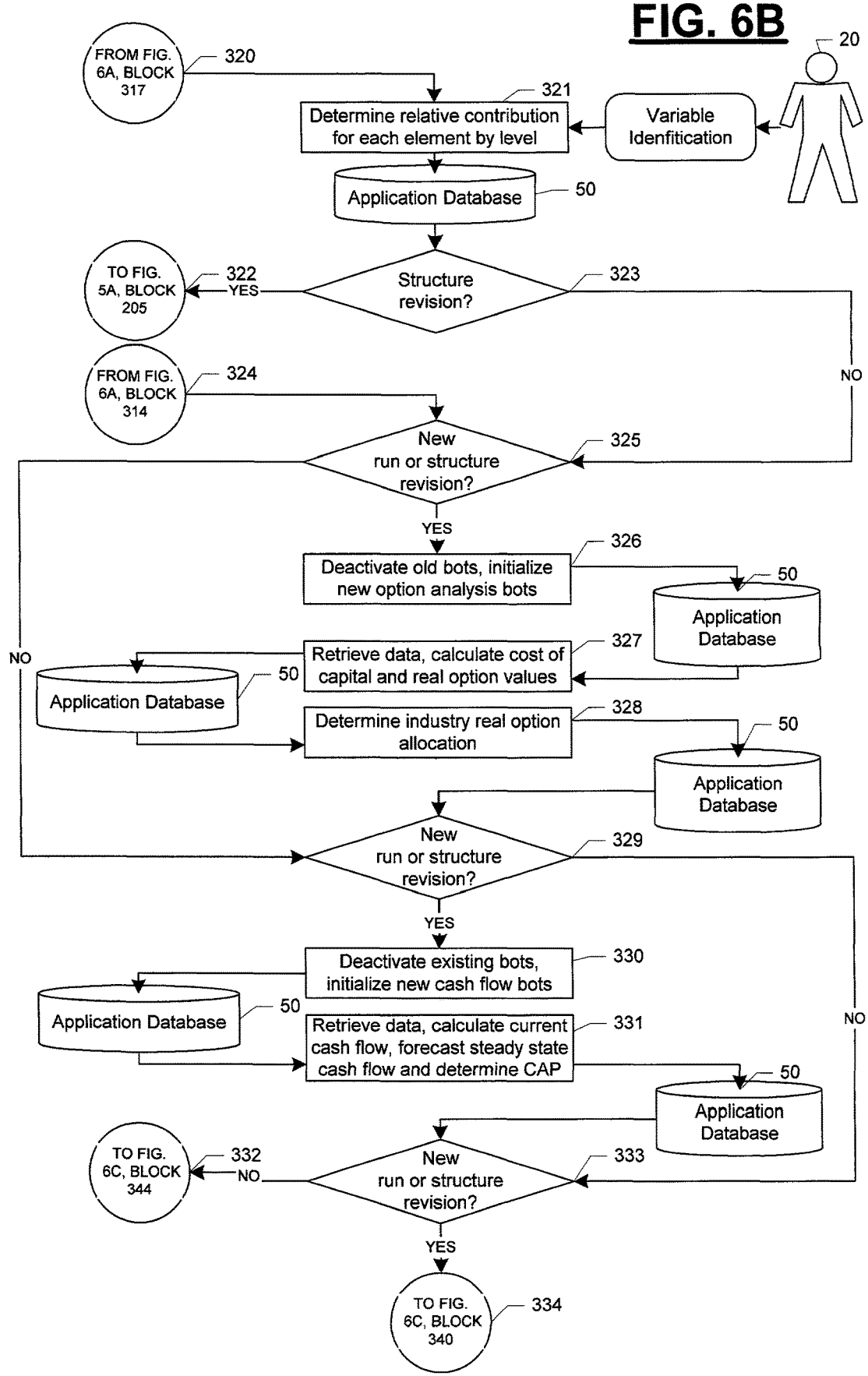
Figure 6C:
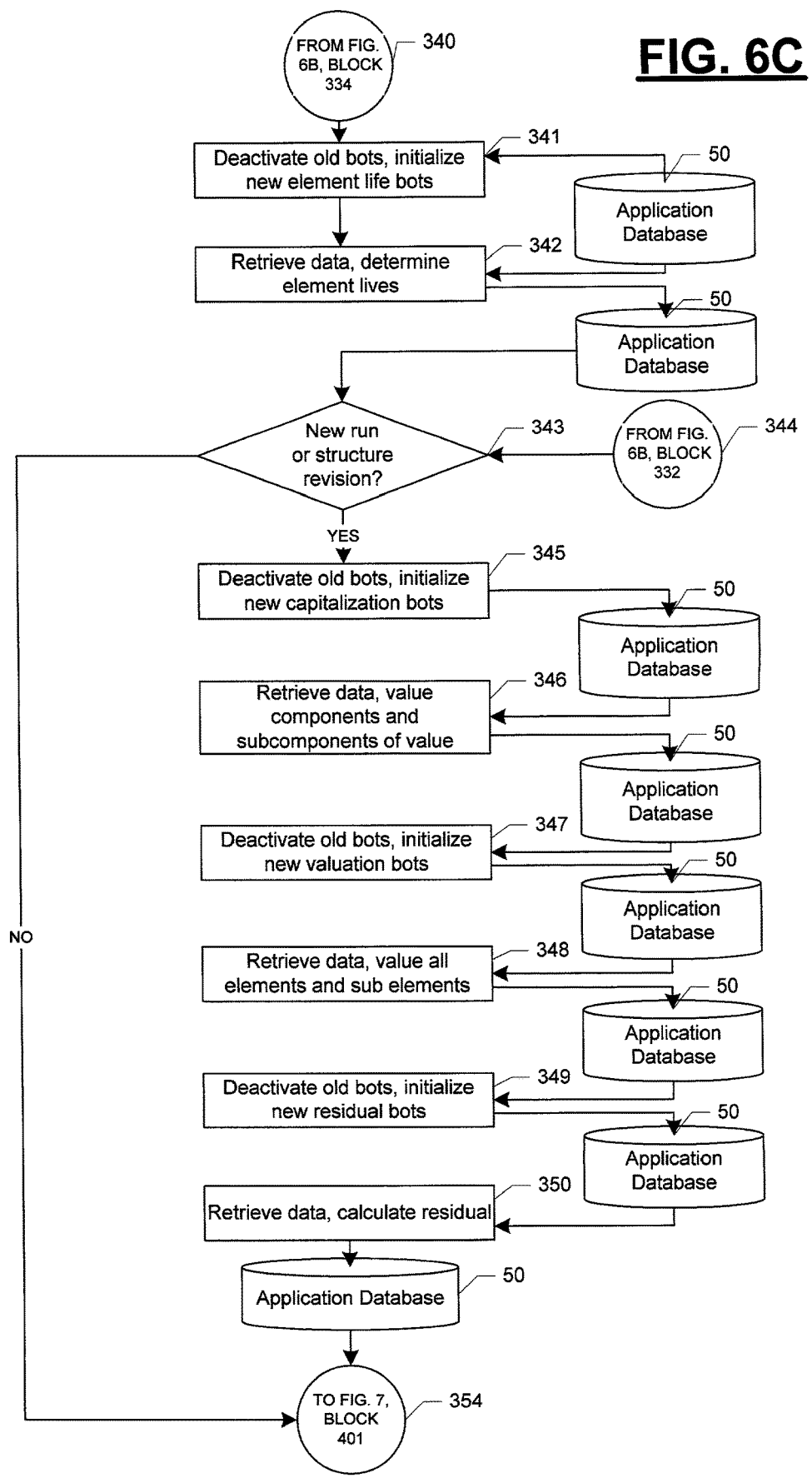
Figure 7:
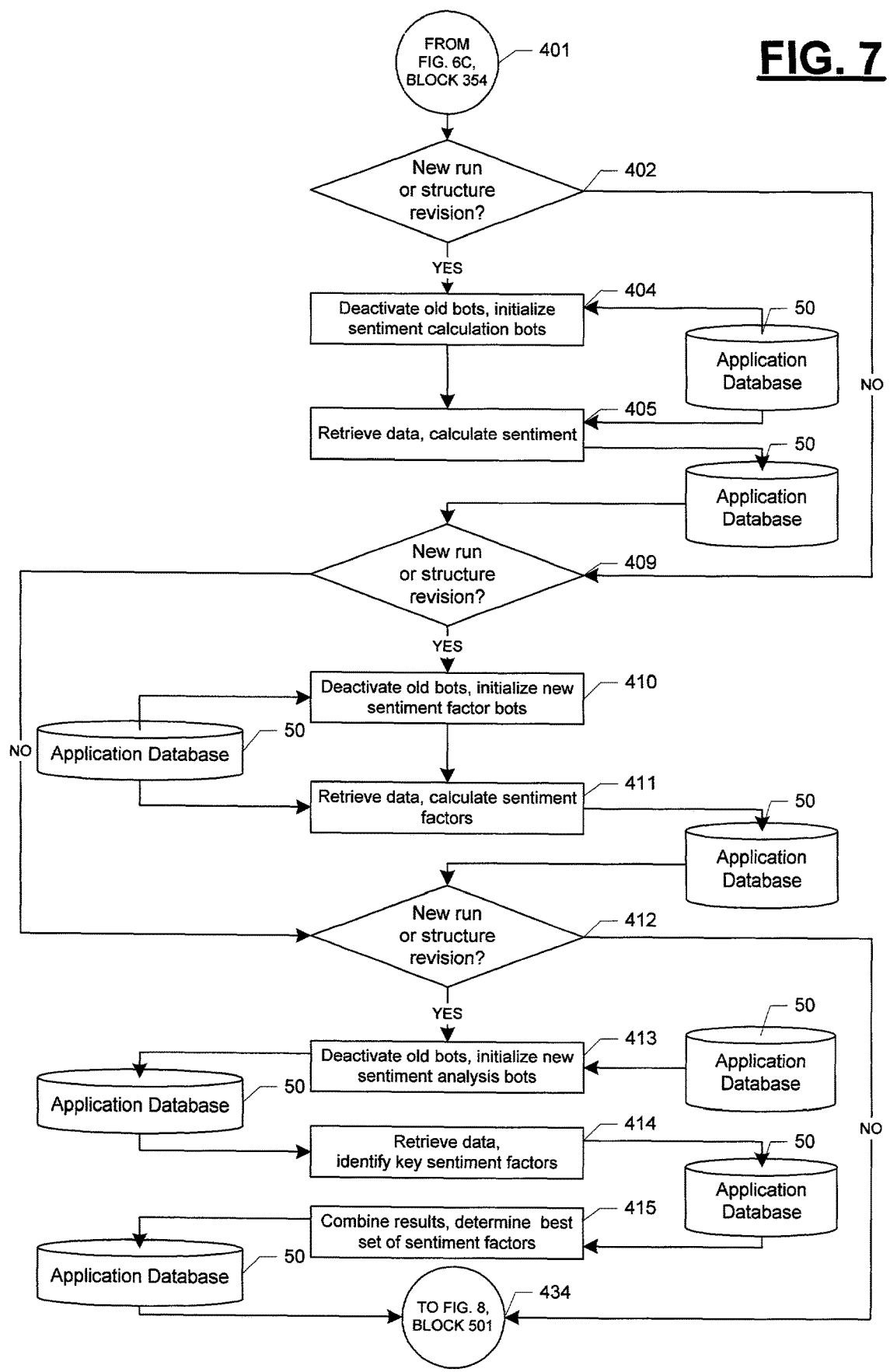
FIG. 7 is a block diagram showing the sequence of steps in the present invention used for the analyzing enterprise market sentiment.
Figure 8:
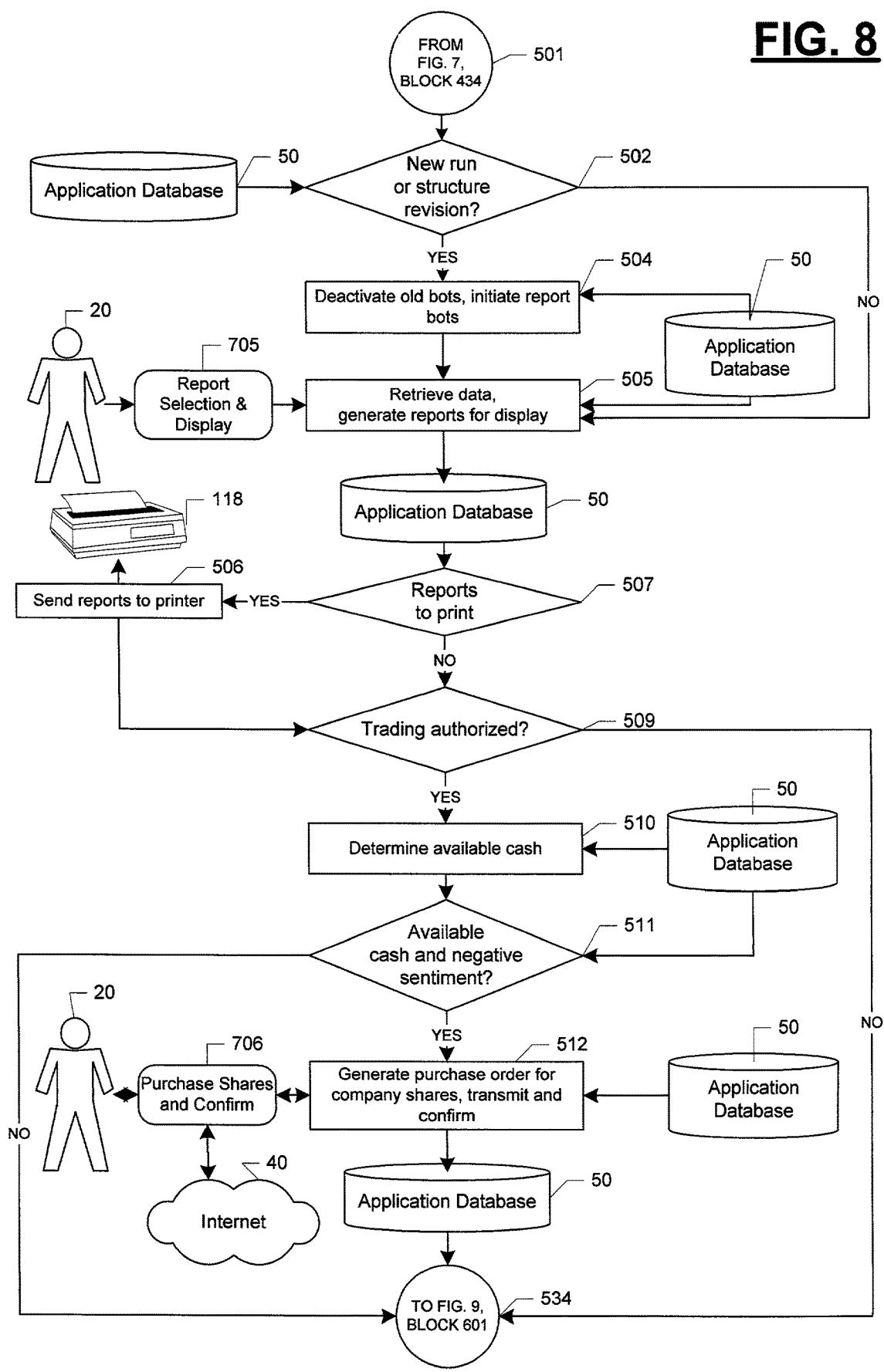
FIG. 8 is a block diagram showing the sequence of steps in the present invention used in trading organization stock and in preparing, displaying and optionally printing reports.
Figure 9:
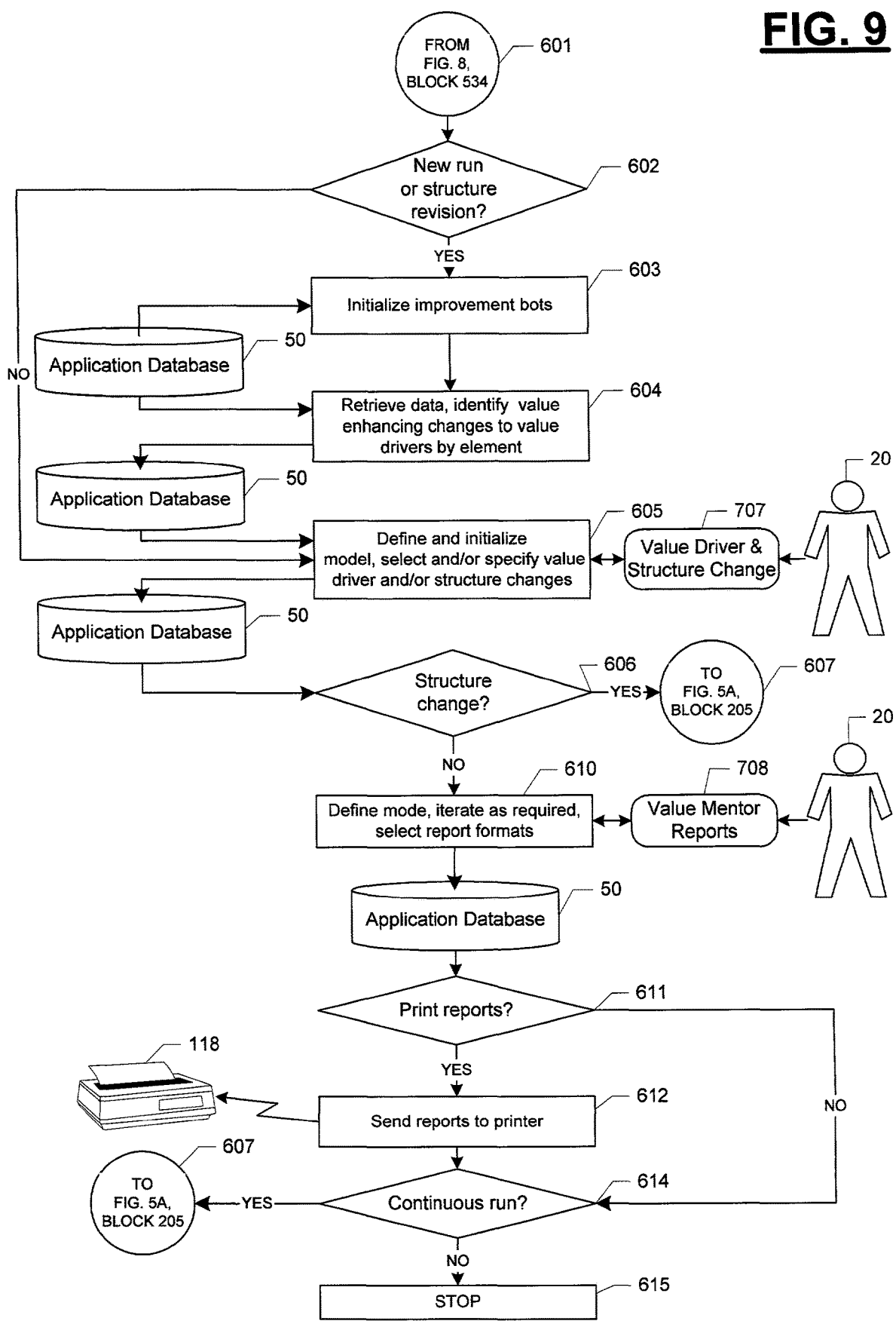
FIG. 9 is a block diagram showing the sequence of steps in the present invention used for generating lists of value enhancing changes and calculating, displaying and optionally printing simulations of the effects of user-specified and/or system generated changes in business value drivers on the financial performance and the future value of the organization and the enterprises in the organization.
Figure 10:
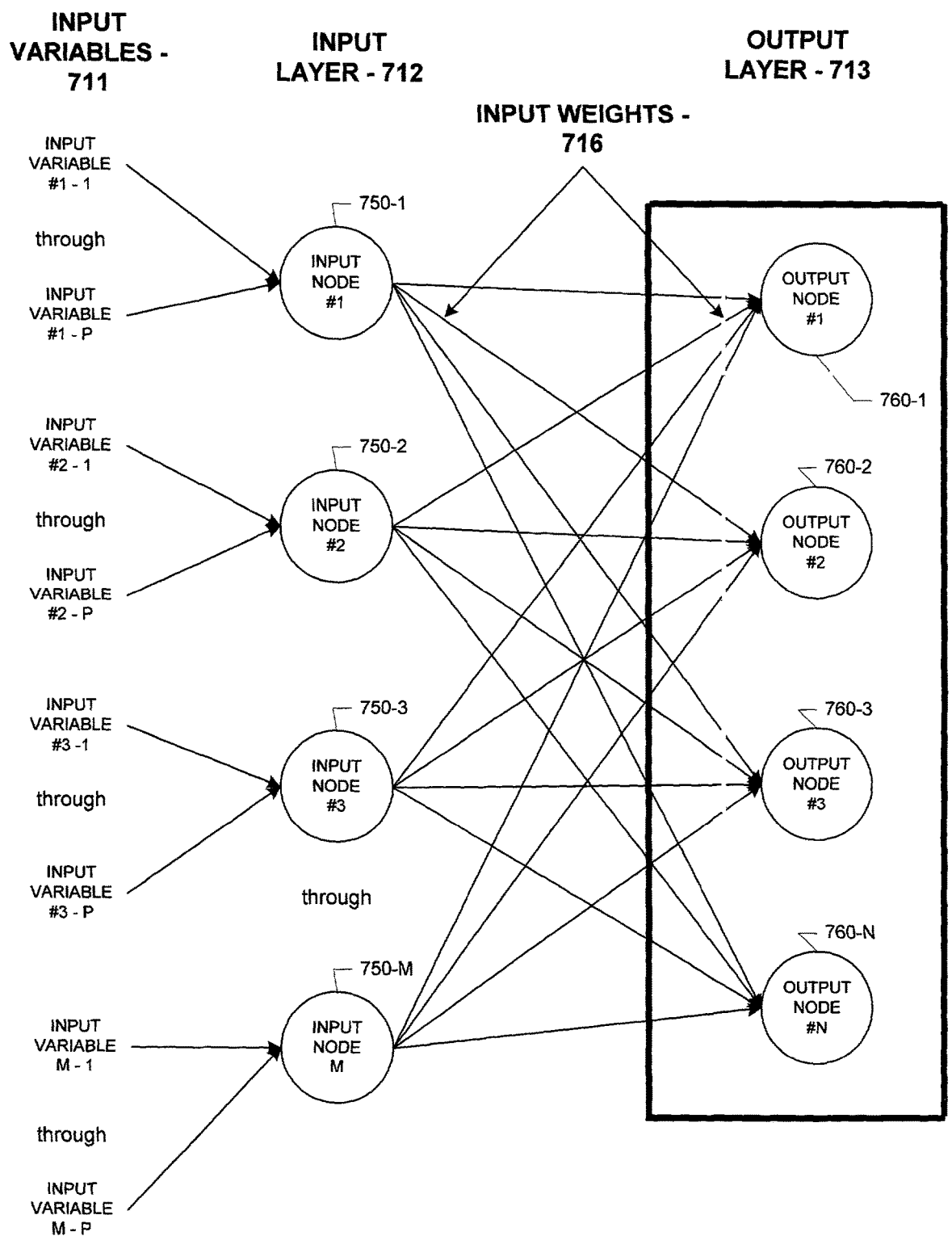

The valuation of an organization and the enterprises in the organization using the approach outlined above is completed in five distinct stages. As shown in FIG. 5A, FIG. 5B, FIG. 5C, FIG. 5D, FIG. 5E and FIG. 5F the first stage of processing (block 200 from FIG. 1) programs bots to continually extract, aggregate, manipulate and store the data from user input and databases and the internet (5, 10, 15, 25, 30, 35 or 40) as required for the analysis of business value. Bots are independent components of the application that have specific tasks to perform. As shown in FIG. 6A, FIG. 6B and FIG. 6C the second stage of processing (block 300 from FIG. 1) programs analysis bots to continually:

1. identify the item variables, item performance indicators and composite variables for each enterprise, element of value and sub-element of value that drive the components of value (revenue, expense and changes in capital),
2. create vectors that summarize the performance of the item variables and item performance indicators for each enterprise contribution, element of value and sub-element of value,
3. determine the appopriate cost of capital and value the organization and enteprise real options;
4. determine the apporiate cost of capital, value and allocate the industry real options to each organization or enterprise on the basis of relative element strength;
5. determine the expected life of each element of value and sub-element of value;
6. calculate the organization and enterprise current operation values and value the revenue, expense and capital components said current operations using the information prepared in the previous stage of processing;
7. specify and optimize predictive models to determine the relationship between the vectors determined in step 2 and the revenue, expense and capital values determined in step 6,
8. combine the results of the fifth, sixth and seventh stages of processing to determine the value of each, enterprise contribution, element and sub-element (as shown in Table 7);

The third stage of processing (block 400 from FIG. 1) analyzes the market sentiment associated with each enterprise as shown in FIG. 7. The fourth stage of processing (block 500 from FIG. 1) displays the results of the prior calculations in specified formats and optionally generates trades in enterprise stock as shown in FIG. 8. The fifth and final stage of processing (block 600 from FIG. 1) identifies potential improvements in organization and enterprise operation and analyzes the impact of proposed improvements on financial performance and business value for the organization and each enterprise as shown in FIG. 9.

System Settings and Data Bots

The flow diagrams in FIG. 5A, FIG. 5B, FIG. 5C, FIG. 5D, FIG. 5E and FIG. 5F detail the processing that is completed by the portion of the application software (200) that extracts, aggregates, transforms and stores the information required for system operation from: the basic financial system database (5), operation management system database (10), human resource information system database (15), external database (25), advanced financial system database (30), soft asset management system database (35), the internet (40) and the user (20). A brief overview of the different databases will be presented before reviewing each step of processing completed by this portion (200) of the application software.

Corporate financial software systems are generally divided into two categories, basic and advanced. Advanced financial systems utilize information from the basic financial systems to perform financial analysis, financial planning and financial reporting functions. Virtually every commercial enterprise uses some type of basic financial system as they are required to use these systems to maintain books and records for income tax purposes. An increasingly large percentage of these basic financial systems are resident in microcomputer and workstation systems. Basic financial systems include general-ledger accounting systems with associated accounts receivable, accounts payable, capital asset, inventory, invoicing, payroll and purchasing subsystems. These systems incorporate worksheets, files, tables and databases. These databases, tables and files contain information about the company operations and its related accounting transactions. As will be detailed below, these databases, tables and files are accessed by the application software of the present invention as required to extract the information required for completing a business valuation. The system is also capable of extracting the required information from a data warehouse (or datamart) when the required information has been pre-loaded into the warehouse.

General ledger accounting systems generally store only valid accounting transactions. As is well known, valid accounting transactions consist of a debit component and a credit component where the absolute value of the debit component is equal to the absolute value of the credit component. The debits and the credits are posted to the separate accounts maintained within the accounting system. Every basic accounting system has several different types of accounts. The effect that the posted debits and credits have on the different accounts depends on the account type as shown in Table 8.

TABLE 8

| Account Type: | Debit Impact: | Credit Impact: |
|---|---|---|
| Asset | Increase | Decrease |
| Revenue | Decrease | Increase |
| Expense | Increase | Decrease |
| Liability | Decrease | Increase |
| Equity | Decrease | Increase |

General ledger accounting systems also require that the asset account balances equal the sum of the liability account balances and equity account balances at all times.

The general ledger system generally maintains summary, dollar only transaction histories and balances for all accounts while the associated subsystems, accounts payable, accounts receivable, inventory, invoicing, payroll and purchasing, maintain more detailed historical transaction data and balances for their respective accounts. It is common practice for each subsystem to maintain the detailed information shown in Table 9 for each transaction.

TABLE 9

| Subsystem | Detailed Information |
|---|---|
| Accounts Payable | Vendor, Item(s), Transaction Date, Amount Owed, Due Date, Account Number |
| Accounts Receivable | Customer, Transaction Date, Product Sold, Quantity, Price, Amount Due, Terms, Due Date, Account Number |
| Capital Assets | Asset ID, Asset Type, Date of Purchase, Purchase Price, Useful Life, Depreciation Schedule, Salvage Value |
| Inventory | Item Number, Transaction Date, Transaction Type, Transaction Qty, Location, Account Number |
| Invoicing | Customer Name, Transaction Date, Item(s) Sold, Amount Due, Due Date, Account Number |
| Payroll | Employee Name, Employee Title, Pay Frequency, Pay Rate, Account Number |
| Purchasing | Vendor, Item(s), Purchase Quantity, Purchase Price(s), Due Date, Account Number |

As is well known, the output from a general ledger system includes income statements, balance sheets and cash flow statements in well defined formats which assist management in measuring the financial performance of the firm during the prior periods when data input and system processing have been completed.

While basic financial systems are similar between firms, operation management systems vary widely depending on the type of company they are supporting. These systems typically have the ability to not only track historical transactions but to forecast future performance. For manufacturing firms, operation management systems such as Enterprise Resource Planning Systems (ERP), Material Requirement Planning Systems (MRP), Purchasing Systems, Scheduling Systems and Quality Control Systems are used to monitor, coordinate, track and plan the transformation of materials and labor into products. Systems similar to the one described above may also be useful for distributors to use in monitoring the flow of products from a manufacturer.

Operation Management Systems in manufacturing firms may also monitor information relating to the production rates and the performance of individual production workers, production lines, work centers, production teams and pieces of production equipment including the information shown in Table 10.

TABLE 10

Operation Management System - Production Information

1. ID number (employee id/machine id)
2. Actual hours - last batch
3. Standard hours - last batch
4. Actual hours - year to date
5. Actual/Standard hours - year to date %
6. Actual setup time - last batch
7. Standard setup time - last batch
8. Actual setup hours - year to date
9. Actual/Standard setup hrs - yr to date %
10. Cumulative training time
11. Job(s) certifications
12. Actual scrap - last batch
13. Scrap allowance - last batch
14. Actual scrap/allowance - year to date
15. Rework time/unit last batch
16. Rework time/unit year to date
17. QC rejection rate - batch
18. QC rejection rate - year to date Operation management systems are also useful for tracking requests for service to repair equipment in the field or in a centralized repair facility. Such systems generally store information similar to that shown below in Table 11.

TABLE 11

Operation Management System - Service Call Information

1. Customer name
2. Customer number
3. Contract number
4. Service call number
5. Time call received
6. Product(s) being fixed
7. Serial number of equipment
8. Name of person placing call
9. Name of person accepting call
10. Promised response time
11. Promised type of response
12. Time person dispatched to call
13. Name of person handling call
14. Time of arrival on site
15. Time of repair completion
16. Actual response type
17. Part(s) replaced
18. Part(s) repaired
19. 2nd call required
20. 2nd call number Computer based human resource systems may some times be packaged or bundled within enterprise resource planning systems such as those available from SAP, Oracle and Peoplesoft. Human resource systems are increasingly used for storing and maintaining corporate records concerning active employees in sales, operations and the other functional specialties that exist within a modern corporation. Storing records in a centralized system facilitates timely, accurate reporting of overall manpower statistics to the corporate management groups and the various government agencies that require periodic updates. In some cases human resource systems include the company payroll system as a subsystem. In the preferred embodiment of the present invention, the payroll system is part of the basic financial system. These systems can also be used for detailed planning regarding future manpower requirements. Human resource systems typically incorporate worksheets, files, tables and databases that contain information about the current and future employees. As will be detailed below, these databases, tables and files are accessed by the application software of the present invention as required to extract the information required for completing a business valuation. It is common practice for human resource systems to store the information shown in Table 12 for each employee.

TABLE 12

Human Resource System Information

1. Employee name
2. Job title
3. Job code
4. Rating
5. Division
6. Department
7. Employee No./(Social Security Number)
8. Year to date - hours paid
9. Year to date - hours worked
10. Employee start date - company
11. Employee start date - department
12. Employee start date - current job
13. Training courses completed
14. Cumulative training expenditures
15. Salary history
16. Current salary
17. Educational background
18. Current supervisor External databases can be used for obtaining information that enables the definition and evaluation of a variety of things including elements of value, sentiment factors, industry real options and composite variables. In some cases information from these databases can be used to supplement information obtained from the other databases and the internet (5, 10, 15, 30, 35 and 40). In the system of the present invention, the information extracted from external databases (25) can be in the forms listed in Table 13.

Types of information a) numeric information such as that found in the SEC Edgar database and the databases of financial infomediaries such as FirstCall, IBES and Compustat,
b) text information such as that found in the Lexis Nexis database and databases containing past issues from specific publications,
c) multimedia information such as video and audio clips, and
d) geospatial data.

The system of the present invention uses different "bot" types to process each distinct data type from external databases (25). The same "bot types" are also used for extracting each of the different types of data from the internet (40). The system of the present invention must have access to at least one external database (25) that provides information regarding the equity prices for each enterprise in the organization and the equity prices and financial performance of competitors.

Advanced financial systems may also use information from external databases (25) and the internet (40) in completing their processing. Advanced financial systems include financial planning systems and activity based costing systems. Activity based costing systems may be used to supplement or displace the operation of the expense component analysis segment of the present invention as disclosed previously. Financial planning systems generally use the same format used by basic financial systems in forecasting income statements, balance sheets and cash flow statements for future periods. Management uses the output from financial planning systems to highlight future financial difficulties with a lead time sufficient to permit effective corrective action and to identify problems in company operations that may be reducing the profitability of the business below desired levels. These systems are most often developed by individuals within companies using 2 and 3 dimensional spreadsheets such as Lotus 1-2-3®, Microsoft Excel® and Quattro Pro®. In some cases, financial planning systems are built within an executive information system (EIS) or decision support system (DSS). For the preferred embodiment of the present invention, the advanced financial system database is similar to the financial planning system database detailed in U.S. Pat. No. 5,165,109 for "Method of and System for Generating Feasible, Profit Maximizing Requisition Sets", by Jeff S. Eder, the disclosure of which is incorporated herein by reference.

While advanced financial planning systems have been around for some time, soft asset management systems are a relatively recent development. Their appearance is further proof of the increasing importance of "soft" assets. Soft asset management systems include: alliance management systems, brand management systems, customer relationship management systems, channel management systems, intellectual property management systems, process management systems and vendor management systems. Soft asset management systems are similar to operation management systems in that they generally have the ability to forecast future events as well as track historical occurrences. Customer relationship management systems are the most well established soft asset management systems at this point and will the focus of the discussion regarding soft asset management system data. In firms that sell customized products, the customer relationship management system is generally integrated with an estimating system that tracks the flow of estimates into quotations, orders and eventually bills of lading and invoices. In other firms that sell more standardized products, customer relationship management systems generally are used to track the sales process from lead generation to lead qualification to sales call to proposal to acceptance (or rejection) and delivery. All customer relationship management systems would be expected to track all of the customer's interactions with the enterprise after the first sale and store information similar to that shown below in Table 14.

TABLE 14

Customer Relationship Management System - Information

1. Customer/Potential customer name
2. Customer number
3. Address
4. Phone number
5. Source of lead
6. Date of first purchase
7. Date of last purchase
8. Last sales call/contact
9. Sales call history
10. Sales contact history
11. Sales history: product/qty/price
12. Quotations: product/qty/price
13. Custom product percentage TABLE 14-continued Customer Relationship Management System - Information 14. Payment history
15. Current A/R balance
16. Average days to pay System processing of the information from the different databases and the internet (5, 10, 15, 25, 30, 35 and 40) described above starts in a block 201, FIG. 5A, which immediately passes processing to a software block 202. The software in block 202 prompts the user (20) via the system settings data window (701) to provide system setting information. The system setting information entered by the user (20) is transmitted via the network (45) back to the application server (120) where it is stored in the system settings table (140) in the application database (50) in a manner that is well known. The specific inputs the user (20) is asked to provide at this point in processing are shown in Table 15.

TABLE 15

1. New run or structure revision?
2. Continuous, If yes, frequency?
   (hourly, daily, weekly, monthly or quarterly)
3. Structure of virtual organization
   (organization, enterprises and sub-elements)
4. Organization checklist
5. Enterprise checklist
6. Base acount structure
7. Metadata standard (XML, MS OIM, MDC)
8. Location of basic financial system database and metadata
9. Location of advanced financial system database and metadata
10. Location of human resource information
    system database and metadata
11. Location of operation management system database and metadata
12. Location of soft asset management system databases and metadata
13. Location of external database and metadata
14. Location of account structure
15. Base currency
16. Location of database and metadata for equity information
17. Location of database and metadata for debt information
18. Location of database and metadata for tax rate information
19. Location of database and metadata for
    currency conversion rate information
20. Geospatial data? If yes, identity of geocoding service.
21. The maximum number of generations to
    be processed without improving fitness
22. Default clustering algorithm (selected from list)
    and maximum cluster number
23. Amount of cash and marketable securities
    required for day to day operations
24. Weighted average cost of capital (optional input)
25. Number of months a product is considered
    new after it is first produced
26. Organization industry segments (SIC Code)
27. Enterprise industry segments (SIC Code)
28. Primary competitors by industry segment
29. Management report types (text, graphic, both)
30. Default reports
31. Trading in enterprise equity authorized?
32. On-line equity trading account information
33. Default Missing Data Procedure
34. Maximum time to wait for user input The organization and enterprise checklists are used by a "rules" engine (such as the one available from Neuron Data) in block 202 to influence the number and type of items with pre-defined metadata mapping for each category of value. For example, if the checklists indicate that the organization and enterprises are focused on branded, consumer markets, then additional brand related factors will be pre-defined for mapping. The application of these system settings will be further explained as part of the detailed explanation of the system operation.

The software in block 202 also uses the current system date to determine the time periods (months) that require data in order to complete the current operation and the real option valuations and stores the resulting date range in the system settings table (140). In the preferred embodiment the valuation of the current operation by the system utilizes basic finance, advanced financial, soft asset management, external database and human resource data for the three year period before and the three year forecast period after the current date.

After the storage of system setting data is complete, processing advances to a software block 203. The software in block 203 prompts the user (20) via the metadata and conversion rules window (702) to map metadata using the standard specified by the user (20) (XML, Microsoft's Open Information Model of the Metadata Coalitions specification) from the basic financial system database (5), the operation management system database (10), the human resource information system database (15), the external database (25), the advanced financial system database (30) and the soft asset management system database (35) to the organizational hierarchy stored in the system settings table (140) and to the pre-specified fields in the metadata mapping table (141). Pre-specified fields in the metadata mapping table include, the revenue, expense and capital components and sub-components for the organization and each enterprise and pre-specified fields for expected value drivers. Because the bulk of the information being extracted is financial information, the metadata mapping often takes the form of specifying the account number ranges that correspond to the different fields in the metadata mapping table (141). Table 16, shows the base account number structure that the account numbers in the other systems must align with. For example, using the structure shown below, the revenue component for the organization could be specified as organization 01, any enterprise number, any deparment number, accounts 400 to 499 (the revenue account range) with any sub-account.

TABLE 16

| Account Number | 01- | 800- | 901- | 677- | 003 |
|---|---|---|---|---|---|
| Segment | Organization | Enterprise | Department | Account | Sub-account |
| Subgroup | Products | Workstation | Marketing | Labor | P.R. |
| Position | 5 | 4 | 3 | 2 | 1 |

As part of the metadata mapping process, any database fields that are not mapped to pre-specified fields are defined by the user (20) as component of value. elements of value or non-relevant attributes and "mapped" in the metadata mapping table (141) to the corresponding fields in each database in a manner identical to that described above for the pre-specified fields. After all fields have been mapped to the metadata mapping table (141), the software in block 203 prompts the user (20) via the metadata and conversion rules window (702) to provide conversion rules for each metadata field for each data source. IConversion rules will include information regarding currency conversions and conversion for units of measure that may be required to accurately and consistently analyze the data. The inputs from the user (20) regarding conversion rules are stored in the conversion rules table (142) in the application database. When conversion rules have been stored for all fields from every data source, then processing advances to a software block 204.

The software in block 204 checks the system settings table (140) in the application database (50) to determine if the current calculation is a new calculation or a structure change. If the calculation is not a new calculation or a structure change then processing advances to a software block 212. Alternatively, if the calculation is new or a structure change, then processing advances to a software block 207.

The software in block 207 checks the bot date table (149) and deactivates any basic financial system data bots with creation dates before the current system date and retrieves information from the system setting table (140), metadata mapping table (141) and conversion rules table (142). The software in block 207 then initializes data bots for each field in the metadata mapping table (141) that mapped to the basic financial system database (5) in accordance with the frequency specified by user (20) in the system settings table (140). Bots are independent components of the application that have specific tasks to perform. In the case of data acquisition bots, their tasks are to extract and convert data from a specified source and then store it in a specified location. Each data bot initialized by software block 207 will store its data in the basic financial system table (143). Every data acquisition bot for every data source contains the information shown in Table 17.

TABLE 17

1. Unique ID number (based on date, hour, minute, second of creation)
2. The data source location
3. Mapping information
4. Timing of extraction
5. Conversion rules (if any)
6. Storage Location (to allow for tracking of source and destination events)
7. Creation date (day, hour, minute, second)

After the software in block 207 initializes all the bots for the basic financial system database, processing advances to a block 208. In block 208, the bots extract and convert data in accordance with their preprogrammed instructions in accordance with the frequency specified by user (20) in the system settings table (140). As each bot extracts and converts data from the basic financial system database (5), processing advances to a software block 209 before the bot completes data storage. The software in block 209 checks the basic financial system metadata to see if all fields have been extracted. If the software in block 209 finds no unmapped data fields, then the extracted, converted data is stored in the basic financial system table (143). Alternatively, if there are fields that haven't been extracted, then processing advances to a block 210. The software in block 210 prompts the user (20) via the metadata and conversion rules window (702) to provide metadata and conversion rules for each new field. The information regarding the new metadata and conversion rules is stored in the metadata mapping table (141) and conversion rules table (142) while the extracted, converterd data is stored in the basic financial system table (143). It is worth noting at this point that the activation and operation of bots that don't have unmapped fields continues. Only bots with unmapped fields "wait" for user input before completing data storage. The new metadata and conversion rule information will be used the next time bots are initialized in accordance with the frequency established by the user (20). In either event, system processing then passes, on to software block 212.

The software in block 212 checks the system settings table (140) in the application database (50) to determine if the current calculation is a new calculation or a structure change. If the calculation is not a new calculation or a structure change then processing advances to a software block 224. Alternatively, if the calculation is new or a structure change, then processing advances to a software block 221.

The software in block 221 checks the bot date table (149) and deactivates any operations management system data bots with creation dates before the current system date and retrieves information from the system setting table (140), metadata mapping table (141) and conversion rules table (142). The software in block 221 then initializes data bots for each field in the metadata mapping table (141) that mapped to the operations management system database (10) in accordance with the frequency specified by user (20) in the system settings table (140). Each data bot initialized by software block 221 will store its data in the operations system table (144).

After the software in block 221 initializes all the bots for the operations management system database, processing advances to a block 222. In block 222, the bots extract and convert data in accordance with their preprogrammed instructions in accordance with the frequency specified by user (20) in the system settings table (140). As each bot extracts and converts data from the operations management system database (10), processing advances to a software block 209 before the bot completes data storage. The software in block 209 checks the operations management system metadata to see if all fields have been extracted. If the software in block 209 finds no unmapped data fields, then the extracted, converted data is stored in the operations system table (144). Alternatively, if there are fields that haven't been extracted, then processing advances to a block 210. The software in block 210 prompts the user (20) via the metadata and conversion rules window (702) to provide metadata and conversion rules for each new field. The information regarding the new metadata and conversion rules is stored in the metadata mapping table (141) and conversion rules table (142) while the extracted, converterd data is stored in the operations system table (144). It is worth noting at this point that the activation and operation of bots that don't have unmapped fields continues. Only bots with unmapped fields "wait" for user input before completing data storage. The new metadata and conversion rule information will be used the next time bots are initialized in accordance with the frequency established by the user (20). In either event, system processing then passes, on to software block 224.

The software in block 224 checks the system settings table (140) in the application database (50) to determine if the current calculation is a new calculation or a structure change. If the calculation is not a new calculation or a structure change then processing advances to a software block 228. Alternatively, if the calculation is new or a structure change, then processing advances to a software block 225.

The software in block 225 checks the bot date table (149) and deactivates any human resource management system data bots with creation dates before the current system date and retrieves information from the system setting table (140), metadata mapping table (141) and conversion rules table (142). The software in block 225 then initializes data bots for each field in the metadata mapping table (141) that mapped to the human resource management system database (15) in accordance with the frequency specified by user (20)

in the system settings table (140). Each data bot initialized by software block 225 will store its data in the human resource system table (145).

After the software in block 225 initializes all the bots for the human resource management system database, processing advances to a block 226. In block 226, the bots extract and convert data in accordance with their preprogrammed instructions in accordance with the frequency specified by user (20) in the system settings table (140). As each bot extracts and converts data from the human resource management system database (15), processing advances to a software block 209 before the bot completes data storage. The software in block 209 checks the human resource management system metadata to see if all fields have been extracted. If the software in block 209 finds no unmapped data fields, then the extracted, converted data is stored in the human resource system table (145). Alternatively, if there are fields that haven't been extracted, then processing advances to a block 210. The software in block 210 prompts the user (20) via the metadata and conversion rules window (702) to provide metadata and conversion rules for each new field. The information regarding the new metadata and conversion rules is stored in the metadata mapping table (141) and conversion rules table (142) while the extracted, converterd data is stored in the human resource system table (145). It is worth noting at this point that the activation and operation of bots that don't have unmapped fields continues. Only bots with unmapped fields "wait" for user input before completing data storage. The new metadata and conversion rule information will be used the next time bots are initialized in accordance with the frequency established by the user (20). In either event, system processing then passes, on to software block 228.

The software in block 228 checks the system settings table (140) in the application database (50) to determine if the current calculation is a new calculation or a structure change. If the calculation is not a new calculation or a structure change then processing advances to a software block 244. Alternatively, if the calculation is new or a structure change, then processing advances to a software block 241.

The software in block 241 checks the bot date table (149) and deactivates any external database data bots with creation dates before the current system date and retrieves information from the system setting table (140), metadata mapping table (141) and conversion rules table (142). The software in block 241 then initializes data bots for each field in the metadata mapping table (141) that mapped to the external database (25) in accordance with the frequency specified by user (20) in the system settings table (140). Each data bot initialized by software block 241 will store its data in the external database table (146).

After the software in block 241 initializes all the bots for the external database, processing advances to a block 242. In block 242, the bots extract and convert data in accordance with their preprogrammed instructions. As each bot extracts and converts data from the external database (25), processing advances to a software block 209 before the bot completes data storage. The software in block 209 checks the external database metadata to see if all fields have been extracted. If the software in block 209 finds no unmapped data fields, then the extracted, converted data is stored in the external database table (146). Alternatively, if there are fields that haven't been extracted, then processing advances to a block 210. The software in block 210 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data is stored in the external database table (146). It is worth noting at this point that the activation and operation of bots that don't have unmapped fields continues. Only bots with unmapped fields "wait" for user input before completing data storage. The new metadata and conversion rule information will be used the next time bots are initialized in accordance with the frequency established by the user (20). In either event, system processing then passes, on to software block 244.

The software in block 244 checks the system settings table (140) in the application database (50) to determine if the current calculation is a new calculation or a structure change. If the calculation is not a new calculation or a structure change then processing advances to a software block 248. Alternatively, if the calculation is new or a structure change, then processing advances to a software block 245.

The software in block 245 checks the bot date table (149) and deactivates any advanced financial system data bots with creation dates before the current system date and retrieves information from the system setting table (140), metadata mapping table (141) and conversion rules table (142). The software in block 245 then initializes data bots for each field in the metadata mapping table (141) that mapped to the advanced financial system database (30) in accordance with the frequency specified by user (20) in the system settings table (140). Each data bot initialized by software block 245 will store its data in the advanced financial system database table (147).

After the software in block 245 initializes all the bots for the advanced financial system database, processing advances to a block 246. In block 246, the bots extract and convert data in accordance with their preprogrammed instructions in accordance with the frequency specified by user (20) in the system settings table (140). As each bot extracts and converts data from the advanced financial system database (30), processing advances to a software block 209 before the bot completes data storage. The software in block 209 checks the advanced financial system database metadata to see if all fields have been extracted. If the software in block 209 finds no unmapped data fields, then the extracted, converted data is stored in the advanced financial system database table (147). Alternatively, if there are fields that haven't been extracted, then processing advances to a block 210. The software in block 210 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data is stored in the advanced financial system database table (147). It is worth noting at this point that the activation and operation of bots that don't have unmapped fields continues. Only bots with unmapped fields "wait" for user input before completing data storage. The new metadata and conversion rule information will be used the next time bots are initialized in accordance with the frequency established by the user (20). In either event, system processing then passes, on to software block 248.

The software in block 248 checks the system settings table (140) in the application database (50) to determine if the current calculation is a new calculation or a structure change. If the calculation is not a new calculation or a structure change then processing advances to a software block 264. Alternatively, if the calculation is new or a structure change, then processing advances to a software block 261.

The software in block 261 checks the bot date table (149) and deactivates any soft asset management system data bots with creation dates before the current system date and retrieves information from the system setting table (140), metadata mapping table (141) and conversion rules table (142). The software in block 261 then initializes data bots for each field in the metadata mapping table (141) that mapped to a soft asset management system database (35) in accordance with the frequency specified by user (20) in the system settings table (140). Extracting data from each soft asset management system ensures that the management of each soft asset is considered and prioritized within the overall financial models for the organization and each enterprise in the organization. Each data bot initialized by software block 261 will store its data in the soft asset system table (148).

After the software in block 261 initializes bots for all soft asset management system databases, processing advances to a block 262. In block 262, the bots extract and convert data in accordance with their preprogrammed instructions in accordance with the frequency specified by user (20) in the system settings table (140). As each bot extracts and converts data from the soft asset management system databases (35), processing advances to a software block 209 before the bot completes data storage. The software in block 209 checks the metadata for the soft asset management system databases to see if all fields have been extracted. If the software in block 209 finds no unmapped data fields, then the extracted, converted data is stored in the soft asset system table (148). Alternatively, if there are fields that haven't been extracted, then processing advances to a block 210. The software in block 210 prompts the user (20) via the metadata and conversion rules window (702) to provide metadata and conversion rules for each new field. The information regarding the new metadata and conversion rules is stored in the metadata mapping table (141) and conversion rules table (142) while the extracted, converterd data is stored in the soft asset system table (148). It is worth noting at this point that the activation and operation of bots that don't have unmapped fields continues. Only bots with unmapped fields "wait" for user input before completing data storage. The new metadata and conversion rule information will be used the next time bots are initialized in accordance with the frequency established by the user (20). In either event, system processing then passes, on to software block 264.

The software in block 264 checks the system settings table (140) in the application database (50) to determine if the current calculation is a new calculation or a structure change. If the calculation is not a new calculation or a structure change then processing advances to a software block 276. Alternatively, if the calculation is new or a structure change, then processing advances to a software block 265.

The software in block 265 prompts the user (20) via the identification and classification rules window (703) to identify keywords such as company names, brands, trademarks, competitors for pre-specified fields in the metadata mapping table (141). The user (20) also has the option of mapping keywords to other fields in the metadata mapping table (141). After specifying the keywords, the user (20) is prompted to select and classify descriptive terms for each keyword. The input from the user (20) is stored in the keyword table (150) in the application database before processing advances to a software block 266.

The software in block 266 checks the bot date table (149) and deactivates any internet text bots with creation dates before the current system date and retrieves information from the system settings table (140), the metadata mapping table (141) and the keyword table (150). The software in block 266 then initializes internet text bots for each field in the metadata mapping table (141) that mapped to a keyword in accordance with the frequency specified by user (20) in the system settings table (140) before advancing processing to a software block 267.

Bots are independent components of the application that have specific tasks to perform. In the case of text bots, their tasks are to locate, count and classify keyword matches from a specified source and then store their findings in a specified location. Each text bot initialized by software block 266 will store the location, count and classification data it discovers in the classified text table (151). Multimedia data can be processed using bots with essentially the same specifications if software to translate and parse the multimedia content is included in each bot. Every internet text bot contains the information shown in Table 18.

TABLE 18

1. Unique ID number (based on date, hour, minute, second of creation)
2. Creation date (day, hour, minute, second)
3. Storage location
4. Mapping information
5. Home URL
6. Keyword
7. Descriptive term 1
   To
7 + n. Descriptive term n In block 267 the text bots locate and classify data from the external database (25) in accordance with their programmed instructions in accordance with the frequency specified by user (20) in the system settings table (140). As each text bot locates and classifies data from the internet (40) processing advances to a software block 268 before the bot completes data storage. The software in block 268 checks to see if all keyword hits are associated with descriptive terms that have been been classified. If the software in block 268 doesn't find any unclassified "hits", then the address, count and classified text are stored in the classified text table (151). Alternatively, if there are terms that haven't been classified, then processing advances to a block 269. The software in block 269 prompts the user (20) via the identification and classification rules window (703) to provide classification rules for each new term. The information regarding the new classification rules is stored in the keyword table (150) while the newly classified text is stored in the classified text table (151). It is worth noting at this point that the activation and operation of bots that don't have unclassified fields continues. Only bots with unclassified fields will "wait" for user input before completing data storage. The new classification rules will be used the next time bots are initialized in accordance with the frequency established by the user (20). In either event, system processing then passes, on to a software block 270.

The software in block 270 checks the bot date table (149) and deactivates any external database text bots with creation dates before the current system date and retrieves information from the system settings table (140), the metadata mapping table (141) and the keyword table (150). The software in block 270 then initializes external database text bots for each field in the metadata mapping table (141) that mapped to a keyword in accordance with the frequency specified by user (20) in the system settings table (140) before advancing processing to a software block 271. Every text bot initialized by software block 270 will store the location, count and classification data it discovers in the classified text table (151). Every external database text bot contains the information shown in Table 19.

TABLE 19

1. Unique ID number (based on date, hour, minute, second of creation)
2. Creation date (day, hour, minute, second)
3. Storage location
4. Mapping information
5. Data Source
6. Keyword
7. Descriptive term 1
  To
7 + n. Descriptive term n In block 271 the text bots locate and classify data from the external database (25) in accordance with its programmed instructions with the frequency specified by user (20) in the system settings table (140). As each text bot locates and classifies data from the external database (25) processing advances to a software block 268 before the bot completes data storage. The software in block 268 checks to see if all keyword hits are associated with descriptive terms that have been been classified. If the software in block 268 doesn't find any unclassified "hits", then the address, count and classified text are stored in the classified text table (151). Alternatively, if there are terms that haven't been classified, then processing advances to a block 269. The software in block 269 prompts the user (20) via the identification and classification rules window (703) to provide classification rules for each new term. The information regarding the new classification rules is stored in the keyword table (150) while the newly classified text is stored in the classified text table (151). It is worth noting at this point that the activation and operation of bots that don't have unclassified fields continues. Only bots with unclassified fields "wait" for user input before completing data storage. The new classification rules will be used the next time bots are initialized in accordance with the frequency established by the user (20). In either event, system processing then passes, on to software block 276.

The software in block 276 checks the system settings table (140) in the application database (50) to determine if the current calculation is a new calculation or a structure change. If the calculation is not a new calculation or a structure change then processing advances to a software block 280. Alternatively, if the calculation is new or a structure change, then processing advances to a software block 277.

The software in block 277 checks the system setting table (140) to see if there is geocoded data in the application database (50) and to determine which on-line geocoding service (Centrus™ from QM Soft or MapMarker™ from MapInfo) is being used. If geospatial data is not being used, then processing advances to a block 291. Alternatively, if the software in block 277 determines that geospatial data is being used, processing advances to a software block 278.

The software in block 278 prompts the user (20) via the geospatial meaure definitions window (709) to define the measures that will be used in evaluating the elements of value. After specifying the measures, the user (20) is prompted to select the geospatial locus for each measure from the data already stored in the application database (50). The input from the user (20) is stored in the geospatial measures table (152) in the application database before processing advances to a software block 279.

The software in block 279 checks the bot date table (149) and deactivates any geospatial bots with creation dates before the current system date and retrieves information from the system settings table (140), the metadata mapping table (141) and the geospatial measures table (152). The software in block 279 then initializes geospatial bots for each field in the metadata mapping table (141) that mapped to geospatial data in the application database (50) in accordance with the frequency specified by user (20) in the system settings table (140) before advancing processing to a software block 280.

Bots are independent components of the application that have specific tasks to perform. In the case of geospatial bots, their tasks are to calculate user specified measures using a specified geocoding service and then store the measures in a specified location. Each geospatial bot initialized by software block 279 will store the measures it calculates in the application database table where the geospatial data was found. Tables that could include geospatial data include: the basic financial system table (143), the operation system table (144), the human resource system table (145), the external database table (146), the advanced finance system table (147) and the soft asset system table (148). Every geospatial bot contains the information shown in Table 20.

TABLE 20

1. Unique ID number (based on date, hour, minute, second of creation)
2. Creation date (day, hour, minute, second)
3. Mapping information
4. Storage location
5. Geospatial locus
6. Geospatial measure
7. Geocoding service In block 280 the geospatial bots locate data and complete measurements in accordance with their programmed instructions with the frequency specified by the user (20) in the system settings table (140). As each geospatial bot retrieves data and calculates the geospatial measures that have been specified, processing advances to a block 281 before the bot completes data storage. The software in block 281 checks to see if all geospatial data located by the bot has been been measured. If the software in block 281 doesn't find any unmeasured data, then the measurement is stored in the application database (50). Alternatively, if there are data elements that haven't been measured, then processing advances to a block 282. The software in block 282 prompts the user (20) via the geospatial measure definition window (709) to provide measurement rules for each new term. The information regarding the new measurement rules is stored in the geospatial measures table (152) while the newly calculated measurement is stored in the appropriate table in the application database (50). It is worth noting at this point that the activation and operation of bots that don't have unmeasured fields continues. Only the bots with unmeasured fields "wait" for user input before completing data storage. The new measurement rules will be used the next time bots are initialized in accordance with the frequency established by the user (20). In either event, system processing then passes on to a software block 291.

The software in block 291 checks: the basic financial system table (143), the operation system table (144), the human resource system table (145), the external database table (146), the advanced finance system table (147), the soft asset system table (148), the classified text table (151) and the geospatial measures table (152) to see if data is missing from any of the periods required for system calculation. The range of required dates was previously calculated by the software in block 202. If there is no data missing from any period, then processing advances to a software block 293. Alternatively, if there is missing data for any field for any period, then processing advances to a block 292.

The software in block 292, prompts the user (20) via the missing data window (704) to specify the method to be used for filling the blanks for each item that is missing data. Options the user (20) can choose from for filling the blanks include: the average value for the item over the entire time period, the average value for the item over a specified period, zero, the average of the preceeding item and the following item values and direct user input for each missing item. If the user (20) doesn't provide input within a specified interval, then the default missing data procedure specified in the system settings table (140) is used. When all the blanks have been filled and stored for all of the missing data, system processing advances to a block 293.

The software in block 293 calculates attributes by item for each numeric data field in the basic financial system table (143), the operation system table (144), the human resource system table (145), the external database table (146), the advanced finance system table (147) and the soft asset system table (148). The attributes calculated in this step include: cumulative total value, the period to period rate of change in value, the rolling average value and a series of time lagged values. In a similar fashion the software in block 293 calculates attributes for each date field in the specified tables including time since last occurrence, cumulative time since first occurrence, average frequency of occurrence and the rolling average frequency of occurrence. The numbers derived from numeric and date fields are collectively referred to as "item performance indicators". The software in block 293 also calculates pre-specified combinations of variables called composite variables for measuring the strength of the different elements of value. The item performance indicators are stored in the table where the item source data was obtained and the composite variables are stored in the composite variables table (153) before processing advances to a block 294.

The software in block 294 uses attribute derivation algorithms such as the AQ program to create combinations of the variables that weren't pre-specified for combination. While the AQ program is used in the preferred embodiment of the present invention, other attribute derivation algorithms such as the LINUS algorithms, may be used to the same effect. The software creates these attributes using both item variables that were specified as "element" variables and item variables that were not. The resulting composite variables are stored in the composite variables table (153) before processing advances to a block 295.

The software in block 295 uses Data Envelopement Analysis (hereinafter, DEA) to determine the relative industry ranking of the organization and enterprises being examined using the composite variables calculated in block 293. For example, DEA can be used to determine the relative efficiency of a company in receiving favorable press mentions per dollar spent on advertising. When all pre-specified industry rankings have been calculated and stored in the industry ranking table (154), processing advances to a software block 296.

The software in block 296 uses pattern-matching algorithms to assign pre-designated data fields for different elements of value to pre-defined groups with numerical values. This type of analysis is useful in classifying purchasing patterns and/or communications patterns as "heavy", "light", "moderate" or "sporadic". The assignments are calculated using the "rolling average" value for each field. The classification and the numeric value associated with the classification are stored in the application database (50) table where the data field is located before processing advances to a block 297.

The software in block 297 retrieves data from the meta-data mapping table (141), creates and then stores the definitions for the pre-defined components of value in the components of value definition table (155). As discussed previously, the revenue component of value is not divided into sub-components, the expense value is divided into five sub-components (the cost of raw materials, the cost of manufacture or delivery of service, the cost of selling, the cost of support and the cost of administration) and the capital value is divided into six sub-components: (cash, non-cash financial assets, production equipment, other assets, financial liabilities and equity) in the preferred embodiment. When data storage is complete, processing advances to a software block 302 to begin the analysis of the extracted data using analysis bots.

Analysis Bots

The flow diagrams in FIG. 6A, FIG. 6B and FIG. 6C detail the processing that is completed by the portion of the application software (300) that programs analysis bots to:
1. identify the item variables, item performance indicators and composite variables for each enterprise, element of value and sub-element of value that drive the components of value (revenue, expense and changes in capital),
2. create vectors that summarize the performance of the item variables and item performance indicators for each enterprise contribution, element of value and sub-element of value,
3. determine the appopriate cost of capital and value the organization and enteprise real options;
4. determine the appopriate cost of capital, value and allocate the industry real options to each organization or enterprise on the basis of relative element strength;
5. determine the expected life of each element of value and sub-element of value;
6. calculate the organization and enterprise current operation values and value the revenue, expense and capital components said current operations using the information prepared in the previous stage of processing;
7. specify and optimize predictive models to determine the relationship between the vectors determined in step 2 and the revenue, expense and capital values determined in step 6,
8. combine the results of the fifth, sixth and seventh stages of processing to determine the value of each, enterprise contribution, element and sub-element (as shown in Table 7);

Processing in this portion of the application begins in software block 302. The software in block 302 checks the system settings table (140) in the application database (50) to determine if the current calculation is a new calculation or a structure change. If the calculation is not a new calculation or a structure change then processing advances to a software block 3110. Alternatively, if the calculation is new or a structure change, then processing advances to a software block 303.

The software in block 303 retrieves data from the meta data mapping table (141) and the soft asset system table (148) and then assigns item variables, item performance indicators and composite variables to each element of value using a two step process. First, item variables and item performance indicators are assigned to elements of value based on the soft asset management system they correspond to (for example, all item variables from a brand management system and all item performance indicators derived from brand management system variables are assigned to the brand element of value). Second, pre-defined composite variables are assigned to the element of value they were assigned to measure in the metadata mapping table (141). After the assignment of variables and indicators to elements is complete, the resulting assignments are saved to the element of value definition table (155) and processing advances to a block 304.

The software in block 304 checks the bot date table (149) and deactivates any clustering bots with creation dates before the current system date. The software in block 304 then initializes bots as required for each component of value. The bots: activate in accordance with the frequency specified by the user (20) in the system settings table (140), retrieve the information from the system settings table (140), the metadata mapping table (141) and the component of value definition table (156) as required and define segments for the component of value data before saving the resulting cluster information in the application database (50).

Bots are independent components of the application that have specific tasks to perform. In the case of predictive model bots, their primary task is to segment the component and sub-component of value variables into distinct clusters that share similar characteristics. The clustering bot assigns a unique id number to each "cluster" it identifies and stores the unique id numbers in the cluster id table (157). Every item variable for every component and sub-component of value is assigned to one of the unique clusters. The cluster id for each variable is saved in the data record for each item variable in the table where it resides. The item variables are segmented into a number of clusters less than or equal to the maximum specified by the user (20) in the system settings. The data is segmented using the "default" clustering algorithm the user (20) specified in the system settings. The system of the present invention provides the user (20) with the choice of several clustering algorithms including: an unsupervised "Kohonen" neural network, K-nearest neighbor, Expectation Maximization (EM) and the segmental K-means algorithm. For algorithms that normally require the number of clusters to be specified the bot will iterate the number of clusters until it finds the cleanest segmentation for the data. Every clustering bot contains the information shown in Table 21.

TABLE 21

1. Unique ID number (based on date, hour, minute, second of creation)
2. Creation date (day, hour, minute, second)
3. Mapping information
4. Storage location
5. Component or subcomponent of value
6. Clustering algorithm type TABLE 21-continued 7. Maximum number of clusters
8. Variable 1
.
.
.
8 + n. Variable n When bots in block 304 have identified and stored cluster assignments for the item variables associated with each component and subcomponent of value, processing advances to a software block 305.

The software in block 305 checks the bot date table (149) and deactivates any predictive model bots with creation dates before the current system date. The software in block 305 then retrieves the information from the system settings table (140), the metadata mapping table (141), the element of value definition table (155) and the component of value definition table (156) required to initialize predictive model bots for each component of value at every level in the organization.

Bots are independent components of the application that have specific tasks to perform. In the case of predictive model bots, their primary task is determine the relationship between the item variables, item performance indicators and composite variables (collectively hereinafter, "the variables") and the components of value (and sub-components of value) by cluster at each level of the organization. A series of predictive model bots are initialized at this stage because it is impossible to know in advance which predictive model type will produce the "best" predictive model for the data from each commercial enterprise. The series for each model includes 9 predictive model bot types: neural network; CART; projection pursuit regression; generalized additive model (GAM), redundant regression network; boosted Naïve Bayes Regression; MARS; linear regression; and stepwise regression. The software in block 305 generates this series of predictive model bots for the levels of the organization shown in Table 22.

TABLE 22

Predictive models by or organization level

Organization:

Enterprise variables relationship to organization revenue component of value by cluster
Enterprise variables relationship to organization expense subcomponents of value by cluster
Enterprise variables relationship to organization capital change subcomponents of value by cluster Enterprise:

Element variables relationship to enterprise revenue component of value by cluster
Element variables relationship to enterprise expense subcomponents of value by cluster
Element variables relationship to enterprise capital change subcomponents of value by cluster Element of Value:

Sub-element of value variables relationship to element of value

Every predictive model bot contains the information shown in Table 23.

TABLE 23

1. Unique ID number (based on date, hour, minute, second of creation)
2. Creation date (day, hour, minute, second)
3. Mapping information
4. Storage location TABLE 23-continued 5. Component or subcomponent of value
6. Cluster (ID)
7. Enterprise, Element or Sub-Element ID
8. Predictive Model Type
9. Variable 1
.
.
.
9 + n. Variable n After predictive model bots for each level in the organization are initialized, the bots activate in accordance with the frequency specified by the user (20) in the system settings table (140). Once activated, the bots retrieve the required data from the appropriate table in the application database (50) and randomly partition the item variables, item performance indicators and composite variables into a training sets and a test set. The software in block 305 uses "bootstrapping" where the different training data sets are created by re-sampling with replacement from the original training set, so data records may occur more than once. The same sets of data will be used to train and then test each predictive model bot. When the predictive model bots complete their training and testing, processing advances to a block 306.

The software in block 306 uses a variable selection algorithm such as stepwise regression (other algorithms can be used) to combine the results from the predictive model bot analyses for each model to determine the best set of variables for each model. The models having the smallest amount of error as measured by applying the mean squared error algorithm to the test data are given preference in determining the best set of variables. As a result of this processing the best set of variables contain the item variables, item performance indicators and composite variables that correlate most strongly with changes in the components of value. The best set of variables will hereinafter be referred to as the "value drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected and stored in the element variables table (158) for all models at all levels, the software in block 306 tests the independence of the value drivers at the enterprise, element and sub-element level before processing advances to a block 307.

The software in block 307 checks the system settings table (140) in the application database (50) to determine if the current calculation is a new calculation, a structure change or if the interaction between value drivers has changed from being highly correlated to being independent. If the calculation is not a new calculation, a structure change or a change to independent value driver status, then processing advances to a software block 310. Alternatively, if the calculation is new, a structure change or a change to independent status, then processing advances to a software block 308. The software in block 308 checks the bot date table (149) and deactivates any induction bots with creation dates before the current system date. The software in block 308 then retrieves the information from the system settings table (140), the metadata mapping table (141), the component of value definition table (156) and the element variables table (158) as required to initialize induction model bots for each enterprise, element of value and sub-element of value at every level in the organization in accordance with the frequency specified by the user (20) in the system settings table (140) before processing advances to a block 309.

Bots are independent components of the application that have specific tasks to perform. In the case of induction bots, their primary tasks are to refine the item variable, item performance indicator and composite variable selection to reflect only causal variables and to produce formulas, (hereinafter, vectors) that summarize the relationship between the item variables, item performance indicators and composite variables and changes in the component or sub-component of value being examined. (Note: these variables are simply grouped together to represent an element vector when they are dependent). A series of induction bots are initialized at this stage because it is impossible to know in advance which induction algorithm will produce the "best" vector for the best fit variables from each model. The series for each model includes 4 induction bot types: entropy minimization, LaGrange, Bayesian and path analysis. The software in block 308 generates this series of induction bots for each set of variables stored in the element variables table (158) in the previous stage in processing. Every induction bot contains the information shown in Table 24.

TABLE 24

1. Unique ID number (based on date, hour, minute, second of creation)
2. Creation date (day, hour, minute, second)
3. Mapping information
4. Storage location
5. Component or subcomponent of value
6. Cluster (ID)
7. Enterprise, Element or Sub-Element ID
8. Variable Set
9. Induction algorithm type After the induction bots are initialized by the software in block 308 processing passes to a sotware block 309. In block 309 bots activate in accordance with the frequency specified by the user (20) in the system settings table (140). Once activated, they retrieve the element variable information for each model from the element variable table (158) and sub-divides the variables into two sets, one for training and one for testing. The same set of training data is used by each of the different types of bots for each model. After the induction bots complete their processing for each model, the software in block 309 uses a model selection algorithm to identify the vector that best fits the data for each enterprise, element or sub-element being analyzed. For the system of the present invention, a cross validation algorithm is used for model selection. The software in block 309 saves the the best fit vector in the vector table (159) in the application database (50) and processing returns to advances to a block 310. The software in block 310 tests the value drivers or vectors to see if there are "missing" value drivers that are influencing the results. If the software in block 310 doesn't detect any missing value drivers, then system processing advances to a block 322. Alternatively, if missing value drivers are detected by the software in block 310, then processing advances to a software block 321.

The software in block 321 prompts the user (20) via the variable identification window (710) to adjust the specification(s) for the affected enterprise, element of value or subelement of value. After the input from the user (20) is saved in the system settings table (140) and/or the element of value definition table (155), system processing advances to a software block 323. The software in block 323 checks the in the system settings table (140) and/or the element of value definition table (155) to see if there any changes in structure. If there have been changes in the structure, then processing advances to a block 205 and the system processing described previously is repeated. Alternatively, if there are no changes in structure, then processing advances to a block 325.

The software in block 325 checks the system settings table (140) in the application database (50) to determine if the current calculation is a new calculation or a structure change. If the calculation is not a new calculation or a structure change, then processing advances to a software block 329. Alternatively, if the calculation is new or a structure change, then processing advances to a software block 326.

The software in block 326 checks the bot date table (149) and deactivates any option bots with creation dates before the current system date. The software in block 326 then retrieves the information from the system settings table (140), the metadata mapping table (141), the basic financial system database (143), the external database table (146) and the advanced finance system table (147) as required to initialize option bots for the organization, the industry and each enterprise in the organization before processing advances to a block 327.

Bots are independent components of the application that have specific tasks to perform. In the case of option bots, their primary tasks are to calculate the cost of capital (if the user (20) hasn't specified the cost of capital in the system settings table (140)) and value the real options for the industry, the organization, and each enterprise in the organization. The base cost of capital is calculated using a well known formula for the industry and each enterprise. The bots then use the data regarding the similarity of the "soft" asset profiles between the proposed real option activity and the existing industry, organization and enterprise profiles to determine the multiple on the cost of capital that will be used in valuing the real option. The closer the real option profile is to the existing profile, the closer the multiple is to one. If sufficient data is available, pattern matching algorithms can be used to replace the assessment by the user (20). After the cost of capital multiple has been determined, the value of the real option is calculated using dynamic programming algorithms in a manner that is well known and stored in the real option value table (162). Real option values are calculated using dynamic programming algorithms. The real option can be valued using other algorithms including binomial, neural network or Black Scholes algorithms. The software in block 326 generates option bots for the industry, the organization and each enterprise in the organization.

Option bots contain the information shown in Table 25.

TABLE 25

1. Unique ID number (based on date, hour, minute, second of creation)
2. Creation date (day, hour, minute, second)
3. Mapping information
4. Storage location
5. Organization or Enterprise ID
6. Real Option Type (Industry, Organization or Enterprise)
7. Real Option
8. Allocation % (if applicable)

After the option bots are initialized by the software in block 326 processing passes to a block 327. In block 327 the bots activate in accordance with the frequency specified by the user (20) in the system settings table (140). After being activated, the bots retrieve information for the organization, the industry and each enterprise in the organization from the basic financial system database (143), the external database table (146) and the advanced finance system table (147) as required to complete the option valuation. After the cost of capital multiple has been determined the value of the real option is calculated using dynamic programming algorithms in a manner that is well known. The resulting values are then saved in the real option value table (162) in the application database (50) before processing advances to a block 328.

The software in block 328 uses the item performance indicators produced by DEA analysis in blocks 304, 308 and 314 and the percentage of industry real options controlled by the enterprise to determine the allocation percentage for industry options. The more dominant the organization and enterprise—as indicated by the industry rank for the intangible element indicators, the greater the allocation of industry real options. After the software in block 328 saves the information regarding the allocation of industry real options to the organization and each enterprise in the organization to the real option value table (162) in the application database (50) before advancing processing to a block 329.

The software in block 329 checks the system settings table (140) in the application database (50) to determine if the current calculation is a new calculation or a structure change. If the calculation is not a new calculation or a structure change, then processing advances to a software block 333. Alternatively, if the calculation is new or a structure change, then processing advances to a software block 330.

The software in block 330 checks the bot date table (149) and deactivates any cash flow bots with creation dates before the current system date. The software in block 326 then retrieves the information from the system settings table (140), the metadata mapping table (141) and the component of value definition table (156) as required to initialize cash flow bots for the organization and each enterprise in the organization in accordance with the frequency specified by the user (20) in the system settings table (140) before processing advances to a block 331.

Bots are independent components of the application that have specific tasks to perform. In the case of cash flow bots, their primary tasks are to calculate the cash flow for the organization and each enterprise in the organization for every time period where data is available and to forecast a steady state cash flow for the organization and each enterprise in the organization. Cash flow is calculated using a well known formula where cash flow equals period revenue minus period expense plus the period change in capital plus non-cash depreciation/amortization for the period. The steady state cash flow is calculated for the organization and each enterprise in the organization using forecasting methods identical to those disclosed previously in U.S. Pat. No. 5,615,109 to forecast revenue, expenses, capital changes and depreciation seperately before calculating the cash flow. The software in block 326 generates cash flow bots for the organization and each enterprise in the organization.

Every cash flow bot contains the information shown in Table 26.

TABLE 26

1. Unique ID number (based on date, hour, minute, second of creation)
2. Creation date (day, hour, minute, second)
3. Mapping information
4. Storage location
5. Organization or Enterprise ID
6. Components of value After the cash flow bots are initialized by the software in block 330 processing passes to a block 331. In block 331 the bots activate in accordance with the frequency specified by the user (20) in the system settings table (140). After being activated the bots retrieve the component of value information for the organization and each enterprise in the organization from the component of value definition table (156). The cash flow bots then complete the calculation and forecast of cash flow for the organization and each enterprise in the organization before saving the resulting values by period in the cash flow table (161) in the application database (50) before processing advances to a block 333.

The software in block 333 checks the system settings table (140) in the application database (50) to determine if the current calculation is a new calculation or a structure change. If the calculation is not a new calculation or a structure change, then processing advances to a software block 343. Alternatively, if the calculation is new or a structure change, then processing advances to a software block 341.

The software in block 341 checks the bot date table (149) and deactivates any element life bots with creation dates before the current system date. The software in block 341 then retrieves the information from the system settings table (140), the metadata mapping table (141) and the element of value definition table (155) as required to initialize element life bots for each element and sub-element of value in the organization before processing advances to a block 342.

Bots are independent components of the application that have specific tasks to perform. In the case of element life bots, their primary task is to determine the expected life of each element and sub-element of value for each enterprise in the organization. There are three methods for evaluating the expected life of the elements and sub-elements of value. Elements of value that are defined by a population of members (such as: channel partners, customers, employees and vendors) will have their lives estimated by analyzing and forecasting the lives of the members of the population. The forecasting of member lives will be determined by the "best" fit solution from competing life estimation methods including the Iowa type survivor curves, Weibull distribution survivor curves, Gompertz-Makeham survivor curves, polynomial equations and the forecasting methodology disclosed in U.S. Pat. No. 5,615,109. Elements of value (such as some parts of Intellectual Property—patents) that have legally defined lives will have their lives calculated using the time period between the current date and the expiration date of the element or sub-element. Finally, elements of value and sub-element of value (such as brand names, information technology and processes) that do not have defined lives and that do not consist of a collection of members will have their lives estimated by comparing the relative strength and stability of the element vectors with the relative stability of the enterprise CAP. The resulting values are stored in the element of value definition table (155) for each element and sub-element of value of each enterprise in the organization.

Every element life bot contains the information shown in Table 27.

TABLE 27

1. Unique ID number (based on date, hour, minute, second of creation)
2. Creation date (day, hour, minute, second)
3. Mapping information
4. Storage location
5. Element of Sub-Element of Value
6. Life Estimation Method (population analysis, date calculation or relative CAP)

After the element life bots are initialized by the software in block 341 processing passes to block 342. In block 342 the element life bots activate in accordance with the frequency specified by the user (20) in the system settings table (140). After being activated, the bots retrieve information for each element and sub-element of value from the element of value definition table (155) as required to complete the estimate of element life. The resulting values are then saved in the element of value definition table (155) in the application database (50) before processing advances to a block 343.

The software in block 343 checks the system settings table (140) in the application database (50) to determine if the current calculation is a new calculation or a structure change. If the calculation is not a new calculation or a structure change, then processing advances to a software block 402. Alternatively, if the calculation is new or a structure change, then processing advances to a software block 345.

The software in block 345 checks the bot date table (149) and deactivates any component capitalization bots with creation dates before the current system date. The software in block 341 then retrieves the information from the system settings table (140), the metadata mapping table (141) and the component of value definition table (156) as required to initialize component capitalization bots for the organization and each enteprise in the organization before processing advances to a block 346.

Bots are independent components of the application that have specific tasks to perform. In the case of component capitalization bots, their task is to determine the capitalized value of the components of value, forecast revenue, expense or capital requirements, for the organization and for each enterprise in the organization in accordance with the formula shown in Table 28.

TABLE 28

Value = $F_{f1}/(1 + K) + F_{f2}/(1 + K)^2 + F_{f3}/(1 + K)^3 + F_{f4}/(1 + K)^4 + (F_{f4} \times (1 + g))/(1 + K)^5) + (F_{f4} \times (1 + g)^2)/(1 + K)^6) \ldots + (F_{f4} \times (1 + g)^N)/(1 + K)^{N+4})$ Where:
$F_{fx}$ = Forecast revenue, expense or capital requirements for year x after valuation date (from advanced finance system)
N = Number of years in CAP (from prior calculation)
K = Cost of capital – % per year (from prior calculation)
g = Forecast growth rate during CAP – % per year (from advanced finance system)

After the capitalized value of every component and sub-component of value is complete, the results are stored in the component of value definition table (156) in the application database (50).

Every component capitalization bot contains the information shown in Table 29.

TABLE 29

1. Unique ID number (based on date, hour, minute, second of creation)
2. Creation date (day, hour, minute, second)
3. Mapping information
4. Storage location
5. Organization or Enterprise ID
6. Component of Value (Revenue, Expense or Capital Change)
7. Sub Component of Value After the component capitalization bots are initialized by the software in block 345 processing passes to block 346. In block 346 the component capitalization bots activate in accordance with the frequency specified by the user (20) in the system settings table (140). After being activated, the bots retrieve information for each component and sub-component of value from the advanced finance system table (147) and the component of value definition table (156) as required to calculate the capitalized value of each component. The resulting values are then saved in the component of value definition table (156) in the application database (50) before processing advances to a block 347.

The software in block 347 checks the bot date table (149) and deactivates any valuation bots with creation dates before the current system date. The software in block 347 then retrieves the information from the system settings table (140), the metadata mapping table (141), the element of value definition table (155), the component of value definition table (156) as required to initialize valuation bots for each enterprise, element and sub-element of value in the organization before processing advances to a block 348.

Bots are independent components of the application that have specific tasks to perform. In the case of valuation bots, their task is to calculate the contribution of every enterprise, element of value and sub-element of value in the organization using the overall procedure outlined in Table 7. The first step in completing the calculation in accordance with the procedure outlined in Table 7, is determining the relative contribution of each enterprise and element of value by using a series of predictive models to find the best fit relationship between:
1. the enterprise contribution vectors and the organization components of value;
2. the element of value vectors and the enterprise components of value; and
3. the sub-element of value vectors and the element of value they correspond to.

The system of the present invention uses 9 different types of predictive models to determine relative contribution: neural network; CART; projection pursuit regression; generalized additive model (GAM), redundant regression network; boosted Naïve Bayes Regression; MARS; linear regression; and stepwise regression to determine relative contribution. The model having the smallest amount of error as measured by applying the mean squared error algorithm to the test data is the best fit model. The "relative contribution algorithm" used for completing the analysis varies with the model that was selected as the "best-fit". For example, if the "best-fit" model is a neural net model, then the portion of revenue attributable to each input vector is determined by the formula shown in Table 30.

TABLE 30

$$\left(\sum_{k=1}^{k=m}\sum_{j=1}^{j=n} I_{jk} \times O_k \Big/ \sum_{j=1}^{j=n} I_{jk}\right) \Big/ \sum_{k=1}^{k=m}\sum_{j=1}^{j=n} I_{jk} \times O_k$$

Where
$I_{jk}$ = Absolute value of the input weight from input node j to hidden node k
$O_k$ = Absolute value of output weight from hidden node k
m = number of hidden nodes
n = number of input nodes After the relative contribution of each enterprise, element of value and sub-element of value is determined, the results of this analysis are combined with the previously calculated information regarding element life and capitalized component value to complete the valuation of each: enterprise contribution, element of value and sub-element using the approach shown in Table 31.

TABLE 31

| Gross Value | Percentage | Element Life/CAP | Net Value |
|---|---|---|---|
| Revenue value = $120 M | 20% | 80% | Value = $19.2 M |
| Expense value = ($80 M) | 10% | 100% | Value = ($8.0) M |
| Capital value = ($5 M) | 5% | 80% | Value = ($0.2) M |
| Total value = $35 M | | | |
| Net value for this element: | | | Value = $11.0 M |

The resulting values are stored in the element of value definition table (155) for each element and sub-element of value of each enterprise in the organization.

Every valuation bot contains the information shown in Table 32.

TABLE 32

1. Unique ID number (based on date, hour, minute, second of creation)
2. Creation date (day, hour, minute, second)
3. Mapping information
4. Storage location
5. Enterprise Contribution, Element of Value or Sub-Element of Value
6. Organization, Enteprise or Element of Value ID After the valuation bots are initialized by the software in block 347 processing passes to block 348. In block 348 the valuation bots activate in accordance with the frequency specified by the user (20) in the system settings table (140). After being activated, the bots retrieve information from the element of value definition table (155) and the component of value definition table (156) as required to complete the valuation. The resulting values are then saved in the element of value definition table (155) in the application database (50) before processing advances to a block 349.

The software in block 349 checks the bot date table (149) and deactivates any residual bots with creation dates before the current system date. The software in block 349 then retrieves the information from the system settings table (140), the metadata mapping table (141) and the element of value definition table (155) as required to initialize residual bots for each enterprise in the organization.

Bots are independent components of the application that have specific tasks to perform. In the case of residual bots, their task is to retrieve data from the as required from the element of value definition table (155) and the component of value definition table (156) and then calculate the residual going concern value for the organization and each enterprise in the organization in accordance with the formula shown in Table 33.

TABLE 33

Residual Going Concern Value = Total Current − Operation Value − Σ Financial Asset Values − Σ Elements of value Every residual bot contains the information shown in Table 34.

TABLE 34

1. Unique ID number (based on date, hour, minute, second of creation)
2. Creation date (day, hour, minute, second)
3. Mapping information
4. Storage location
5. Organization or Enterprise ID After the residual bots are initialized by the software in block 348 processing passes to block 349. In block 349 the residual bots activate in accordance with the frequency specified by the user (20) in the system settings table (140). After being activated, the bots retrieve information from the element of value definition table (155) and the component of value definition table (156) as required to complete the residual calculation for the organization or enterprise. After the calculation is complete, the resulting values are then saved in the element of value definition table (155) in the application database (50) before processing advances to a block 402.

Analyze Market Sentiment

The flow diagram in FIG. 7 details the processing that is completed by the portion of the application software (400) that analyzes the market sentiment for the enterprises in the organization. Processing begins in a software block 402.

The software in block 402 checks the system settings table (140) in the application database (50) to determine if the current calculation is a new calculation or a structure change. If the calculation is not a new calculation or a structure change, then processing advances to a software block 409. Alternatively, if the calculation is new or a structure change, then processing advances to a software block 404.

The software in block 404 checks the bot date table (149) and deactivates any sentiment calculation bots with creation dates before the current system date. The software in block 404 then retrieves the information from the system settings table (140), the metadata mapping table (141), the external database table (146), the element of value definition table (155), the component of value definition table (156) and the real option value table (162) as required to initialize sentiment calculation bots for each enterprise in the organization.

Bots are independent components of the application that have specific tasks to perform. In the case of sentiment calculation bots, their task is to retrieve data as required from: the external database table (146), the element of value definition table (155), the component of value definition table (156) and the real option value table (162) then calculate the sentiment for each enterprise in the organization in accordance with the formula shown in Table 35.

TABLE 35

Sentiment = Total Market Value − Total Current − Operation Value − Σ Real Option Values Every sentiment calculation bot contains the information shown in Table 36.

TABLE 36

1. Unique ID number (based on date, hour, minute, second of creation)
2. Creation date (day, hour, minute, second)
3. Mapping information
4. Storage location
5. Enterprise ID After the sentiment calculation bots are initialized by the software in block 404 processing passes to block 405. In block 405 the sentiment calculation bots activate in accordance with the frequency specified by the user (20) in the system settings table (140). After being activated, the bots retrieve information from the external database table (146), the element of value definition table (155), the component of value definition table (156) and the real option value table (162) as required to complete the sentiment calculation for each enterprise. After the calculation is complete, the resulting values are then saved in the enterprise sentiment table (166) in the application database (50) before processing advances to a block 409.

The software in block 409 checks the system settings table (140) in the application database (50) to determine if the current calculation is a new calculation or a structure change. If the calculation is not a new calculation or a structure change, then processing advances to a software block 412. Alternatively, if the calculation is new or a structure change, then processing advances to a software block 410.

The software in block 410 checks the bot date table (149) and deactivates any sentiment factor bots with creation dates before the current system date. The software in block 410 then retrieves the information from the system settings table (140), the metadata mapping table (141), the external database table (146), the element of value definition table (155), the component of value definition table (156) and the real option value table (162) as required to initialize sentiment factor bots for each enterprise in the organization.

Bots are independent components of the application that have specific tasks to perform. In the case of sentiment factor bots, their primary task is to calculate sentiment related attributes including cumulative total value, the period to period rate of change in value, the rolling average value, a series of time lagged values as well as pre-specified combinations of variables called composite variables. The bots also use attribute derivation algorithms such as the AQ program to create combinations of the variables that weren't pre-specified for combination. While the AQ program is used in the preferred embodiment of the present invention, other attribute derivation algorithms such as the LINUS algorithms, may be used to the same effect. The newly calculated sentiment factors are stored in the sentiment factor table (169) before processing advances to a block 411.

Every sentiment factor bot contains the information shown in Table 37.

TABLE 37

1. Unique ID number (based on date, hour, minute, second of creation)
2. Creation date (day, hour, minute, second)
3. Mapping information
4. Storage location
5. Enterprise ID After the sentiment factor bots are initialized by the software in block 410 processing passes to block 411. In block 411 the sentiment factor bots activate in accordance with the frequency specified by the user (20) in the system settings table (140). After being activated, the bots retrieve information from the external database table (146), the element of value definition table (155), the component of value definition table (156) and the real option value table (162) as required to generate the sentiment factors for each enterprise. After the calculation is complete, the resulting values are then saved in the sentiment factors table (169) in the application database (50) before processing advances to a block 412.

The software in block 412 checks the system settings table (140) in the application database (50) to determine if the current calculation is a new calculation or a structure change. If the calculation is not a new calculation or a structure change, then processing advances to a software block 502. Alternatively, if the calculation is new or a structure change, then processing advances to a software block 413.

The software in block 413 checks the bot date table (149) and deactivates any sentiment analysis bots with creation dates before the current system date. The software in block 413 then retrieves the information from the system settings table (140), the metadata mapping table (141), the external database table (146), the element of value definition table (155), the component of value definition table (156), the real option value table (162), the enteprise sentiment table (166) and the sentiment factors table (169) as required to initialize sentiment analysis bots for each enterprise in the organization.

Bots are independent components of the application that have specific tasks to perform. In the case of sentiment analysis bots, their primary task is determine the relationship between sentiment factors and the calculated sentiment for each enterprise in the organization. A series of predictive model bots are initialized at this stage because it is impossible to know in advance which predictive model type will produce the "best" predictive model for the data from each commercial enterprise. The series for each model includes 9 predictive model bot types: neural network; CART; projection pursuit regression; generalized additive model (GAM), redundant regression network; boosted Naïve Bayes Regression; MARS; linear regression; and stepwise regression.

Every sentiment analysis bot contains the information shown in Table 38.

TABLE 38

1. Unique ID number (based on date, hour, minute, second of creation)
2. Creation date (day, hour, minute, second)
3. Mapping information
4. Storage location
5. Enterprise ID After the sentiment analysis bots are initialized by the software in block 413 processing passes to block 414. In block 411 the sentiment analysis bots activate in accordance with the frequency specified by the user (20) in the system settings table (140). After being activated, the bots retrieve information from the the system settings table (140), the metadata mapping table (141), the enteprise sentiment table (166) and the sentiment factors table (169) and randomly partition sentiment factors for each enterprise into a training set and a test set. The software in block 414 uses "bootstrapping" where the different training data sets are created by re-sampling with replacement from the original training set, so data records may occur more than once. The same sets of data will be used to train and then test each predictive model bot. When the predictive model bots complete their training and testing, the resulting sets of "best fit" factors are then saved in the sentiment factors table (169) in the application database (50) before processing advances to a block 415.

The software in block 415 combines the results from the sentiment analysis from each bot type to determine the best set of sentiment factors for each enterprise. The models having the smallest amount of error as measured by applying the mean squared error algorithm to the test data are given preference in determining the best set of variables. As a result of this processing the best set of variables contain the sentiment factors that correlate most strongly with changes in the components of value. The best set of variables will hereinafter be referred to as the "sentiment drivers". The software in block 415 saves an indicator in each item record identifying the sentiment factors that are "sentiment drivers" before processing advances to block 502.

Display and Print Results

The flow diagram in FIG. 8 details the processing that is completed by the portion of the application software (500) that creates and displays financial management reports, optionally prints financial management reports and optionally trades company equity securities. The financial management reports use the Value Map® report format to summarize information about the categories of business value for the organization and each enterprise in the organization. If there are prior valuations, then a Value Creation report will be created to highlight changes in the categories of business value during the period between the prior valuation and the current valuation date.

System processing in this portion of the application software (900) begins in a block 502. The software in block 502 checks the system settings table (140) in the application database (50) to determine if the current calculation is a new calculation or a structure change. If the calculation is not a new calculation or a structure change, then processing advances to a software block 505. Alternatively, if the calculation is new or a structure change, then processing advances to a software block 504.

The software in block 504 checks the bot date table (149) and deactivates any report bots with creation dates before the current system date. The software in block 504 then retrieves the information from the system settings table (140) and the report table (164) as required to determine the format (Value Map® & Value Creation format and/or traditional: balance sheet, income & cash flow statement format) and type of report (text or graphical) bots that need to be created for the organization, each enterprise in the organization and the sub-elements of value before processing advances to block 505.

Bots are independent components of the application that have specific tasks to perform. In the case of report bots, their primary tasks are to: retrieve data from the system settings table (140), the basic finance system table (143), the advanced finance system table (147), the element of value definition table (155), the component of value definition table (156) and the real option value table (162), calculate market equity using the formula shown in Table 39 and generate the reports in the specified formats for the specified time period(s).

TABLE 39

Market Equity = (Current Operation Value) +

$\left(\sum \text{Real Option Values}\right) - \left(\sum \text{Short Term Liabilities}\right) -$ $\left(\sum \text{Contingent \& Long Term Liabilities}\right) -$ (Book Value of Equity)

*calculated in accordance with GAAP

Every report bot contains the information shown in Table 40.

TABLE 40

1. Unique ID number (based on date, hour, minute, second of creation)
2. Creation date (day, hour, minute, second)
3. Mapping information TABLE 40-continued 4. Storage location
5. Organization, Enterprise or Element of ValueID
6. Report Format (text or graphical)
7. Report Type (Value Map ®/Value Creation format or traditional format)

The general format of the Value Map® Reports is shown in Table 41 and Table 42.

TABLE 41

Value Map ™ Report
XYZ Corporation

| ASSETS | Dec. 31, 19XX | Dec. 31, XXXX |
|---|---|---|
| Current Operation: Financial Assets | | |
| Cash and Marketable Securities: | $7,871,230 | $15,097,057 |
| Accounts Receivable | $39,881,200 | $42,234,410 |
| Inventory | $19,801,140 | $21,566,540 |
| Property, Plant & Equipment | $22,800,000 | $21,221,190 |
| Prepaid Expenses | $2,071,440 | $1,795,890 |
| Subtotal Current Operation Assets: | $92,425,010 | $101,915,087 |
| Cash Generating "Soft" Assets | | |
| Brandnames | $17,000,000 | $12,000,000 |
| Customer Base | $62,000,000 | $49,500,000 |
| Employees | $10,750,000 | $8,250,000 |
| Strategic Alliances | $33,250,000 | $33,500,000 |
| Vendors | $11,500,000 | $9,750,000 |
| General Going Concern Value | $31,250,000 | $31,750,000 |
| Subtotal Cash Generating Assets | $165,750,000 | $144,750,000 |
| Subtotal Current Operation | $258,175,010 | $246,665,087 |
| Real Options: | | |
| GUI Market Option | $12,500,000 | $10,000,000 |
| IPX Market Option | $17,000,000 | $12,500,000 |
| Subtotal Enterprise Options | $29,500,000 | $22,500,000 |
| Industry Growth Options: | $80,000,000 | $60,000,000 |
| Subtotal Real Options | $109,500,000 | $82,500,000 |
| Total Assets & Options | $367,675,010 | $329,165,087 |
| Market Sentiment | $27,123,116 | $18,273,698 |
| Total Market Value | $394,798,126 | $347,438,785 |

Copyright, Jeff S. Eder 1999, All Rights Reserved

TABLE 42

Value Map ™ Report
XYZ Corporation

| LIABILITIES & SHAREHOLDER EQUITY | | |
|---|---|---|
| Liabilities: | | |
| Accounts Payable | $15,895,585 | $18,879,949 |
| Salaries Payable | $8,766,995 | $10,468,305 |
| Short Term Debt, Notes Payable | $20,189,900 | $11,506,130 |
| Taxes Payable | $12,430,120 | $9,099,880 |
| Subtotal Short Term Liabilities | $57,282,600 | $49,954,264 |
| Contingent Liabilities | $5,100,000 | $4,800,000 |
| Long Term Debt | $17,800,000 | $20,916,650 |
| Total Liabilities | $80,182,600 | $75,670,914 |
| Shareholder's Equity: | | |
| Stock | $2,000,000 | $2,000,000 |
| Market Equity | $27,123,116 | $18,273,698 |

TABLE 42-continued

Value Map ™ Report
XYZ Corporation

| LIABILITIES & SHAREHOLDER EQUITY | | |
|---|---|---|
| Retained Earnings | $15,342,410 | $29,044,173 |
| Future Earnings | $270,150,000 | $222,450,000 |
| Total Shareholder's Equity | $314,615,526 | $271,767,871 |
| Total Liabilities & Shareholder Equity | $394,798,126 | $347,438,785 |

Copyright, Jeff S. Eder 1999, All Rights Reserved

After the report bots are initialized by the software in block 504 processing passes to a block 505. In block 505 the bots activate in accordance with the frequency specified by the user (20) in the system settings table (140). After being activated, the bots retrieve information for the organization, enterprise or element of value from the element of value definition table (155), the component of value definition table (156) and the real option value table (1) as required to complete the report in accordance with the pre-specified format. The resulting reports are then saved in the report table (164) in the application database (50). The software in block 505 creates and displays all Value Map® reports and Value Creation Statement reports the user (20) requests using the report selection and display data window (705) in the general format shown in Table 41. Graphical reports such as those in a Hyperbolic Tree format that have been saved over time can be displayed like a "movie" shows the evolution of value over time. The software in block 505 also prompts the user (20) using the report selection and display data window (705) to select reports for printing. After the user's input regarding reports to print has been stored in the reports table (164), processing advances to block 507. If the user doesn't provide any input, then only the default reports specified by the user (20) in the system settings table (140) will be produced for storage.

The software in block 507 checks the reports tables (164) to determine if any reports have been designated for printing. If reports have been designated for printing, then processing advances to a block 506. The software in block 506 sends the designated reports to the printer (118). After the reports have been sent to the printer (118), processing advances to a software block 509. Alternatively, if no reports were designated for printing then processing advances directly from block 507 to block 509.

The software in block 509 checks the system settings table (140) in the application database (50) to determine if trading in enterprise equity is authorized. If trading in enterprise equity is not authorized, then processing advances to a software block 507. Alternatively, if trading in enterprise equity is authorized, then processing advances to a software block 510.

The software in block 510 retrieves information from the system settings table (140) and the advanced finance system table (147) that is required to calculate the minimum amount of cash that will be available for investment in enteprise equity during the next 12 month period. The system settings table (140) contains the minimum amount of cash and available securities that the user (20) indicated was required for enterprise operation while the advanced finance system table (147) contains a forecast of the cash balance for the enterprise for each period during the next 12 months. After the amount of available cash for each enterprise is calculated and stored in the equity purchase table (165), processing advances to a software block 511.

The software in block 511 checks the equity purchase table (165) and enterprise sentiment table (166) to see if there is negative sentiment in any enterprise with available cash. If there are no enterprises with negative sentiment and available cash, then processing advances a software block 602. Alternatively, if there are enterprises with available cash and negative sentiment, then processing advances to a software block 512.

The software in block 512, retrieves the current enterprise equity price from the external database table (146), calculates the number of shares that can be purchased using the available cash and then generates a purchase order for the number of shares that can be purchased. The software in block 512 then prompts the user (20) via the purchase shares and confirm data window (706) to confirm the purchase. Once the user (20) confirms the equity purchase, the software in block 512 retrieves the on-line equity account information from the system settings table (140) and transmits and confirms the order to purchase the shares with the on-line broker via the network (45). The details of equity purchase transaction and confirmation are saved in the equity purchase table (156) before processing advances to block 602.

Generate and Analyze Value Improvements

The flow diagram in FIG. 9 details the processing that is completed by the portion of the application software (600) that generates and analyzes value improvements. Processing in this portion of the application starts in software block 602.

The software in block 602 checks the system settings table (140) in the application database (50) to determine if the current calculation is a new calculation or a structure change. If the calculation is not a new calculation or a structure change, then processing advances to a software block 606. Alternatively, if the calculation is new or a structure change, then processing advances to a software block 603.

The software in block 603 checks the bot date table (149) and deactivates any improvement bots with creation dates before the current system date. The software in block 603 then retrieves the information from the system settings table (140), the soft asset system table (148), the element of value definition table (155) and the component of value definition table (156) as required to initialize improvement bots before processing advances to a block 604.

Bots are independent components of the application that have specific tasks to perform. In the case of improvement bots, their primary task is to analyze and prioritize potential changes to value drivers for each enterprise in the organization. The analysis of value driver changes closely mirrors the calculation of profit improvement that was completed in the related U.S. Pat. No. 5,615,109 a "Method of and System for Generating Feasible, Profit Maximizing Requisition Sets". The capital efficiency of the potential improvements identified by the improvement bots is evaluated in accordance with the formula shown in Table 43.

TABLE 43

| | Capital Change (+) | Capital Change (−) |
|---|---|---|
| Capital efficiency | $\dfrac{\text{Revenue } \Delta - \text{Expense } \Delta}{\text{Capital } \Delta}$ | Revenue Δ − Expense Δ − Capital Δ |

TABLE 43-continued

| | Capital Change (+) | Capital Change (−) |
|---|---|---|
| Where: | Revenue Δ = revenue impact of 1% change in value driver | |
| | Expense Δ = expense impact of 1% change in value driver | |
| | Capital Δ = capital impact of 1% change in value driver | |

The software in block 604 generates a list of potential improvements for each element of value defined and measured by the system of the present invention.

Every improvement bot contains the information shown in Table 44.

TABLE 44

1. Unique ID number (based on date, hour, minute, second of creation)
2. Creation date (day, hour, minute, second)
3. Mapping information
4. Storage location
5. Element of ValueID
6. Soft Asset System
7. Value Driver After the improvement bots are initialized by the software in block 603 processing passes to a block 604. In block 604 the bots activate in accordance with the frequency specified by the user (20) in the system settings table (140). After being activated, the bots retrieve information for the element of value from the system settings table (140), the soft asset system table (148), the element of value definition table (155) and the component of value definition table (156) as required to complete the analyses in accordance with the formula shown in Table 40. The soft asset management system that corresponds to the element of value being analyzed may also have generated a list of potential improvements. If it has generated a list, these improvements are analyzed in the same manner that the improvements generated by the system of the present invention are analyzed. The resulting list of prioritized improvements are then saved in the value driver change table (167) in the application database (50) before processing advances to a block 605.

The software in block 605 prepares a list of the potential value improvements in capital efficiency order and prompts the user (20) via a value driver and structure change window (707) to modify and/or select the improvements and/or structure changes that should be included in the revised forecast. If the user (20) chooses not to enter any selections, then the software in block 605 will select the potential improvements that produce the most benefit within the constraints imposed by the available cash. The information regarding the improvement selections made by the user (20) or the system are stored in the value driver change table (167) in the application database (50). In a similar fashion, if the user made any changes to the structure, the information regarding the new change is stored in the system settings table (140) before processing advances to a software block 606.

The software in block 606 checks the system settings table (140) in the application database (50) to determine if the current calculation is a structure change. If the calculation is new or a structure change, then processing advances to software block 204 and the processing described above is repeated. Alternatively, if the calculation is not a structure change, then processing advances to a software block 610.

The software in block 610 retrieves information from the system settings table (140), the element of value definition table (155), the component of value definition table (156) and the value driver change table (167) as required to define and initialize a probabilistic simulation model. The preferred embodiment of the probabilistic simulation model is a Markov Chain Monte Carlo model, however, other simulation models can be used with similar results. The information defining the model is then stored in the simulation table (168) before the software in block 610 iterates the model as required to ensure the convergence of the frequency distribution of the output variables. After the simulation calculations have been completed, the software in block 610 saves the resulting information in the simulation table (168) before displaying the results of the simulation to the user (20) via a Value Mentor™ Reports data window (708) that uses a summary Value Map™ report format to display the mid point and the range of estimated future values for the various elements of each enterprise and the changes in value drivers, user-specified or system generated, that drove the future value estimate. The user (20) is prompted to indicate when the examination of the displayed report is complete and to indicate if any reports should be printed. If the user (20) doesn't provide any information regarding reports to display or print, then no reports are displayed or printed at this point and system processing continues. The information entered by the user (20) is entered in to the report table (164) before processing advances to a block 611.

The software in block 611 checks the reports tables (164) to determine if any additional reports have been designated for printing. If additional reports have been designated for printing, then processing advances to a block 612 which prepares and sends the designated reports to the printer (118). After the reports have been sent to the printer (118), processing advances to a software block 614. If the software in block 611 determines that no additional reports have been designated for printing, then processing advances directly to block 614.

The software in block 614 checks the system settings table (140) in the application database (50) to determine if the current calculation is a continuous calculation. If the calculation is a continuous calculation, then processing advances to software block 204 where the processing described previously is repeated continuously. Alternatively, if the calculation is not continuous, then processing advances to a software block 615 where processing stops.

Thus, the reader will see that the system and method described above transforms extracted transaction data, corporate information and information from the internet into detailed valuations for an organization, the enterprises in the organization and for specific elements of value within the enterprise. The level of detail contained in the business valuations allows users of the system to monitor and manage efforts to improve the value of the business in a manner that is superior to that available to users of traditional accounting systems and business valuation reports.

While the above description contains many specificity's, these should not be construed as limitations on the scope of the invention, but rather as an exemplification of one preferred embodiment thereof. Accordingly, the scope of the invention should be determined not by the embodiment illustrated, but by the appended claims and their legal equivalents.

The invention claimed is:

1. A non-transitory computer readable medium having a non-transitory sequence of instructions tangibly stored therein, which when executed cause a processor in at least one computer to perform data management steps, comprising
    (a) activate at least one data bot on a schedule for each of a plurality of systems, one or more external databases and an internet,
    (b) obtain a plurality of data from the plurality of systems, the one or more external databases and the Internet using said at least one data bot,
    (c) transform said data to a common schema and a user selected metadata standard, where the data obtained from the plurality of systems, the one or more external databases and the Internet are all transformed to the metadata standard and the common schema, and
    (d) make said transformed data available for review or processing by storing said data in one or more tables in the database, where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

2. The non-transitory computer readable medium of claim 1, wherein the metadata standard comprises an xml metadata standard.

3. The non-transitory computer readable medium of claim 1, wherein the plurality of data is representative of a physical object or substance and the metadata standard is optionally a metadata coalition standard.

4. The non-transitory computer readable medium of claim 1, wherein the the common schema comprises a hierarchy.

5. The non-transitory computer readable medium of claim 1, wherein the database comprises an application database.

6. The non-transitory computer readable medium of claim 1, wherein the database comprises an integrated database.

7. The non-transitory computer readable medium of claim 1, wherein the common schema comprises a particular definition of the data stored in each of the one or more tables.

8. An advanced data preparation system, comprising: a computer with a processor having circuitry to execute instructions; a storage device available to said processor with sequences of instructions stored therein, which when executed cause the processor to:
    (a) activate at least one data bot on a schedule for each of a plurality of systems, one or more external databases and an internet,
    (b) obtain a plurality of data from the plurality of systems, the one or more external databases and the Internet using said at least one data bot,
    (c) transform said data to a metadata standard and a common schema, where the data obtained from the plurality of systems, the one or more external databases and the Internet are all transformed to the metadata standard and the common schema and where the metadata standard is selected by a user, and
    (d) make said transformed data available for review or processing by storing said data in one or more tables in the database where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

9. The system of claim 8, wherein the metadata standard comprises an xml metadata standard.

10. The system of claim 8, wherein the plurality of data is representative of a physical object or substance and the metadata standard is optionally a metadata coalition standard.

11. The system of claim 8, wherein the plurality of data from the plurality of systems, the one or more external databases and the Internet comprise a plurality of heterogeneous metadata standards and schemas.

12. The system of claim 8, wherein the database comprises an application database.

13. The system of claim 8, wherein the database comprises an integrated database.

14. The system of claim 8, wherein the common schema comprises a particular definition of the data stored in each of the one or more tables.

15. An advanced data preparation method, comprising: using a computer to complete the steps of:
   (a) activating at least one data bot on a schedule for each of a plurality of systems, one or more external databases and an internet,
   (b) obtaining a plurality of data from the plurality of systems, the one or more external databases and the Internet using said at least one data bot,
   (c) transforming said data to a metadata standard and a common schema, where the data obtained from the plurality of systems, the one or more external databases and the Internet are all transformed to the common schema and where the metadata standard is selected by a user, and
   (d) making said transformed data available for review or processing by storing said data in one or more tables in the database where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

16. The method of claim 15, wherein the metadata standard is an xml metadata standard.

17. The method of claim 15, wherein the plurality of data from the plurality of systems, the one or more external databases and the Internet comprise a plurality of heterogeneous metadata standards and schemas.

18. The method of claim 15, wherein the database comprises an application database.

19. The method of claim 15, wherein the database comprises an integrated database and wherein the plurality of data are representative of a physical object or sub stance.

20. The method of claim 15, wherein the model or common schema comprises a particular definition of the data stored in each of the one or more tables.

21. A non-transitory computer program product having a sequence of instructions tangibly stored therein which when executed cause a processor in at least one computer to perform data management steps, comprising:
   (a) activate at least one data bot on a schedule for each of a plurality of systems and for one or more data sources selected from a group consisting of one or more external databases and an internet,
   (b) obtain a plurality of data from the plurality of systems, and the one or more data sources selected from the group consisting of one or more external databases and the Internet using said at least one data bot,
   (c) transform all of said data to a metadata standard and a common schema where the metadata standard is selected by a user and is separate from the common schema, and
   (d) store said data in one or more tables in the database where it is then available for review or processing where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

22. The non-transitory computer program product of claim 21, wherein the plurality of data are representative of a physical object or substance and wherein the plurality of systems are selected from the group consisting of advanced financial systems, basic financial systems, alliance management systems, brand management systems, customer relationship management systems, channel management systems, intellectual property management systems, process management systems, vendor management systems, operation management systems, sales management systems, human resource systems, accounts receivable systems, accounts payable systems, capital asset systems, inventory systems, invoicing systems, payroll systems and purchasing systems.

23. The non-transitory computer program product of claim 21, wherein the database comprises an application database.

24. The non-transitory computer program product of claim 21, wherein the metadata standard comprises an xml metadata standard or a metadata coalition standard.

25. The non-transitory computer program product of claim 21, wherein the common schema comprises a particular definition of the data stored in each of the one or more tables.

26. The non-transitory computer program product of claim 21, wherein the plurality of data from the plurality of systems, the one or more external databases and the Internet comprise a plurality of heterogeneous metadata standards and schemas.

27. An advanced data preparation system, comprising: a computer with a processor having circuitry to execute instructions; a storage device available to said processor with sequences of instructions stored therein, which when executed cause the processor to:
   (a) activate at least one bot for each of a plurality of systems and for one or more data sources selected from a group consisting of one or more external databases and an internet,
   (b) obtain a plurality of data from the plurality of systems, and the one or more data sources selected from the group consisting of one or more external databases and the Internet using said at least one bot, (c) transform all of said data to a metadata standard and a common schema where the metadata standard is selected by a user, and
(d) store said data in one or more tables in the database where it is then available for review or processing where an initial run or a revision in the common schema for any data storage requires one or more additional steps selected from the group consisting of specifying one or morn conversion rules defining one or more fields, deactivating one or more old bots, initializing one or more new bots, specifying one or more bot schedules, specifying one or more metadata mappings, specifying one or more identification rules, and specifying one or more classification rules.

28. The system of claim 27, wherein the plurality of data are representative of a physical object or substance and wherein the plurality of systems are selected from the group consisting of advanced financial systems, basic financial systems, alliance management systems, brand management systems, customer relationship management systems, channel management systems, intellectual property management systems, process management systems, vendor management systems, operation management systems, sales management systems, human resource systems, accounts receivable systems, accounts payable systems, capital asset systems, inventory systems, invoicing systems, payroll systems and purchasing systems.

29. The system of claim 27, wherein the database comprises an application database.

30. The system of claim 27, wherein the database comprises an integrated database and wherein the metadata standard comprises an xml metadata standard.

31. The system of claim 27, wherein the common schema comprises a particular definition of the data stored in each of the one or more tables.

32. The system of claim 27, wherein the plurality of data from the plurality of systems, and the one or more data sources selected from the group consisting of the one or more external databases and the Internet comprise at least some data with no metadata.

33. An advanced data preparation method, comprising: using a computer to complete the steps of:
(a) activating at least one data bot on a schedule for each of a plurality of systems, one or more external databases and an internet,
(b) obtaining a plurality of data from the plurality of systems, the one or more external databases and the Internet using said at least one data bot,
(c) transforming all of said data to a common schema and a user selected metadata standard where the metadata standard is separate from the common schema, and
(d) storing said data in one or more tables in the database where it is then available for review or processing where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

34. The method of claim 33, wherein the plurality of systems are selected from the group consisting of advanced financial systems, basic financial systems, alliance management systems, brand management systems, customer relationship management systems, channel management systems, intellectual property management systems, process management systems, vendor management systems, operation management systems, sales management systems, human resource systems, accounts receivable systems, accounts payable systems, capital asset systems, inventory systems, invoicing systems, payroll systems and purchasing systems.

35. The method of claim 33, wherein the database comprises an application database.

36. The method of claim 33, wherein the database comprises an integrated database and wherein the metadata standard comprises an xml metadata standard or a metadata coalition standard.

37. The method of claim 33, wherein the common schema comprises a particular definition of the data stored in each of the one or more tables.

38. The method of claim 33, wherein the plurality of data from the plurality of systems, and the one or more data sources selected from the group consisting of the one or more external databases and the Internet comprise at least some data with no metadata.

39. A non-transitory computer program product having a sequence of instructions tangibly stored therein, which when executed cause a processor in at least one computer to perform data management steps, comprising:
(a) activate at least one data bot on a schedule for each of one or more external databases and for one or more data sources selected from a group consisting of a plurality of systems and an internet,
(b) obtain a plurality of data from the one or more external databases and the one or more data sources selected from the group consisting of the plurality of systems and the Internet using said at least one data bot,
(c) transform all of said data to a metadata standard and a common schema where the metadata standard is selected by a user, and
(d) store said data in one or more tables in the database where it is then available for review or processing where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

40. The non-transitory computer program product of claim 39, wherein the database comprises an application database.

41. The non-transitory computer program product of claim 39, wherein the database comprises an integrated database and wherein the metadata standard comprises an xml metadata standard or a metadata coalition standard.

42. The non-transitory computer program product of claim 39, wherein the model or common schema comprises a particular definition of the data stored in each of the one or more tables.

43. The non-transitory computer program product of claim 39, wherein the plurality of data are representative of a physical object or substance.

44. An advanced data preparation system, comprising: a computer with a processor having circuitry to execute instructions; a storage device available to said processor with sequences of instructions stored therein, which when executed cause the processor to:
 (a) activate at least one data bot for each of one or more external databases and for one or more data sources selected from a group consisting of a plurality of systems and an internet,
 (b) obtain a plurality of data from the one or more external databases and the one or more data sources selected from the group consisting of the plurality of systems and the Internet using said at least one data bot,
 (c) transform all of said data to a metadata standard and a common schema where the metadata standard is selected by a user and is separate from the common schema, and
 (d) store said data in one or more tables in the database where it is then available for review or processing where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

45. The system of claim 44, wherein the database comprises an application database.

46. The system of claim 44, wherein the database comprises an integrated database and wherein the metadata standard comprises an xml metadata standard.

47. The system of claim 44, wherein the common schema comprises a particular definition of the data stored in each of the one or more tables and a hierarchy.

48. The system of claim 44, wherein the plurality of data are representative of a physical object or substance.

49. An advanced data preparation method, comprising: using a computer to complete the steps of:
 (a) activating at least one data bot on a schedule for each of one or more external databases and for one or more data sources selected from a group consisting of a plurality of systems and an internet,
 (b) obtaining a plurality of data from the one or more external databases and the one or more data sources selected from the group consisting of the plurality of systems and the Internet using said at least one data bot,
 (c) transforming all of said data to a metadata standard and a model or a common schema where the metadata standard is selected by a user, and
 (d) storing said data in one or more tables in the database where it is then available for review or processing where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

50. The method of claim 49, wherein the database comprises an application database.

51. The method of claim 49, wherein the plurality of data are representative of a physical object or substance and wherein the metadata standard comprises an xml metadata standard.

52. The method of claim 49, wherein the common schema comprises a particular definition of the data stored in each of the one or more tables.

53. A non-transitory computer program product having a sequence of instructions tangibly stored therein which when executed cause a processor in at least one computer to perform business data management steps, comprising:
 (a) activate at let one data bot on a schedule for each of one or more data sources selected from a group consisting of a plurality of systems, one or more external databases and an internet,
 (b) obtain a plurality of data from the one or more data sources selected from the group consisting of the plurality of systems, the one or more external databases and the Internet using said at least one data bot,
 (c) transform all of said data to a metadata standard and a common schema where the metadata standard is selected by a user and is separate from the common schema, and
 (d) store said data in one or more tables in the database where it is then available for review or processing where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

54. The non-transitory computer program product of claim 53, wherein the data comprises data representative of a business where the business physically exists.

55. The non-transitory computer program product of claim 53, wherein the database comprises an application database.

56. The non-transitory computer program product of claim 53, wherein the database comprises an integrated database and wherein the metadata standard comprises an xml metadata standard.

57. The non-transitory computer program product of claim 53, wherein the common schema comprises a particular definition of the data stored in each of the one or more tables.

58. The non-transitory computer program product of claim 53, wherein the plurality of data from the one or more data sources selected from the group consisting of the plurality of systems, the one or more external databases and the Internet comprise a plurality of heterogeneous metadata standards and schemas.

59. An advanced business data preparation system, comprising: a computer with a processor having circuitry to execute instructions; a storage device available to said processor with sequences of instructions stored therein, which when executed cause the processor to:
 (a) activate at least one data bot for each of one or more data sources selected from a group consisting of a plurality of systems, one or more external databases and an internet,
 (b) obtain a plurality of data from the one or more data sources selected from the group consisting of the plurality of systems, the one or more external databases and the Internet using said at least one data bot,
 (c) transform all of said data to a metadata standard and a common schema where the metadata standard is selected by a user, and (d) store said data in one or more tables in the database where it is then available for review or processing where an initial run or a revision in the common schema for any data storage requires one or more additional steps selected from the group consisting of specifying one or more conversion rules, defining on or more fields, deactivation one or more old data bots, initializing one or more new data bots, specifying one or more data bot schedules, specifying one or more metadata mappings, specifying one or more identification rules and specifying one or more classification rules.

60. The system of claim 59, wherein the data comprises data representative of a business where the business physically exists.

61. The system of claim 59, wherein the database comprises an application database.

62. The system of claim 59, wherein the database comprises an integrated database and wherein the metadata standard comprises an xml metadata standard.

63. The system of claim 59, wherein the common schema comprises a definition of the data stored in each of the one or more tables.

64. The system of claim 59, wherein the plurality of data from the one or more data sources selected from the group consisting of the plurality of systems, the one or more external databases and the Internet comprise at least some data with no metadata.

65. An advanced business data preparation method, comprising: using a computer to complete the steps of:
(a) activate at least one data bot on a schedule for each of one or more data sources selected from a group consisting of a plurality of systems, one or more external databases and an internet,
(b) obtain a plurality of data from the one or more data sources selected from the group consisting of the plurality of systems, the one or more external databases and the Internet using said at least one data bot,
(c) transforming all of said data to a metadata standard and a common schema where the metadata standard is selected by a user, and
(d) storing said data in one or more tables in the database where it is then available for review or processing where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

66. The method of claim 65, wherein the database comprises an application database.

67. The method of claim 65, wherein the database comprises an integrated database and wherein the metadata standard comprises an xml metadata standard.

68. The method of claim 65, wherein the data comprises data representative of a business where the business physically exists.

69. The method of claim 65, wherein the plurality of data from the one or more data sources selected from the group consisting of the plurality of systems, the one or more external databases and the Internet comprise at least some data with no metadata.

70. A non-transitory computer program product having a sequence of instructions tangibly stored therein which when executed cause a processor in at least one computer to perform business data management steps, comprising:
(a) activate at least one data bot on a schedule for each of a plurality of systems one or more external databases and an internet;
(b) obtain a plurality of data from the a plurality of systems, the one or more external databases and the an Internet using said at least one data bot wherein the obtained data comprises first data from a first source organized according to a first schema and comprises second data from at least one second source that is different from the first source, the second data organized according to a second schema different from the first schema;
(c) transform said data to both a common schema and a user selected metadata standard, wherein the data obtained from the plurality of systems, the one or more external databases, ad the Internet are all transformed to the common schema and the metadata standard; and
(d) store said transformed data in a database according to both the metadata standard and the common schema for the database where an initial run or a revision in the common schema for any data storage requires one or more additional steps selected from the group consisting of specifying one or more conversion rules, defining one or more fields, deactivating one or more old data bots, initializing one or more new data bots, specifying one or more data bot schedules, specifying one or more metadata mappings, specifying one or more identification rules and specifying one or more classification rules.

71. The non-transitory computer program product of claim 70, wherein the database comprises an application database.

72. The non-transitory computer program product of claim 70, wherein the database comprises an integrated database.

73. The non-transitory computer program product of claim 70, wherein the metadata standard comprises a metadata coalition standard or an xml metadata standard.

74. The non-transitory computer program product of claim 70, wherein duplicate data are managed analytically.

75. The non-transitory computer readable medium of claim 70, wherein the obtained data comprises first metadata organized according to a first metadata standard and the second data comprises second metadata organized according to a second metadata standard different from the first metadata standard, and wherein the first metadata and second metadata are transformed to the metadata standard.

76. The non-transitory computer readable medium of claim 74, wherein the duplicate data is managed analytically by using a clustering algorithm to cluster said data to cause the duplicate data to be in a cluster.

* * * * *